(12) United States Patent  (10) Patent No.: US 12,348,541 B2
Islam  (45) Date of Patent: Jul. 1, 2025

(54) SYSTEMS AND METHODS OF GRAPH-BASED VEHICULAR INTRUSION DETECTION

(71) Applicant: University of Maryland, Baltimore County, Baltimore, MD (US)

(72) Inventor: Riadul Islam, Windsor Mill, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 192 days.

(21) Appl. No.: 17/713,369

(22) Filed: Apr. 5, 2022

(65) Prior Publication Data

US 2022/0377094 A1  Nov. 24, 2022

Related U.S. Application Data

(60) Provisional application No. 63/172,293, filed on Apr. 8, 2021.

(51) Int. Cl.
*H04L 9/40* (2022.01)
*H04L 67/12* (2022.01)
*H04L 12/40* (2006.01)

(52) U.S. Cl.
CPC ...... *H04L 63/1425* (2013.01); *H04L 63/1466* (2013.01); *H04L 67/12* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 10,776,191 B2* | 9/2020 | Zheng | G06F 18/2433 |
| 11,471,113 B2* | 10/2022 | Palpanas | A61B 5/346 |
| 2022/0014422 A1* | 1/2022 | Gupta Hyde | H04W 24/02 |
| 2022/0398872 A1* | 12/2022 | Udipi | G07C 5/008 |

OTHER PUBLICATIONS

H. Lee, S. H. Jeong, and H. K. Kim, "OTIDS: a novel intrusion detection system for in-vehicle network by using remote frame," in Annual Conference on Privacy, Security and Trust, Aug. 2017, pp. 57-66.

S. Woo, H. J. Jo, and D. H. Lee, "A practical wireless attack on the connected car and security protocol for in-vehicle CAN," IEEE Transactions on Intelligent Transportation Systems, vol. 16, No. 2, pp. 993-1006, Apr. 2015.

(Continued)

*Primary Examiner* — Jeffrey R Swearingen
(74) *Attorney, Agent, or Firm* — Olive Law Group, PLLC

(57) ABSTRACT

Systems and methods of graph-based vehicular intrusion detection are disclosed. According to an aspect, an intrusion detection system includes a computing device configured to receive messages communicated on a vehicular communications network. The computing device also includes construct a set of graphs based on the received messages. Further, the computing device includes apply a graph-based anomaly detection technique to the set of graphs for identifying an anomaly among one or more of the received messages. The computing device also includes implement a predetermined action to mitigate an intrusion based on identification of the anomaly.

18 Claims, 60 Drawing Sheets

(56) References Cited

OTHER PUBLICATIONS

T. Hoppe, S. Kiltz, and J. Dittmann, "Security threats to automotive CAN networks-practical examples and selected short-term countermeasures," Reliability Engineering & System Safety, vol. 96, No. 1, pp. 11-25, 2008.
H. Ji, Y. Wang, H. Qin, X. Wu, and G. Yu, "Investigating the effects of attack detection for in-vehicle networks based on clock drift of ECUs," IEEE Access, vol. 6, pp. 49 375-49 384, 2018.
C. Lin and A. Sangiovanni-Vincentelli, "Cyber-security for the controller area network (CAN) communication protocol," In International Conference on Cyber Security, Dec. 2012, pp. 1-7.
K. Iehira, H. Inoue, and K. Ishida, "Spoofing attack using bus-off attacks against a specific ECU of the CAN bus," in EEE Annual Consumer Communications Networking Conference, Jan. 2018, pp. 1-4.
R. Islam and R. U. D. Refat, "Improving CAN bus security by assigning dynamic arbitration IDs," Journal of Transportation Security, Apr. 2020.
L. Akoglu, H. Tong, and D. Koutra, "Graph based anomaly detection and description: A survey," Data Mining and Knowledge Discovery, vol. 29, No. 3, pp. 626-688, May 2015.
N. Ye and Q. Chen, "An anomaly detection technique based on a Chi-square statistic for detecting intrusions into information systems," Quality and Reliability Engineering International, vol. 17, No. 2, pp. 105-112, 2001.
September A. Tomlinson, J. Bryans, and S. Ahmed Shaikh, "Towards viable intrusion detection methods for the automotive controller area network," in ACM Computer Science in Cars Symposium 2018.
W. Choi, H. J. Jo, S. Woo, J. Y. Chun, J. Park, and D. H. Lee, "Identifying ECUs using inimitable characteristics of signals in controller area networks," IEEE Transactions on Vehicular Technology, vol. 67, No. 6, pp. 4757-4770, Jun. 2018.
W. B. Ugoni A, "The Chi square test: an introduction," COM-SIG Review, vol. 4, No. 3, pp. 61-64, 1995.
J. H. Steiger, A. Shapiro, and M. W. Browne, "On the multivariate asymptotic distribution of sequential Chi-square statistics," Psychometrika, vol. 50, No. 3, pp. 253-263, Sep. 1985.
R. J. Tallarida and R. B. Murray, Chi-Square Test. New York, NY: Springer New York, 1987, pp. 140-142.
P. Meesad, P. Boonrawd, and V. Nuipian, "A Chi-square test for word importance differentiation in text classification," Proceedings of Computer Science and Information Technology, vol. 6, Jan. 2011.
S. Thaseen and C. A. Kumar, "Intrusion detection model using fusion of Chi-square feature selection and multi class SVM," Journal of King Saud University-Computer and Information Sciences, vol. 29, No. 4, pp. 462-472, 2017.
D. Kobayashi, O. Takahashi, H. Arioka, S. Koga, and T. Fukui, "A prediction rule for the development of delirium among patients in medical wards: Chi-square automatic interaction detector (chaid) decision tree analysis model," The American Journal of Geriatric Psychiatry, vol. 21, No. 10, pp. 957-962, 2013.
B. Brumback and M. Srinath, "A chi-square test for fault—detection in kalman filters," IEEE Transactions on Automatic Control, vol. 32, No. 6, pp. 552-554, Jun. 1987.
C. Ling and D. Feng, "An algorithm for detection of malicious messages on CAN buses," in National Conference on Information Technology and Computer Science, 2012.
W. Fu, X. Xin, P. Guo, and Z. Zhou, "A practical intrusion detection system for internet of vehicles," China Communications, vol. 13, No. 10, pp. 263-275, Oct. 2016.
A. Taylor, N. Japkowicz, and S. Leblanc, "Frequency-based anomaly detection for the automotive CAN bus," in World Congress on Industrial Control Systems Security, Dec. 2015, pp. 45-49.
M. Mter and N. Asaj, "Entropy-based anomaly detection for in-vehicle networks," in IEEE Intelligent Vehicles Symposium (IV), 2011, pp. 1110-1115.
M. Marchetti, D. Stabili, A. Guido, and M. Colajanni, "Evaluation of anomaly detection for in-vehicle networks through Information-theoretic algorithms," in International Forum on Research and Technologies for Society and Industry Leveraging a better tomorrow, Sep. 2016, pp. 1-6.
H. M. Song, H. R. Kim, and H. K. Kim, "Intrusion detection system based on the analysis of time intervals of CAN mes-sages for in-vehicle network," in International Conference on Information Networking, Jan. 2016, pp. 63-68.
M. Marchetti and D. Stabili, "Anomaly detection of CAN bus messages through analysis of ID sequences," in IEEE Intelligent Vehicles Symposium, Jun. 2017, pp. 1577-1583.
W. G. Cochran, "The $\chi 2$ test of goodness of fit," The Annals of Mathematical Statistics, vol. 23, No. 3, pp. 315-345, Sep. 1952.
H. Lee, S. H. Jeong, and H. K. Kim, "CAN dataset for intrusion detection," in HCRL, Oct. 2018.
C. Leys, C. Ley, O. Klein, p. Bernard, and L. Licata, "Detecting outliers: Do not use standard deviation around the mean, use absolute deviation around the median," Journal of Experimental Social Psychology, vol. 49, No. 4, pp. 764-766, 2013.
B. GmbH, "CAN specification version 2.0," 1991.
K.-T. Cho and K. G. Shin, "Fingerprinting electronic control units for vehicle intrusion detection," in Proceedings of the USENIX Conference on Security Symposium. USENIX Association, 2016, pp. 911-927.
G. Dupont, A. Lekidis, J. den Hartog, S. Etalle, "Automotive controller area network (CAN) bus intrusion dataset v2," https://data.4tu.nl/art icles/dataset/ Automotive_Cont roller_Area _Network _CAN_Bus_Intrusion_Datasetfl2696950/2.
N. H. T. S. Administration. "Vehicle cybersecurity," https://www.nhtsa.gov/technology-innovation/vehicle-cybersecurity.
S. J. V. Tanksale, "Intrusion detection for controller area network using support vector machines," IEEE International Conference on Mobile Ad Hoc and Sensor Systems Workshops, IEEE, 2019, pp. 121-126.
H.M. Song, J. Woo, H.K. Kim. "In-vehicle network intrusion detection using deep convolutional neural network," Veh. Commun. 21 (2020) | 00198.
R.E. Corporation, "In-vehicle networking solutions," https: //www.renesas.com/US/en/solutions/automotive/technology/networking-solutions.html.
K. Koscher. A. Czeskis, F. Roesner. S. Patel, T. Kohno, S. Checkoway, D. McCoy, B. Ka nt or , D. Anderson, H. Shacham, S. Savage, "Experimental security analysis of a modern automobile," IEEE Symposium on Security and Privacy, 2010, pp. 447-462.
S. Jeong, B. Jeon, B. Chung, H.K. Kim, "Convolutional neural network-based intrusion detection system for AVTP streams in automotive ethernet-based networks," Veh. Commun. 29 (2021) 100338, https:/fdoi.org/10.1016/j.vehcom.2021.100338, https://www.sciencedirect.com/science/article/pii/www.sciencedirect.com/science/article/pii/S2214209621000073.
C. Miller, C. Valasek , "Remote exploitation of an unaltered passenger vehicle," Black Hat USA 2015 (2015) 91.
S. Checkoway, D. McCoy, B. Kantor, D. Anderson. H. Shacham, S. Savage, K. Kosher, A. Czeskis, F. Roesner, T. Kohno, "Comprehensive experimental analyses of automotive attack surfaces," Proceedings of the USENIX Conference on Security, 2011. p. 6.
M.R. Moore, R.A. Bridges, F.L. Combs, M.S. Starr, S.J, Prowell, "Modeling inter-signal arrival times for accurate detection of CAN bus signal injection attacks: a data-driven approach to in-vehicle intrusion detection," Proceedings of the Annual Conference on Cyber and Information Security Research, 2017, p. p. 1-4.
A. Zhou. Z. Li, Y. Shen, "Anomaly detection of CAN bus messages using a deep neural network for autonomous vehicles," Ap pl. Sci. 9 (15 ) (2019 ).
H. Qin, M. Yan, H. Ji, "Application of controller area network (CAN) bus anomaly detection based on time series prediction," Veh. Commun. 27 (2021) 100291, https://doi.org/10.1016 /j.vehcom. 2020.100291, https: //www.sciencedirect.com/science/article/pii/ S2214 209620300620.
M. Han, P. Cheng, S. Ma, "PPM-InVIDS: privacy protection model for in-vehicle intrusion detection system based complex-valued neural network," Veh. Com-mun. 31 (2021) 100374, https: //doi.

(56) References Cited

OTHER PUBLICATIONS org/10.1016/j.vehcom.2021.100374, https://www w.sciencedirect.com /science/article/pii/S2214209621000437.

E. Seo, H.M. Song, H.K. Kim, "GIDS: GAN based intrusion detection system for in-vehicle network," 2018 16th Annual Conference on Privacy, Security and Trust. PST, 2018, pp. 1-6.

V. Verendel, D.K. Nilsson, U. E. Larson , E. Jonsson, "An approach to using honeypots in in-vehicle networks," IEEE Vehicular Technology Conference, 2008, pp. 1-5.

S. Tariq, S. Lee, H.K. Kim, S.S. Woo, "CAN-ADF: the controller area network attack detection framework," Comput. Secur. 94 (2020) 101857, https://doi.org/10.1016/j.cose.2020.101857, https://www.sciencedirect.com/science/article / pii/S0167404820301292.

O. Minawi, J. Whelan, A. Almehmadi, K. El-Khatib, "Machine learning-based intrusion detection system for controller area networks," Proceedings of the ACM Symposium on Design and Analysis of Intelligent Vehicular Networks and Applications, DIVANet '20, Association for Computing Machinery, New York, NY, USA, 2020, pp. 41-47.

M.D. Hossa in, H. Inoue. H. Ochiai. D. Fa Il, Y. Kadobayashi, "LSTM-based intrusion detection system for in-vehicle CAN bus communications," IEEE Access 8 (2020) 185489-185502, https://doi.org/10.1109/ACCESS.2020.3029307.

L Wang, X. Liu, "Secure cooperative communication scheme for vehicular heterogeneous networks," Veh. Commun. 11 (2018) 46-56, https://doi.org/10.1016/j.vehcom.2018.01.001, https://www.sciencedirect.com/science/ article/ pii/S2214209617301547.

R. Islam, R. U. D. Refat, S. M. Yerram and H. Malik, "Graph-Based Intrusion Detection System for Controller Area Networks," IEEE Transactions on Intelligent Transportation Systems, vol. 23, No. 3, pp. 1727-1736, Mar. 2022, doi: 10.1109/TITS.2020.3025685.

R. Gu, S. Zhang, Y. Ji, Z. Yan, "Network slicing and efficient ONU migration for reliable communications in converged vehicular and fixed access network," Veh. Commun. 11 (2018) 57-67, https://doi.org/10.1 016/j.vehcom.2018.01.003, https://www.sciencedirect.com/science/article/pii/S2214209617301584.

S. Vellampalli. W. Eberle, "Novel graph based anomaly detection using background knowledge," The International Flairs Conference, 2017.

S. Velampalli, L Mookiah, W. Eberle, "Discovering suspicious patterns using a graph based approach," The International Flairs Conference, 2019.

H. Ueda, R. Kurachi. H. Takada. T. Mizutani, M. Inoue, S. Horihata, "Security authentication system for in-vehicle network," SEI Tech. Rev. 81 (2015) 5- 9.

Studnia, V. Nicomette, E. Alata, Y. Desearte, M. Kaaniche, Y. Laarouchi, "Survey on security threats and protection mechanisms in embedded automotive networks," Annual IEEE/IFIP Conference on Dependable Systems and Networks Workshop, 2013, pp. 1-12.

P. Carsten, T.R. Andel, M. Yampolskiy, J.T. McDonald, S. Russ, A system to recognize intruders in controller area network CAN, International Symposium for ICS & SCADA Cyber Security Research. 2015. pp. 111-114.

A. Boudguiga, W. Klaudel, A. Boulanger, P. Chiron, "A simple intrusion detection method for controller area network," IEEE International Conference on Communications, 2016, pp. 1-7.

J. Staggs, "How to Hack Your Mini Cooper: Reverse Engineering CAN Messages on Passenger Automobiles," Institute for Information Security, 2013.

L Page, S. Brin, R. Motwani, T. Winograd, "The pagerank citation ranking: bring-ing order to the web," Tech. Re p., Stanford InfoLab, 1999.

G.H. John, P. Langley, "Estimating continuous distributions in Bayesian classifiers," arXiv preprint, arXiv:1302.4964.

Breiman, "Random forests," Mach. Learn. 45 (2001) 5-32.

D.M. Powers, "Evaluation: from precision. recall and f-measure to roc, informedness, markedness and correlation," arXiv preprint, arXiv:2010.16061.

DeepAI, "Feature reduction," https://deepai.org/machine-learning-glossary-and-terms/feature-reduction.html.

T. Jordan, "How hardware security modules enable AUTOSAR," Jun. 24, 2018, https://www.embedded.com/how-hardware-security-modules-enable-autosar/.

A. Barber, "Prevent automotive counterfeiting with secure authentication," Jan. 22, 2020, https://www.electronicdesign.com/markets/automotive/article/21121143/maxim-integrated-prevent-automotive-counterfeiting-with-secure-authentication.

R. Islam and M. K. Devnath and M. D. Samad and S. M. J. Kadry, "GGNB: Graph-based Gaussian naive Bayes intrusion detection system for CAN bus," Vehicular Communications, 2022.

* cited by examiner

SYSTEMS AND METHODS OF GRAPH-BASED VEHICULAR INTRUSION DETECTION

CROSS REFERENCE TO RELATED APPLICATION

This application claims priority to U.S. Provisional Patent Application No. 63/172,293, filed Apr. 8, 2021, and titled GRAPH-BASED INTRUSION DETECTION SYSTEM FOR VEHICULAR NETWORKS, the content of which is incorporated herein by reference in its entirety.

TECHNICAL FIELD

The presently disclosed subject matter relates generally to network intrusion detection. Particularly, the presently disclosed subject matter relates to systems and methods of graph-based vehicular intrusion detection.

BACKGROUND

Autonomous or self-driving vehicles are cars or trucks for which human interaction is not needed in driving. Also known as driverless vehicles, they are equipped with various types of sensors, actuators, a high-performance computing system, and software. Although a fully autonomous car is still not a reality, the demand for partially autonomous cars with various levels of self-automation is very high. It seems that the successful development of a fully autonomous vehicle will significantly change the world's overall transportation system and economy. Hypothetically, it will provide more safety and reduce the accident rate, as every year many accidents occur only because of mistakes made by the human driver. In addition, an autonomous vehicle can be considered very advantageous for a disabled person. To turn the dream into a reality, all the original equipment manufacturers (OEMs) are working on this technology, and it is hoped that the highest level of autonomous features will be experienced within the next several years.

However, a key consideration for autonomous vehicles should be providing protection against cyber attackers. As the autonomous vehicle will entirely depend on the software, sensors, and third-party signals to operate, one can expect that it will catch the attention of hackers. The impact of cyber or physical attacks performed by intruders can include the disclosure of vehicle or driver information like location, gender, number of passengers currently riding, etc. In order to provide safety, it is important to establish a strong protection mechanism not only in vehicle-to-vehicle communication but also in intra-vehicle communication. For an autonomous vehicle, both the inter-vehicle and intra-vehicle communications are controlled by electronic control units (ECUs). ECUs are referred to as the brain of the self-driving car and are responsible for taking real-time decisions, so it is important that they exchange information among themselves over a secured communication channel.

For the intra-vehicle communication channel, controller area network (CAN) technology is considered the de facto standard among the car embedded systems. However, the CAN protocol currently has some serious security breaches in its core. The protocol actually works similar to a broadcasting system, in that it contains no mechanism for checking the identity of the sender. Some efforts have been made to provide solutions to increase the security of the CAN bus. Most of them work for a certain type of attack situation.

Several researchers have proposed different solutions for defending against cyberattacks in a vehicular system. An attack can be performed through either a weak or a strong agent. A weak agent can spoof the CAN bus by injecting messages with high priority (ID 0000, denial of service (DoS) attack) or with any arbitrationID (spoofing or Fuzzy attack). On the other hand, a strong agent may use two attackers at the same time to perform attacks. In that case, one attacker tries to suspend the targeted ECU's communication and the other attacker sends a CAN bus message with the targeted ECU's arbitration ID.

In view of the foregoing, there is a continuing need for improved systems and techniques for intrusion detection in vehicles.

BRIEF DESCRIPTION OF THE DRAWINGS

Figure 1:
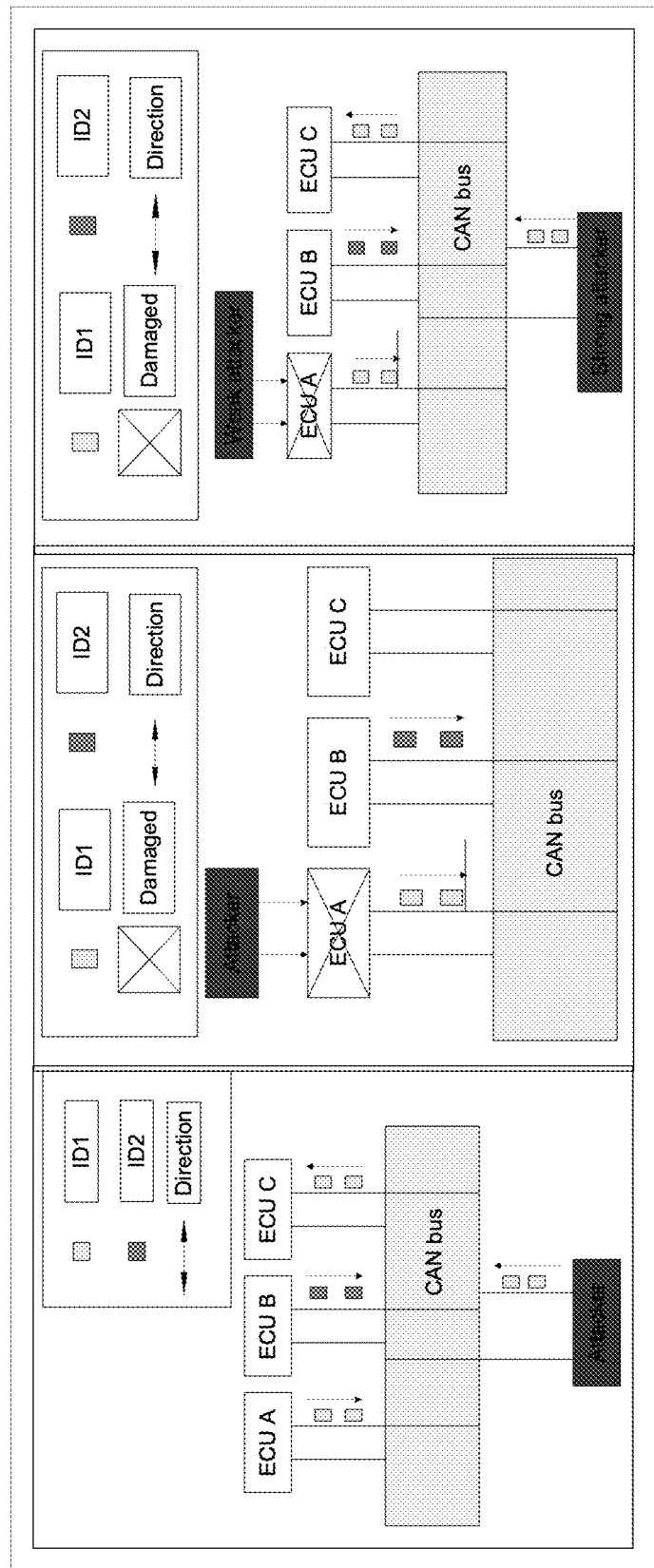
Figure 2:
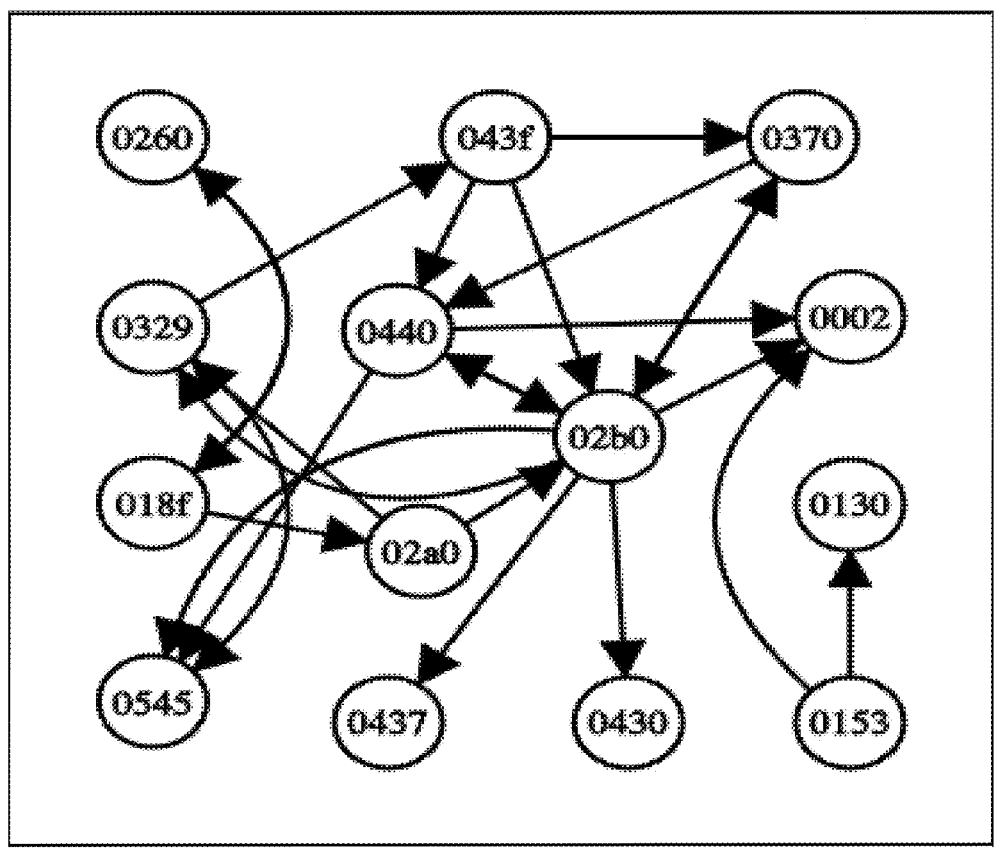
Figure 3A:
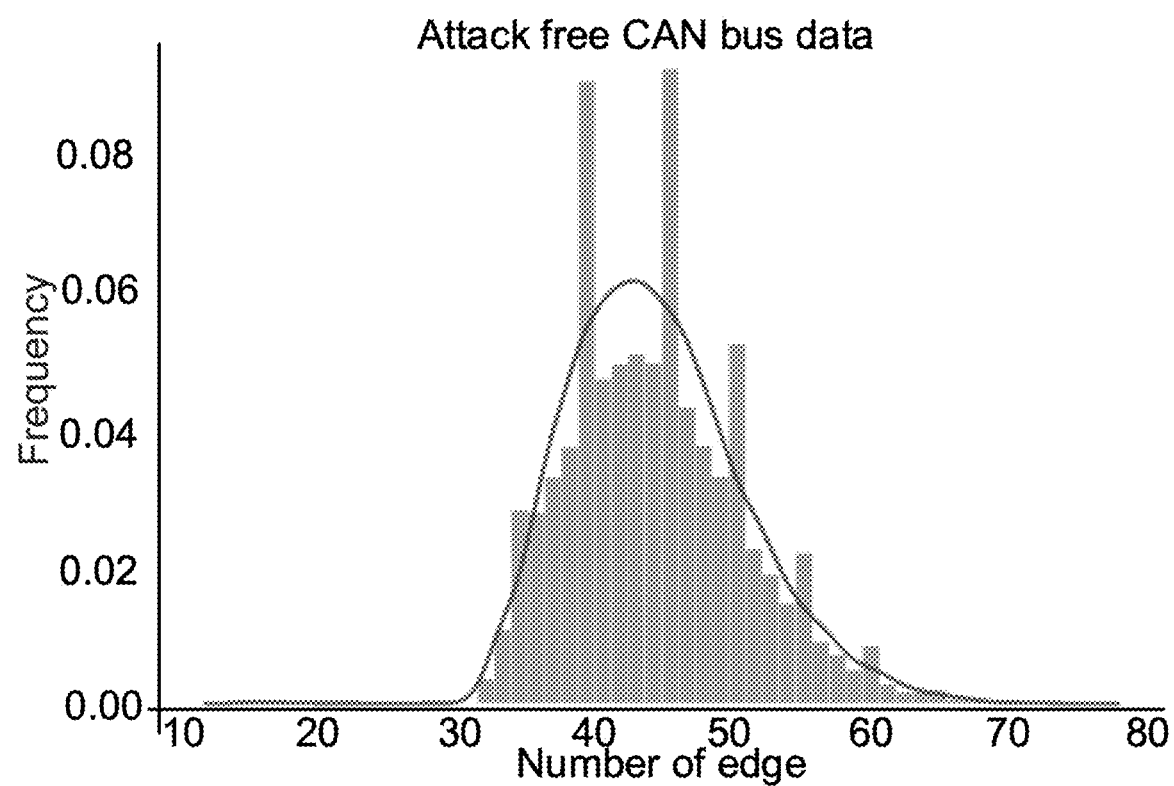
Figure 3B:
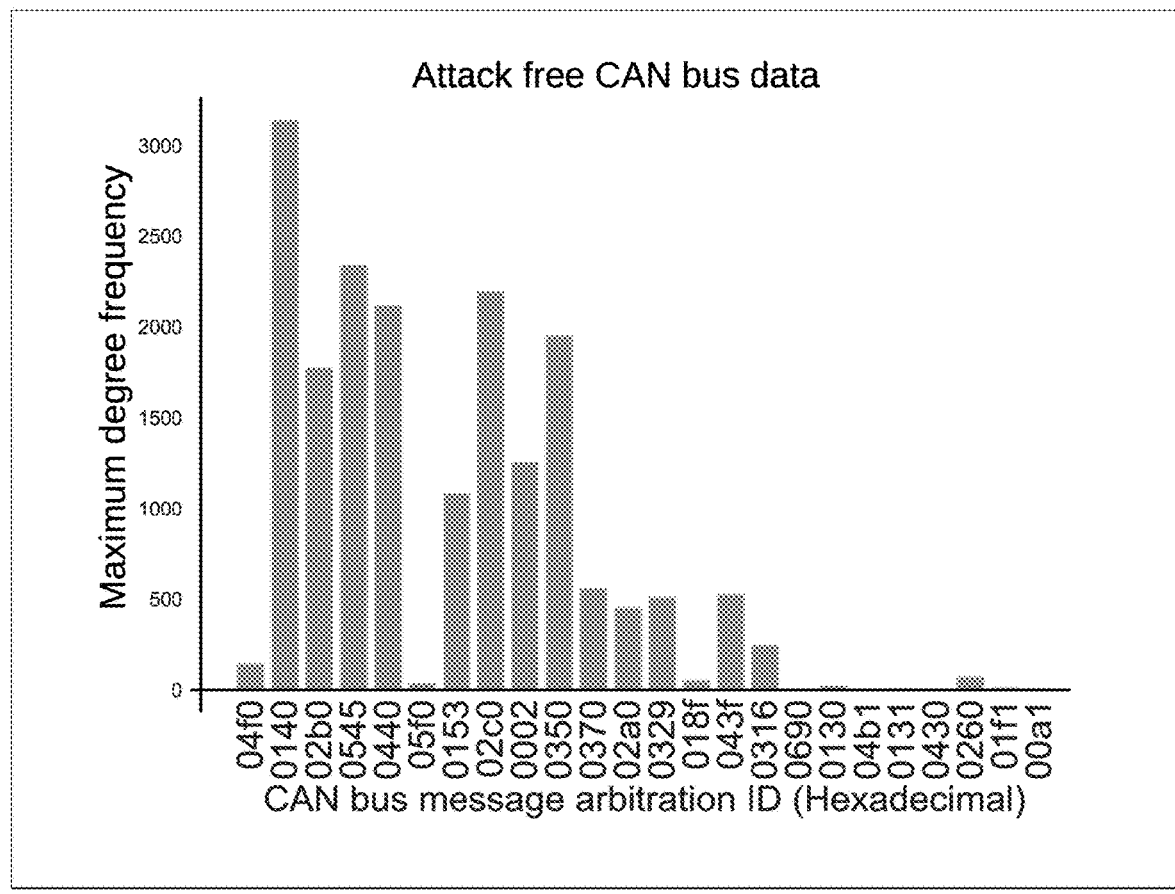
Figure 4A:
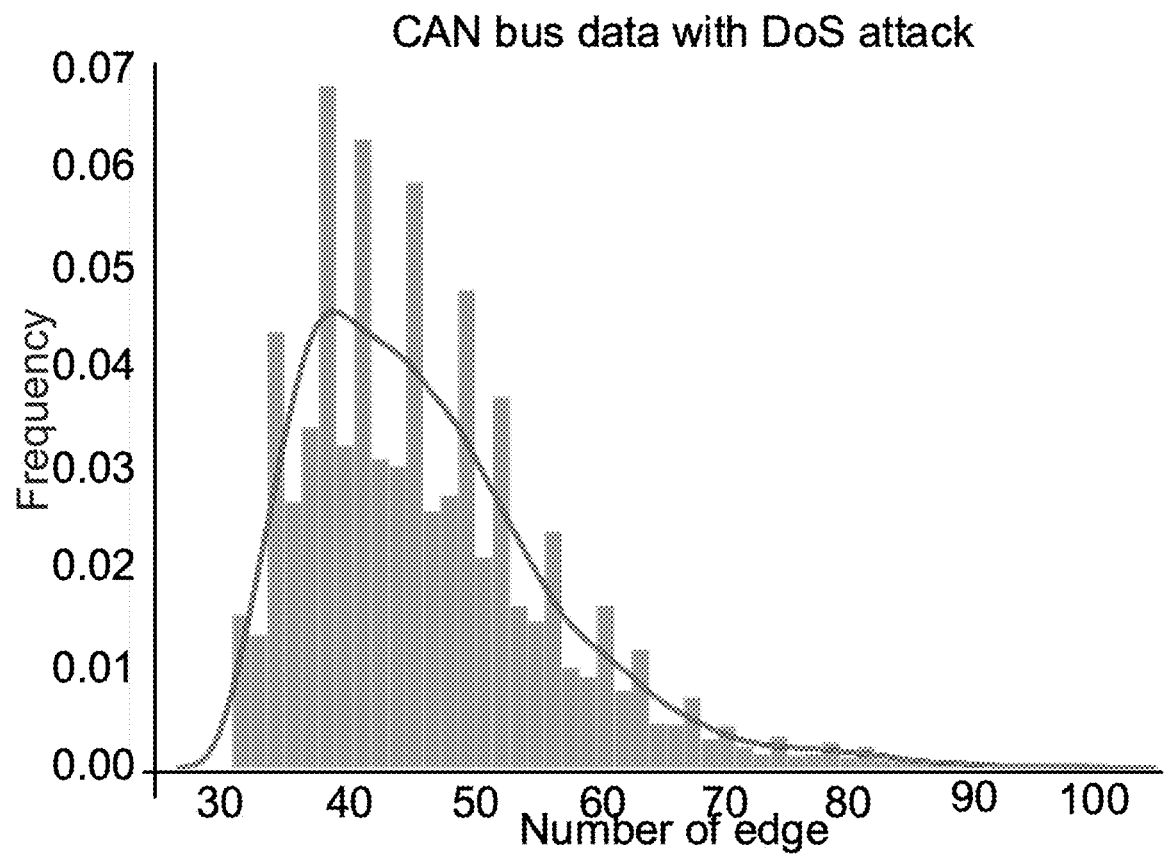
Figure 4B:
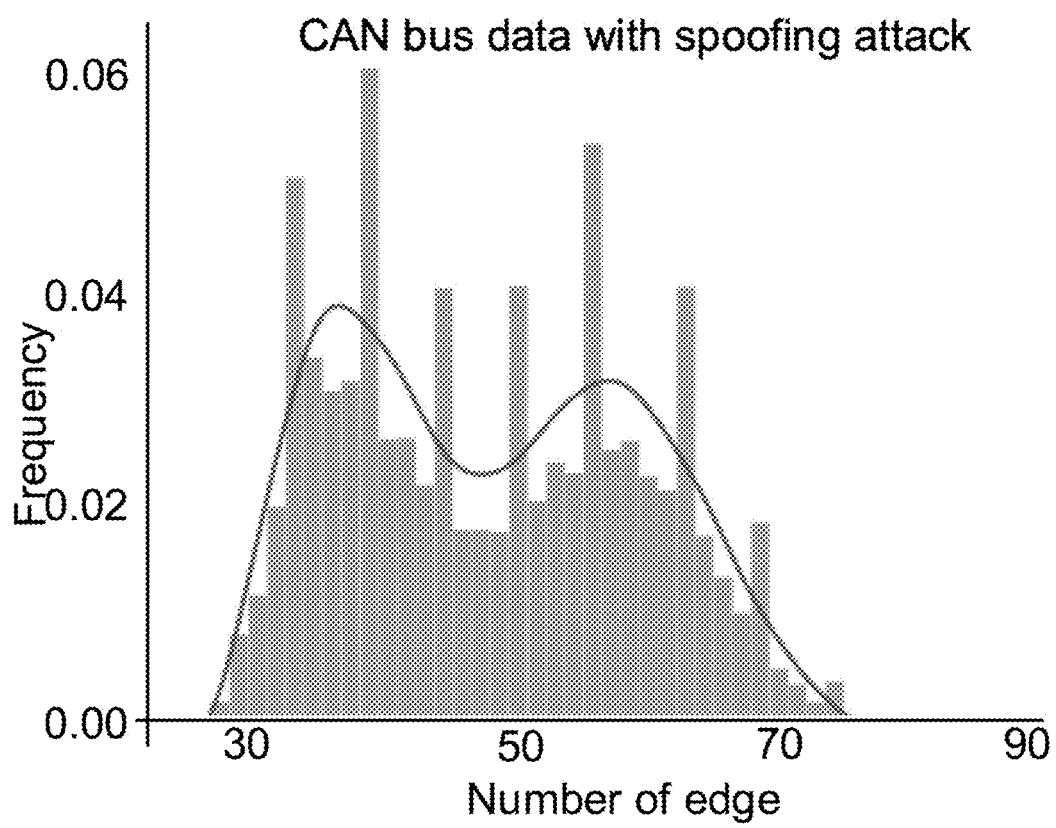
Figure 4C:
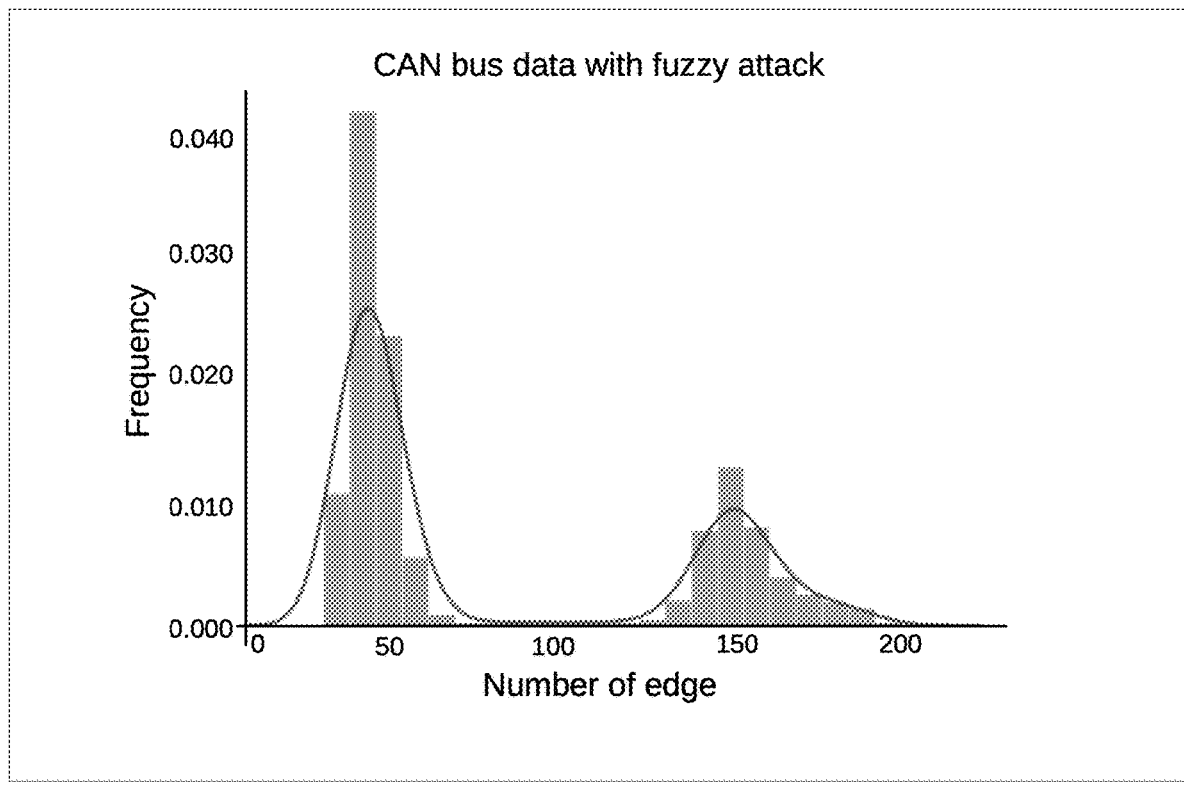
Figure 4D:
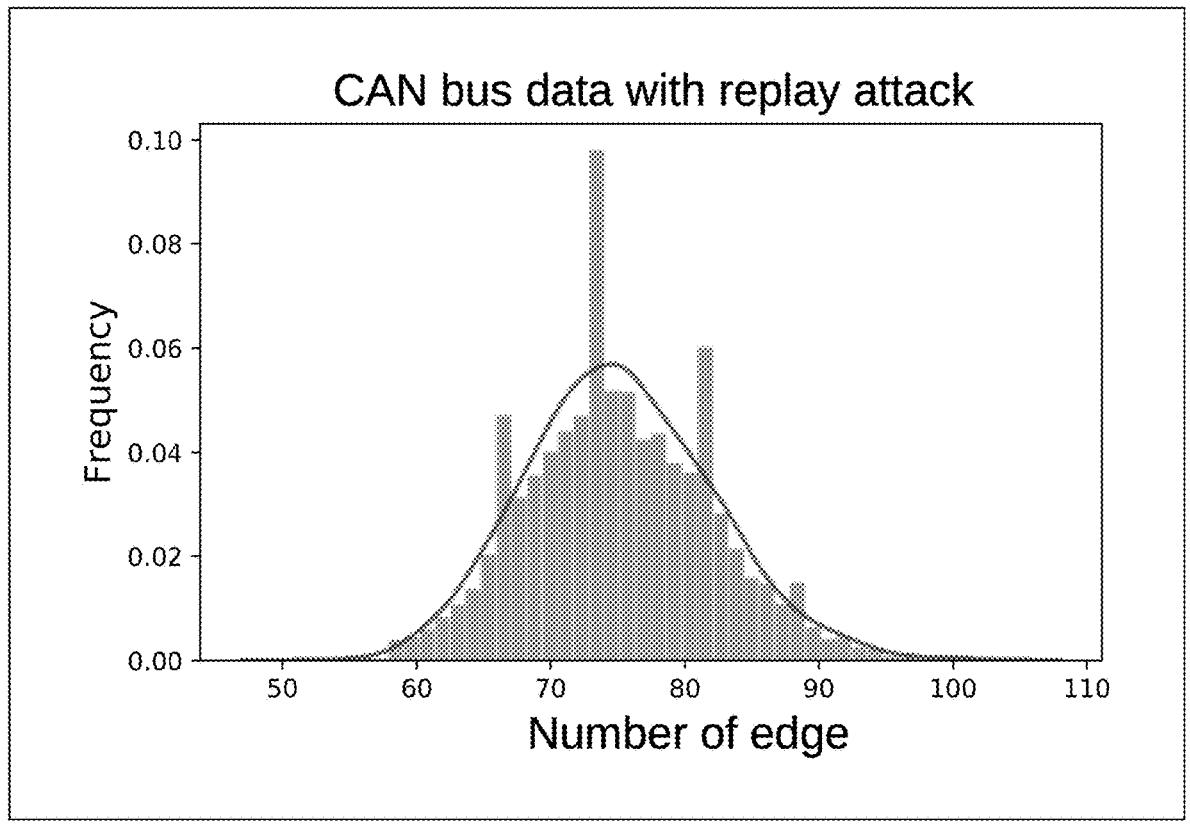
Figure 5A:
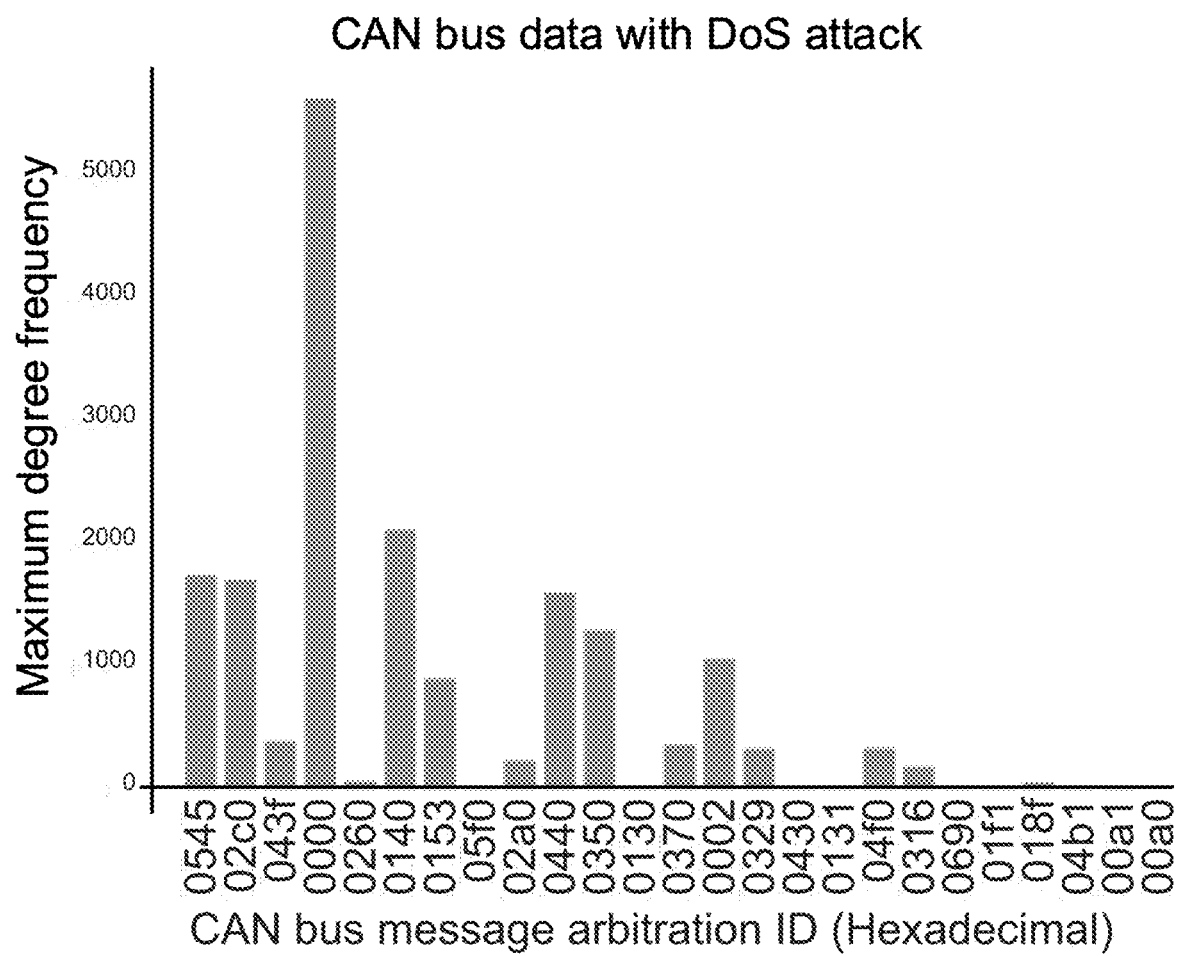
Figure 5B:
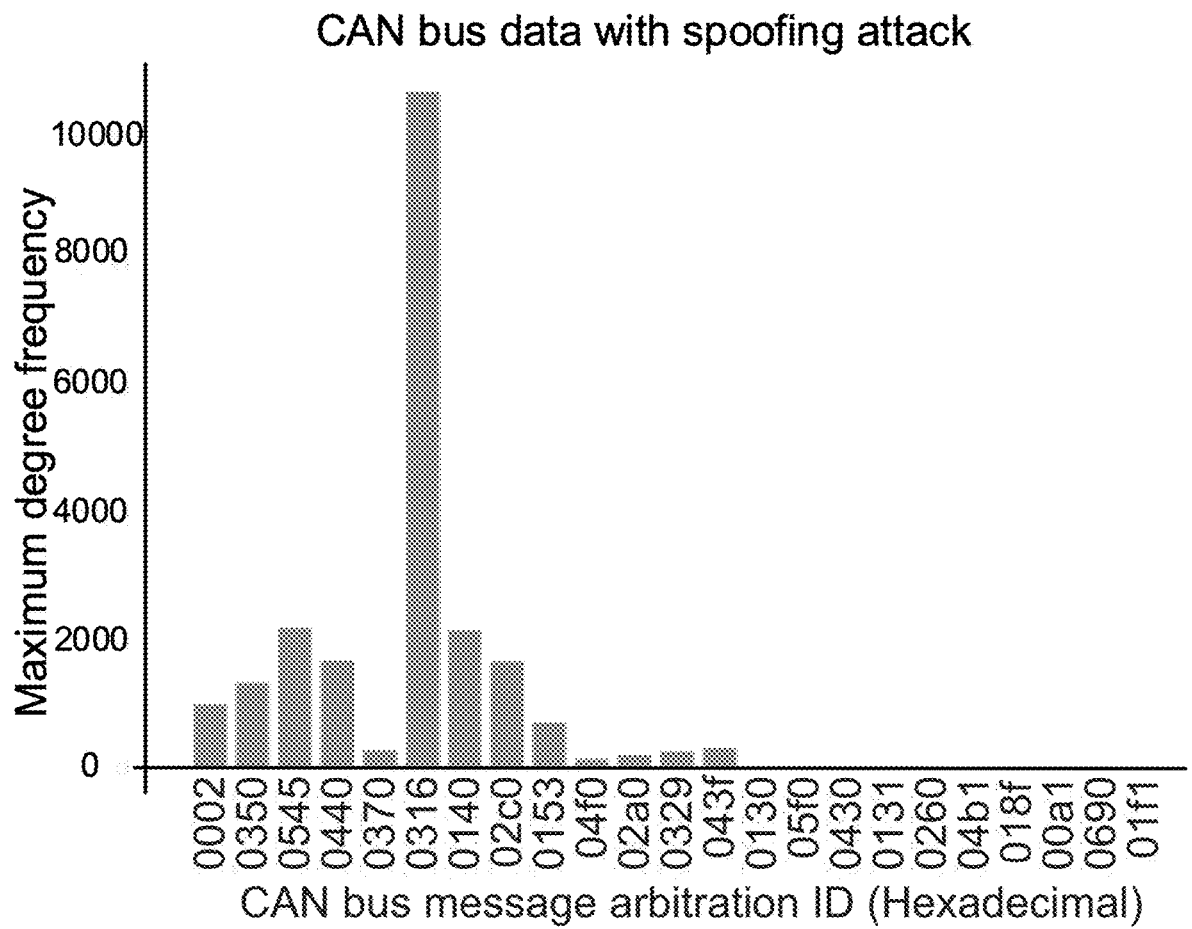
Figure 5C:
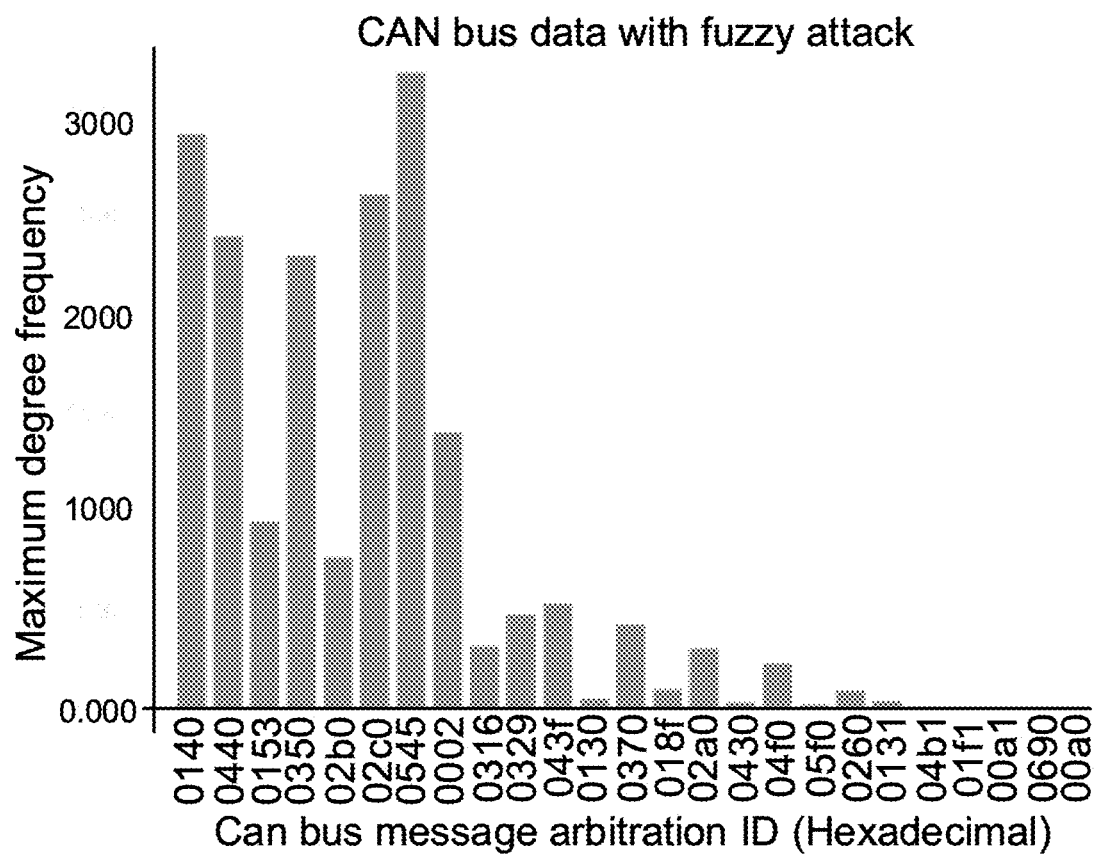
Figure 5D:
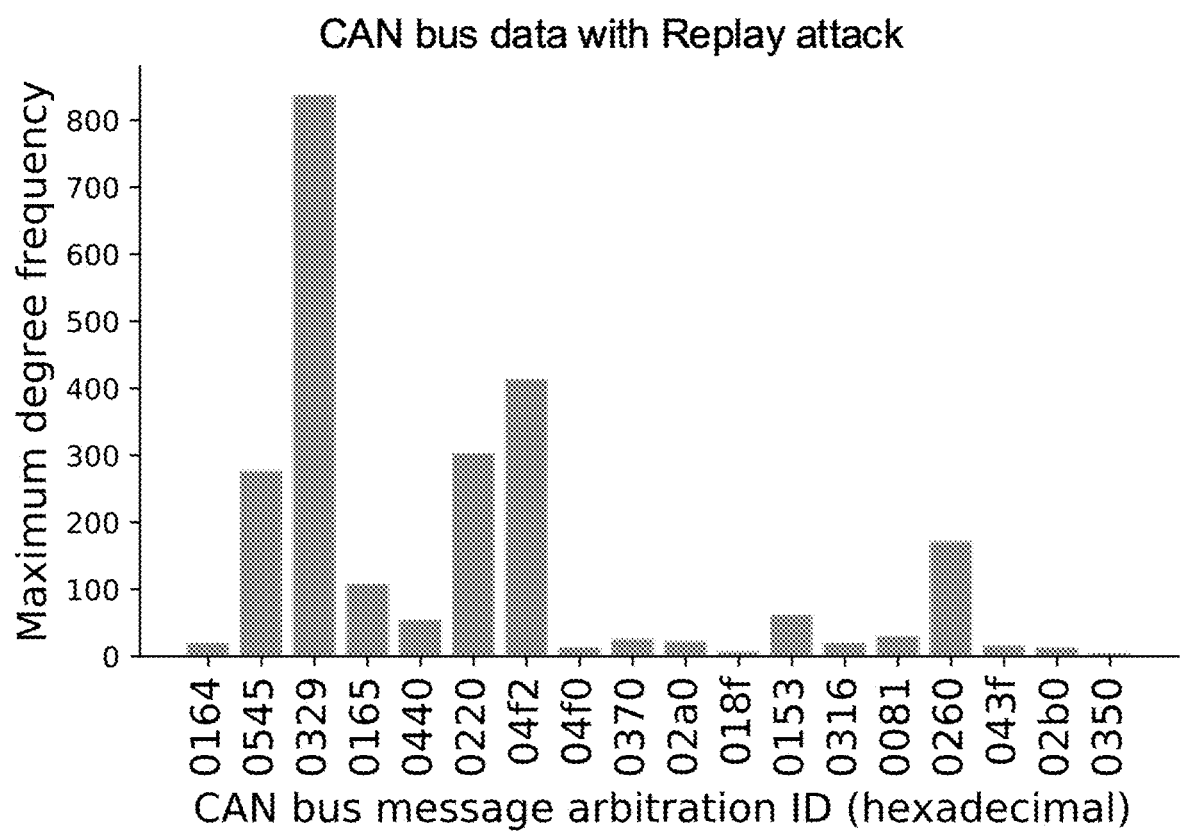
Figure 6A:
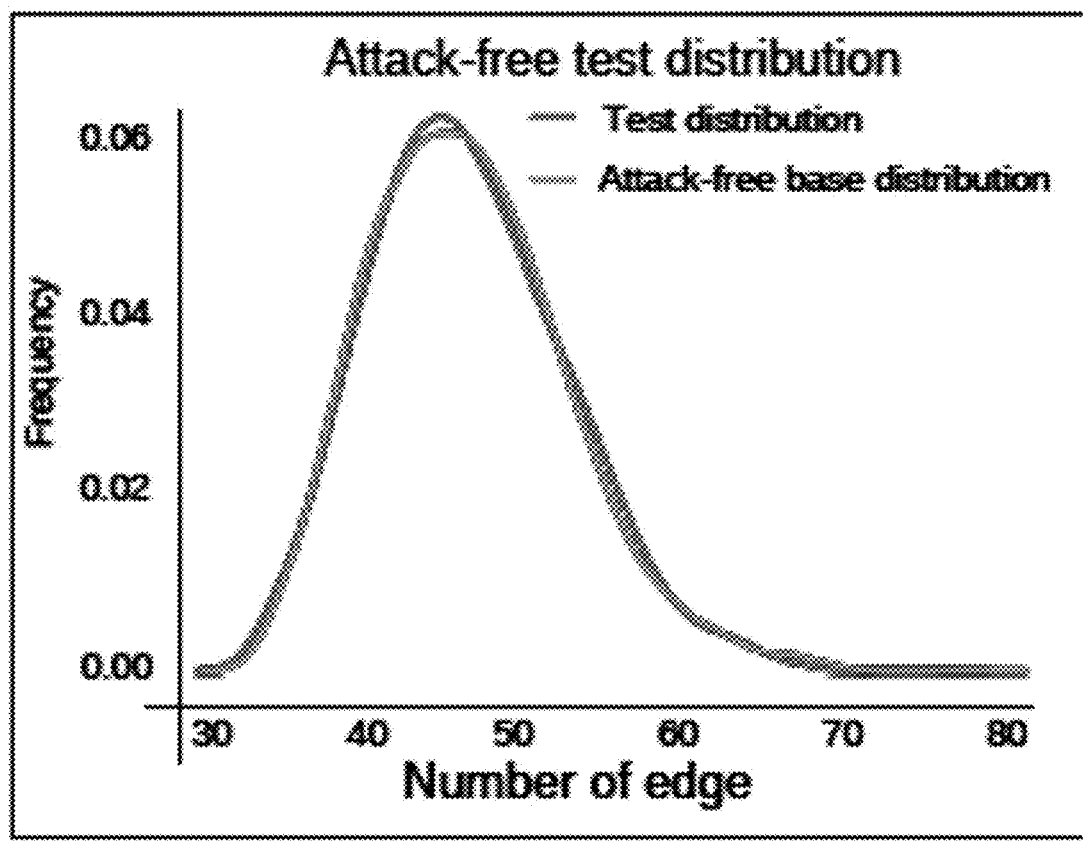
Figure 6B:
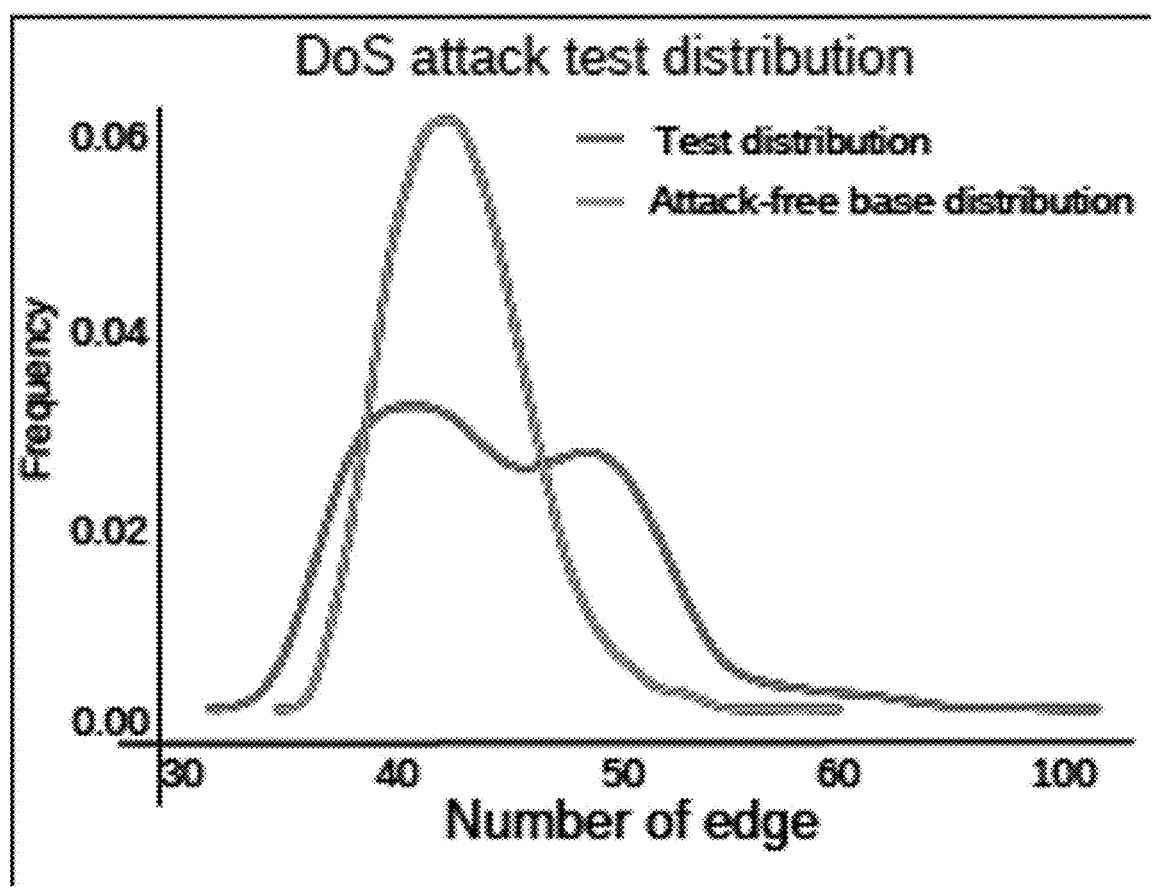
Figure 6C:
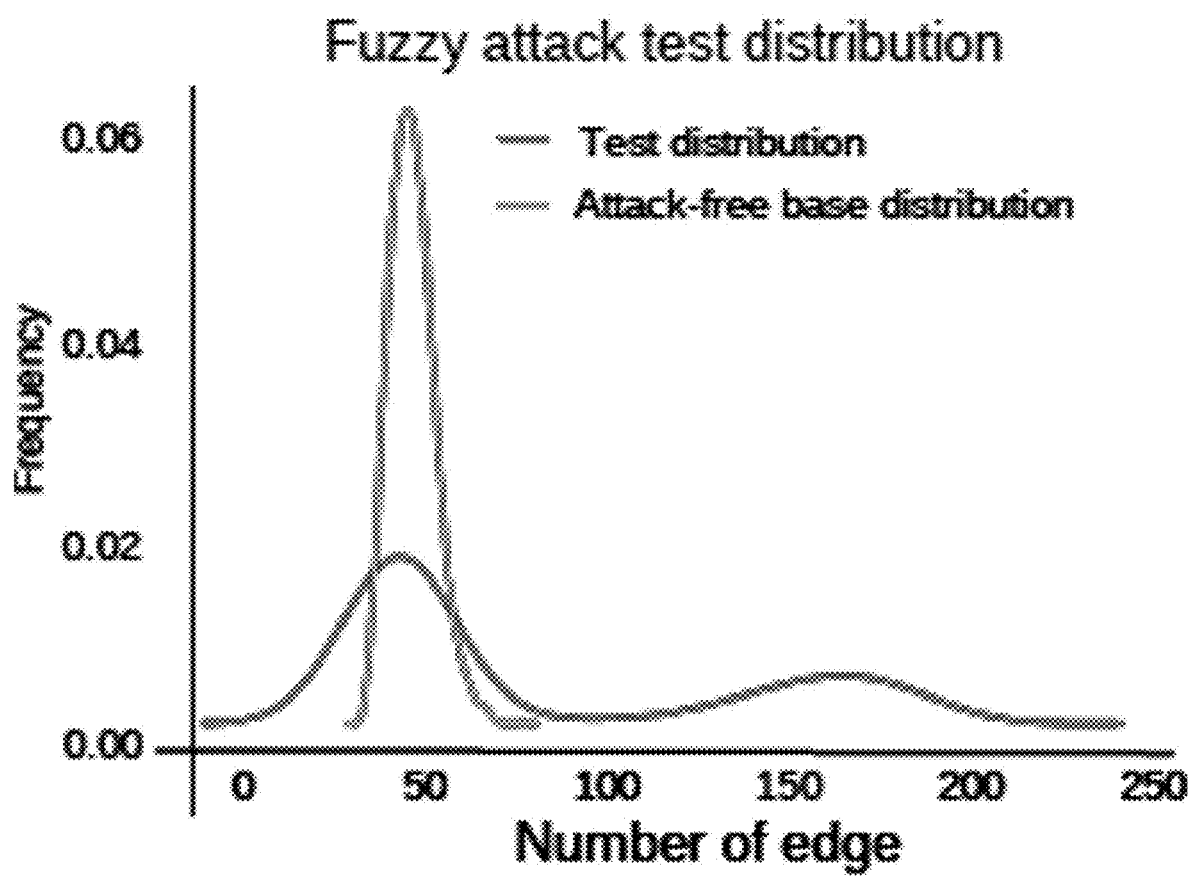
Figure 6D:
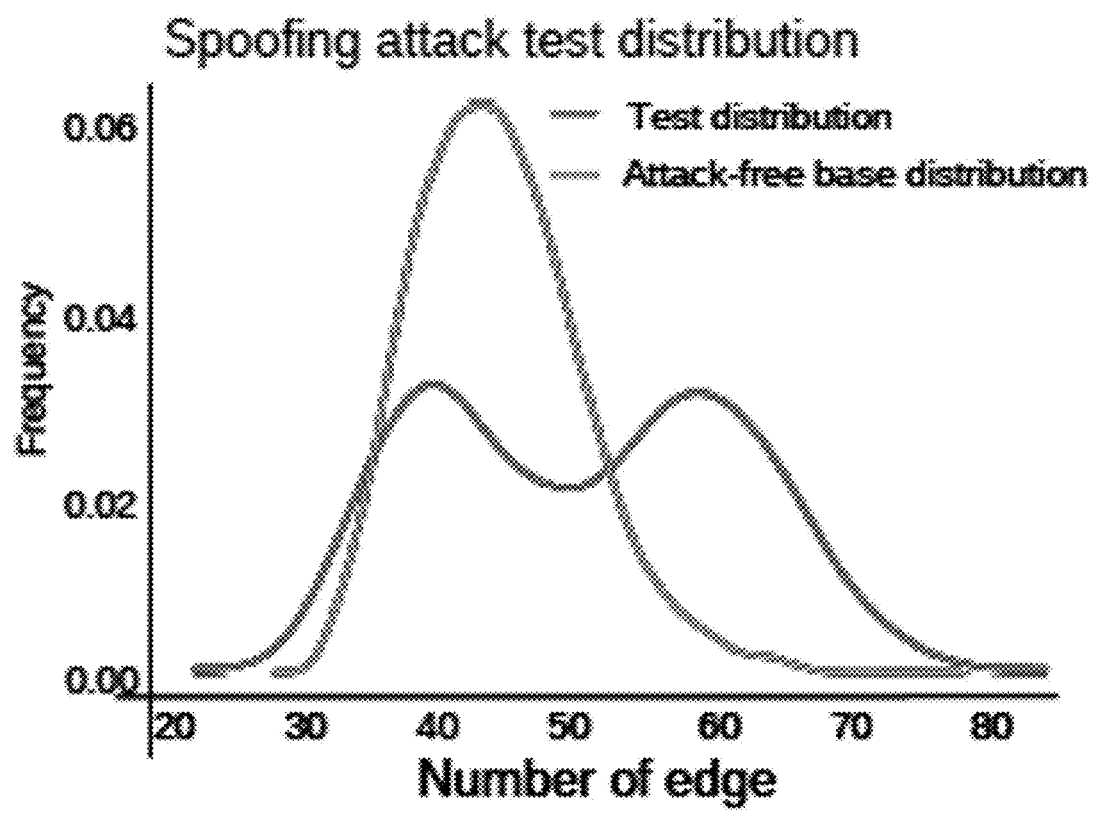
Figure 8A:
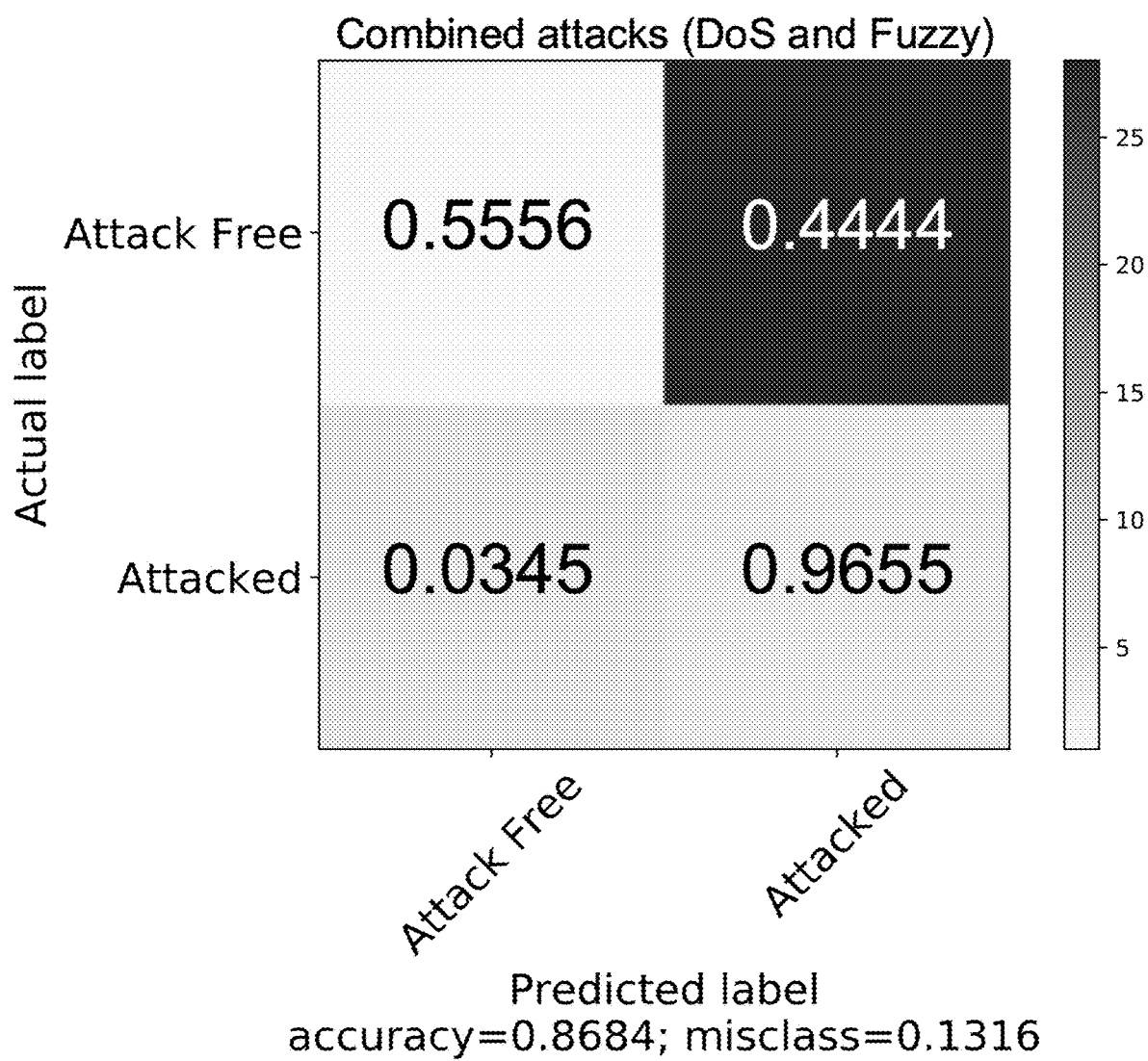
Figure 8B:
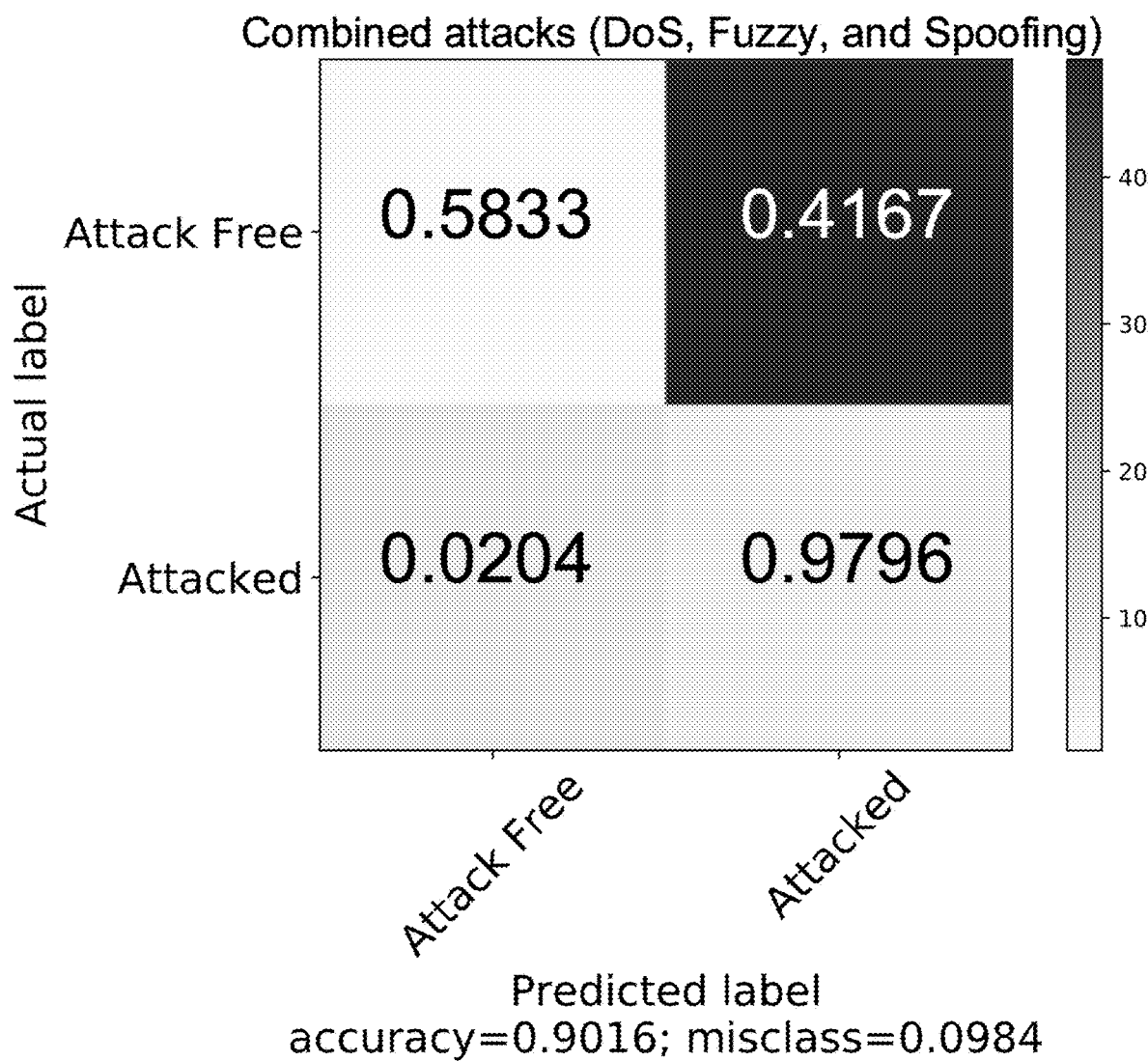
Figure 10A:
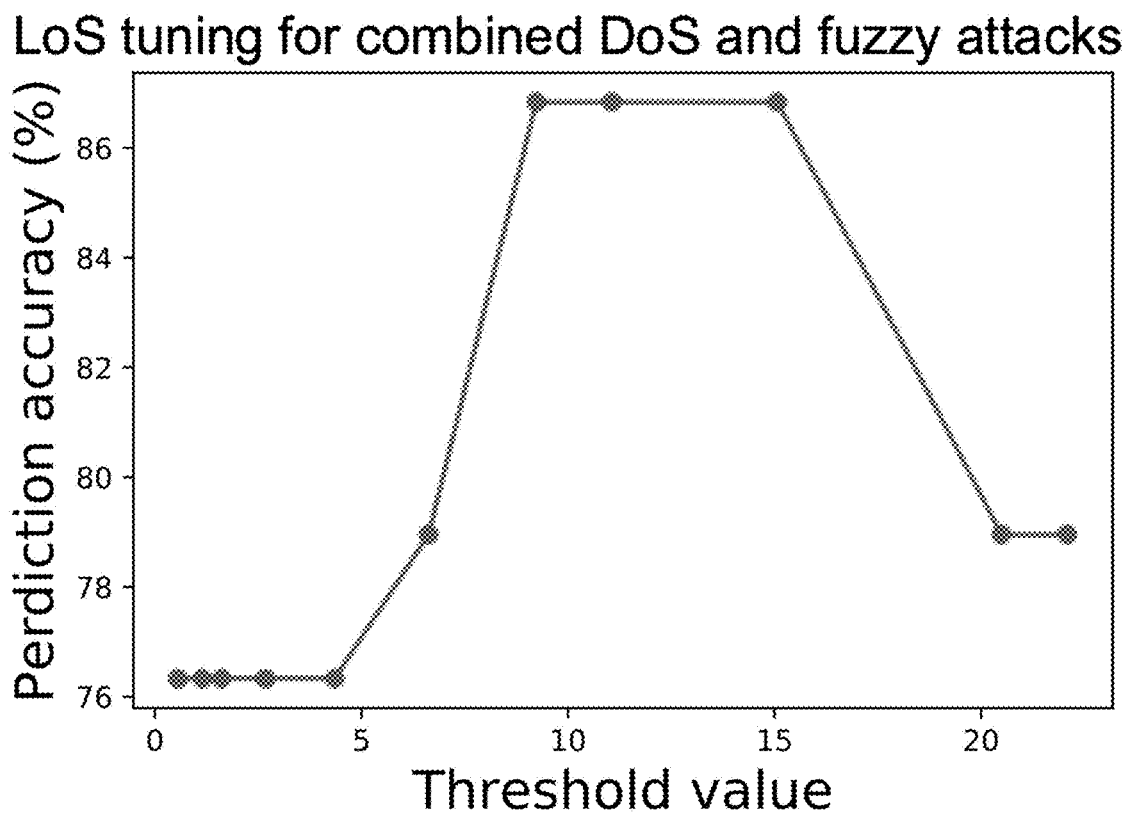
Figure 10B:
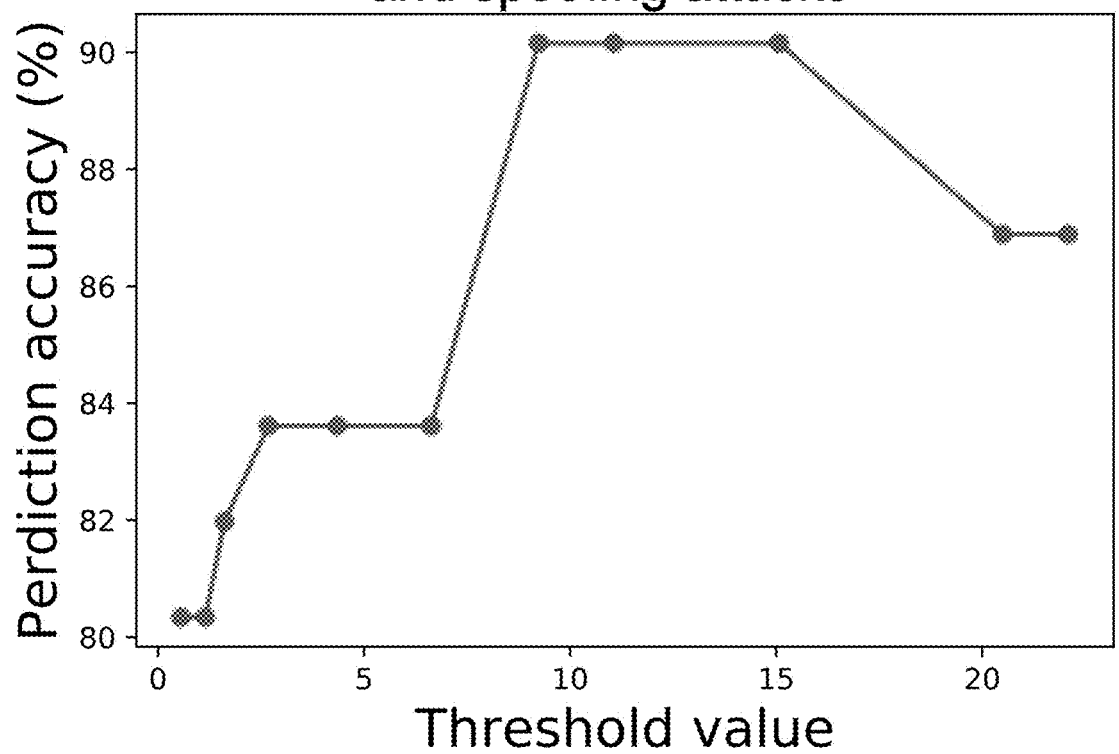
Figure 11:
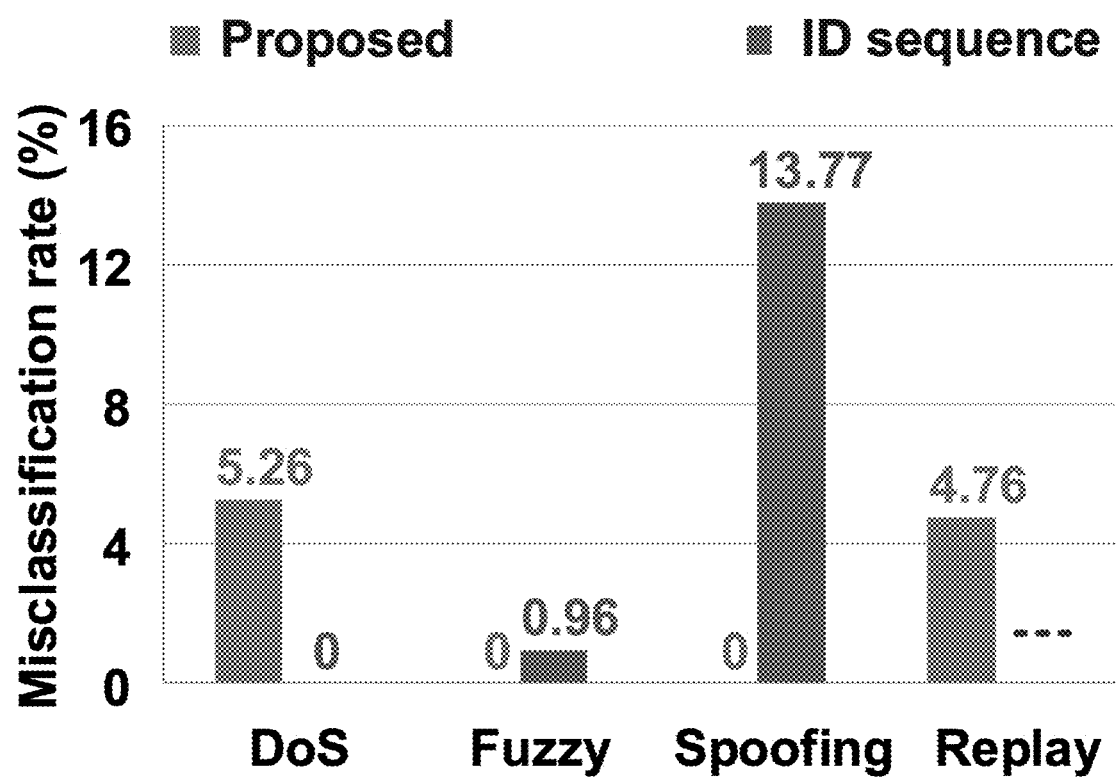
Figure 12:
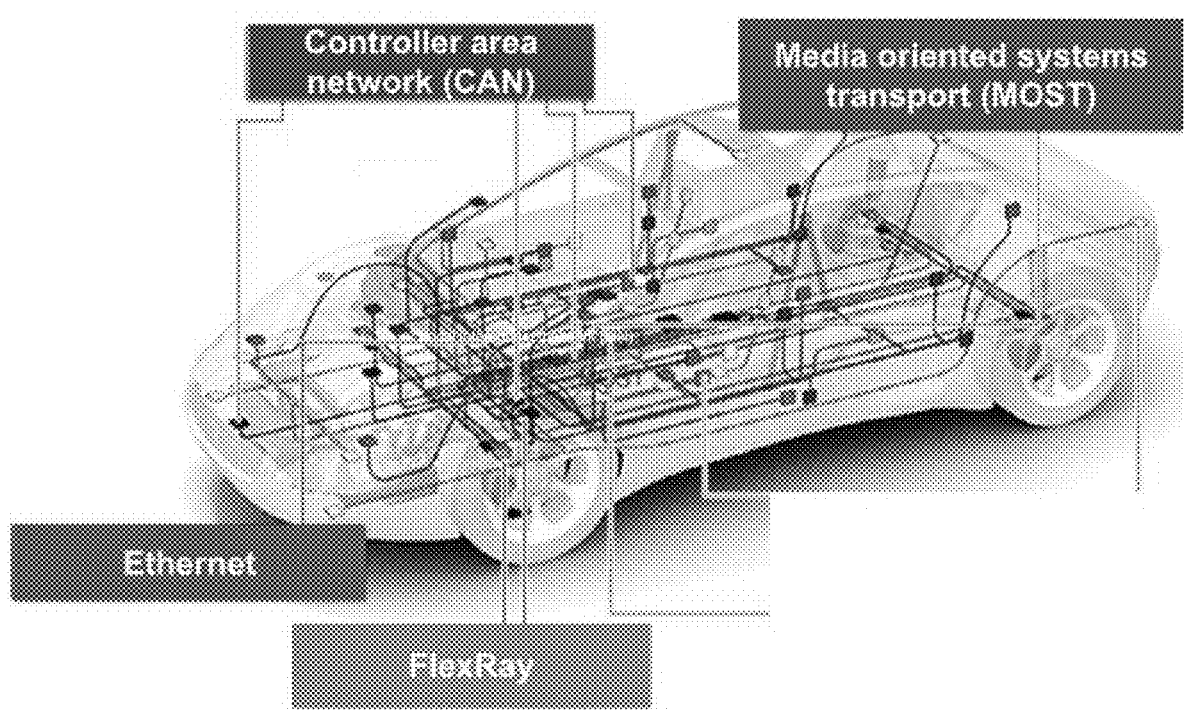
Figure 13:
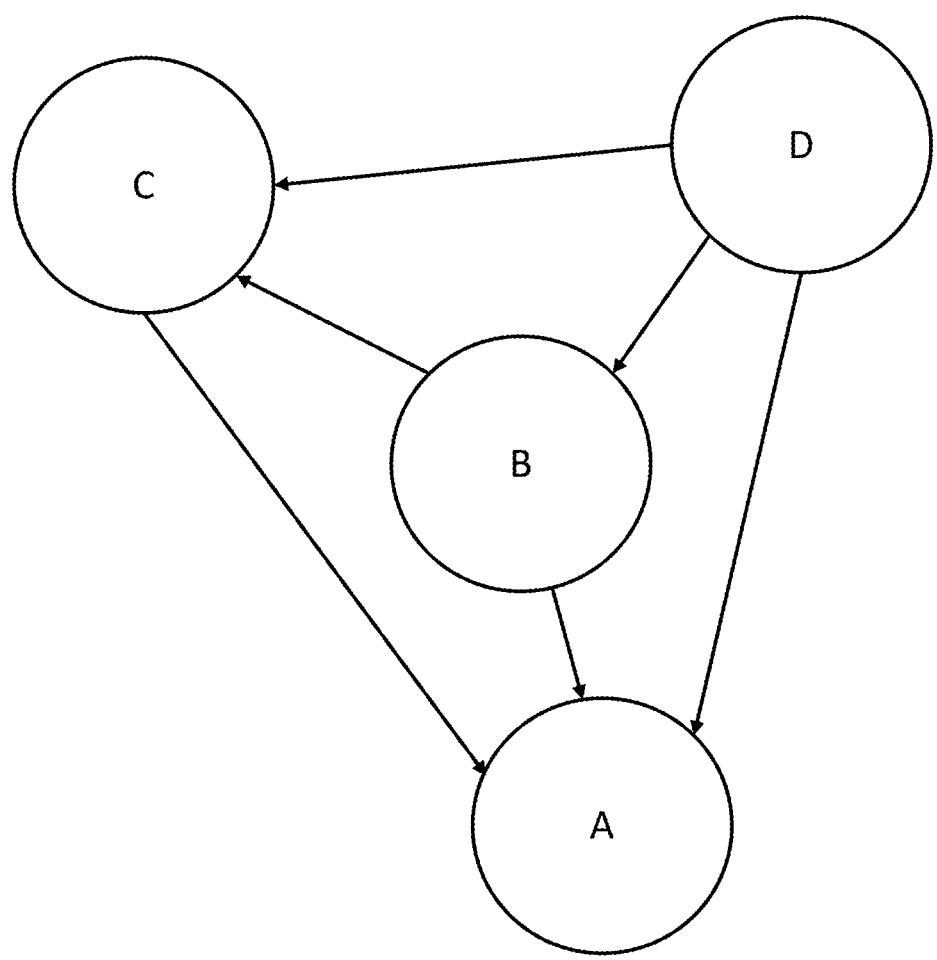
Figure 14A:
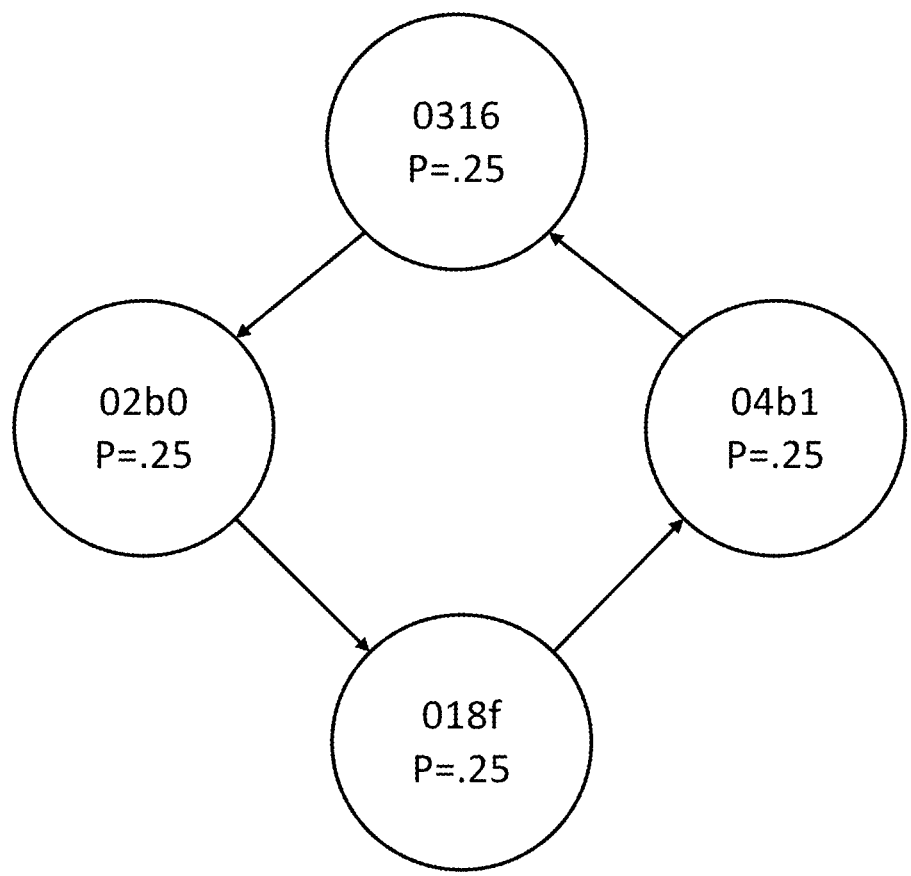
Figure 14B:
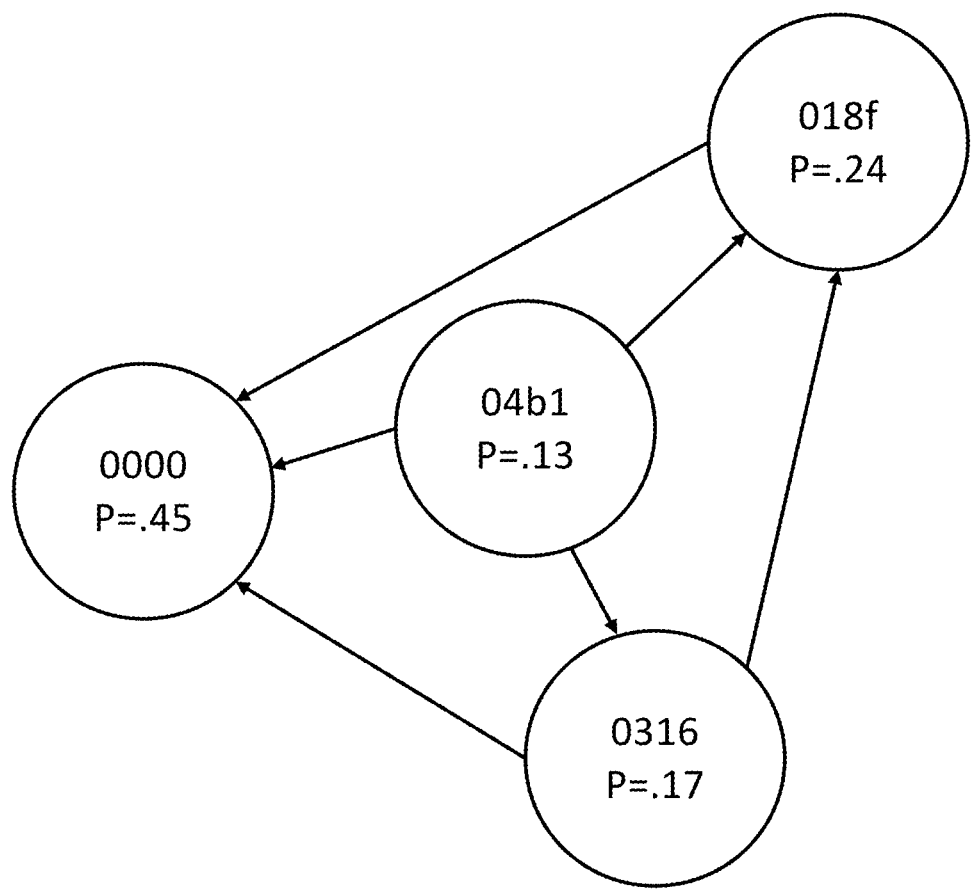
Figure 15A:
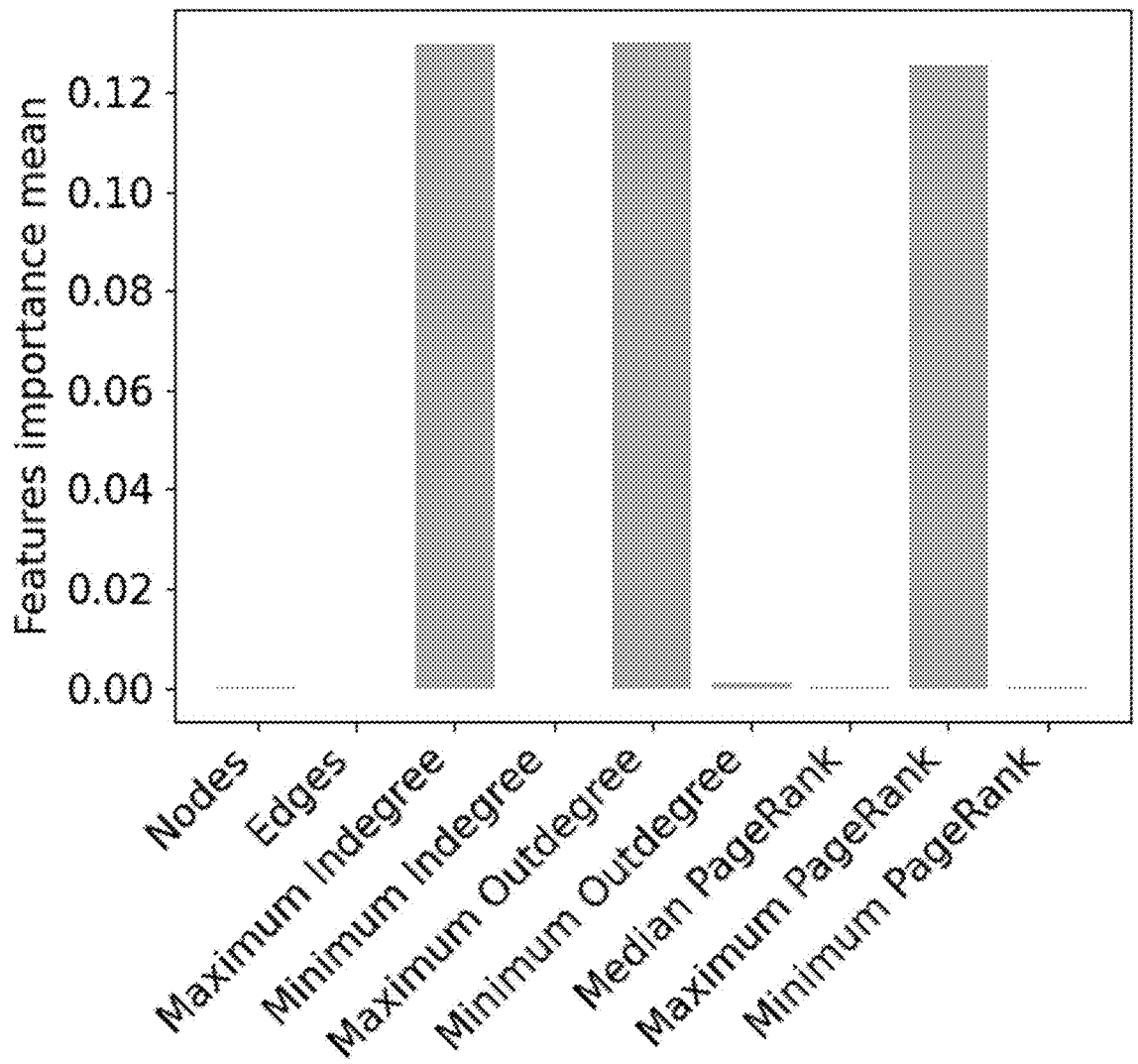
Figure 15B:
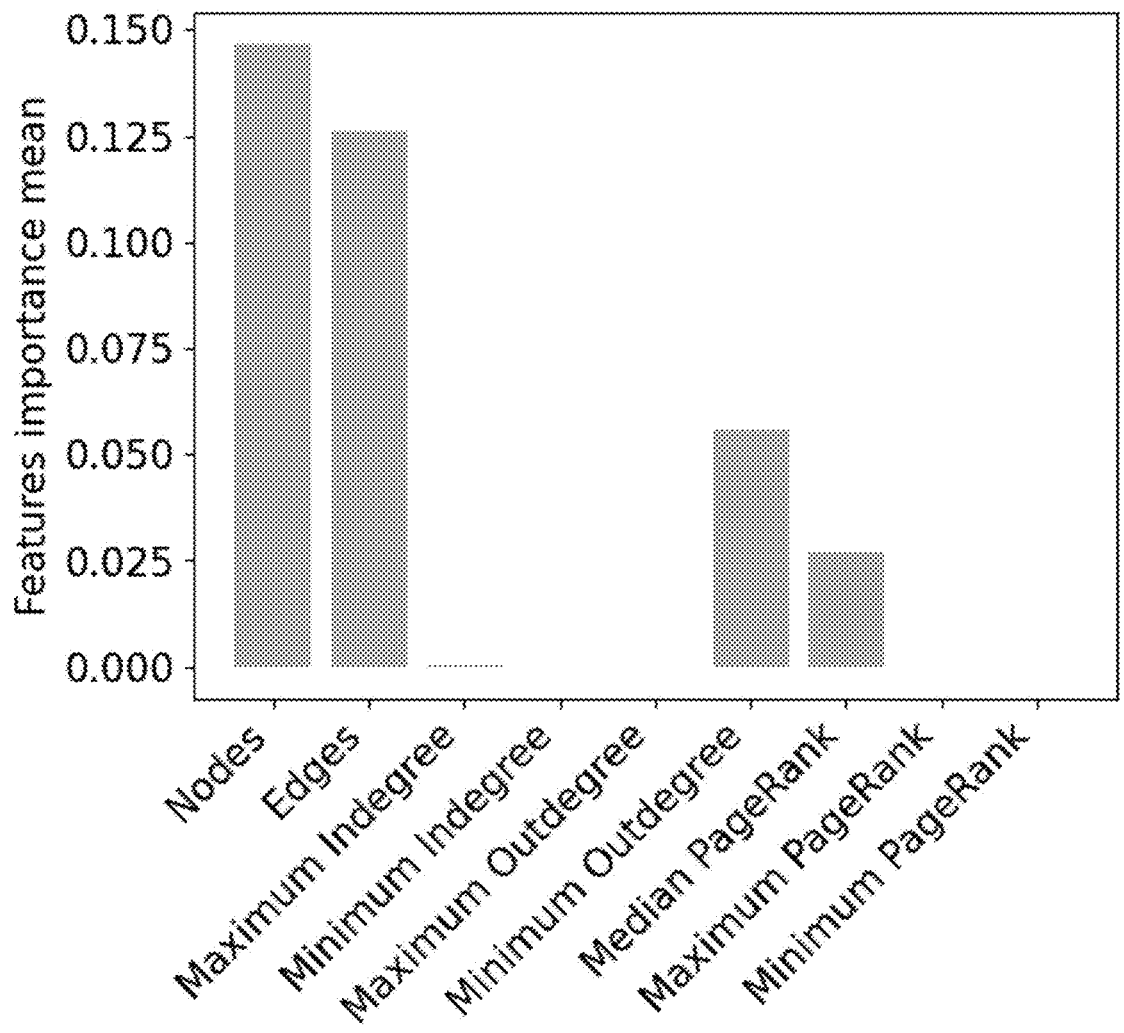
Figure 15C:
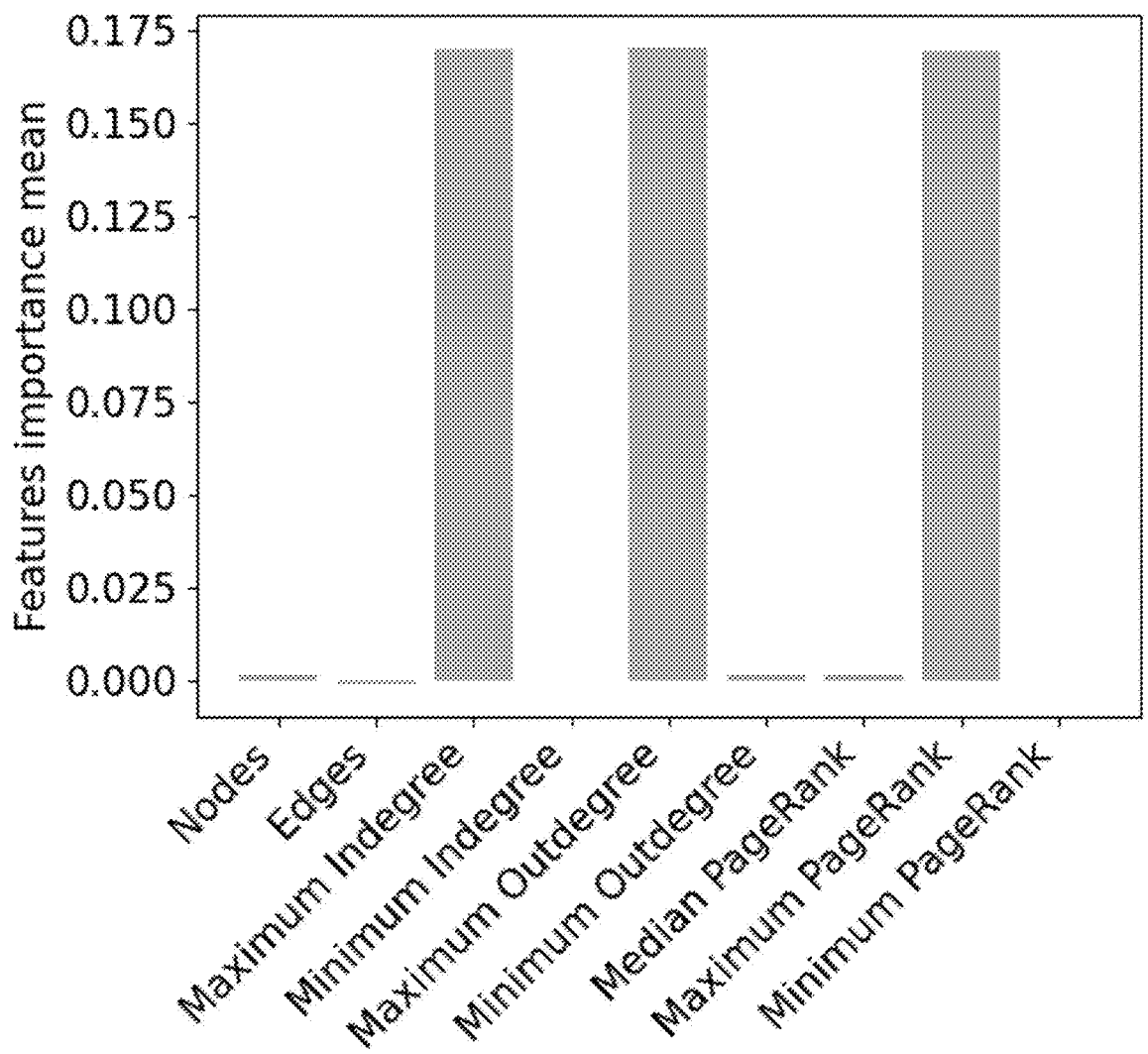
Figure 15D:
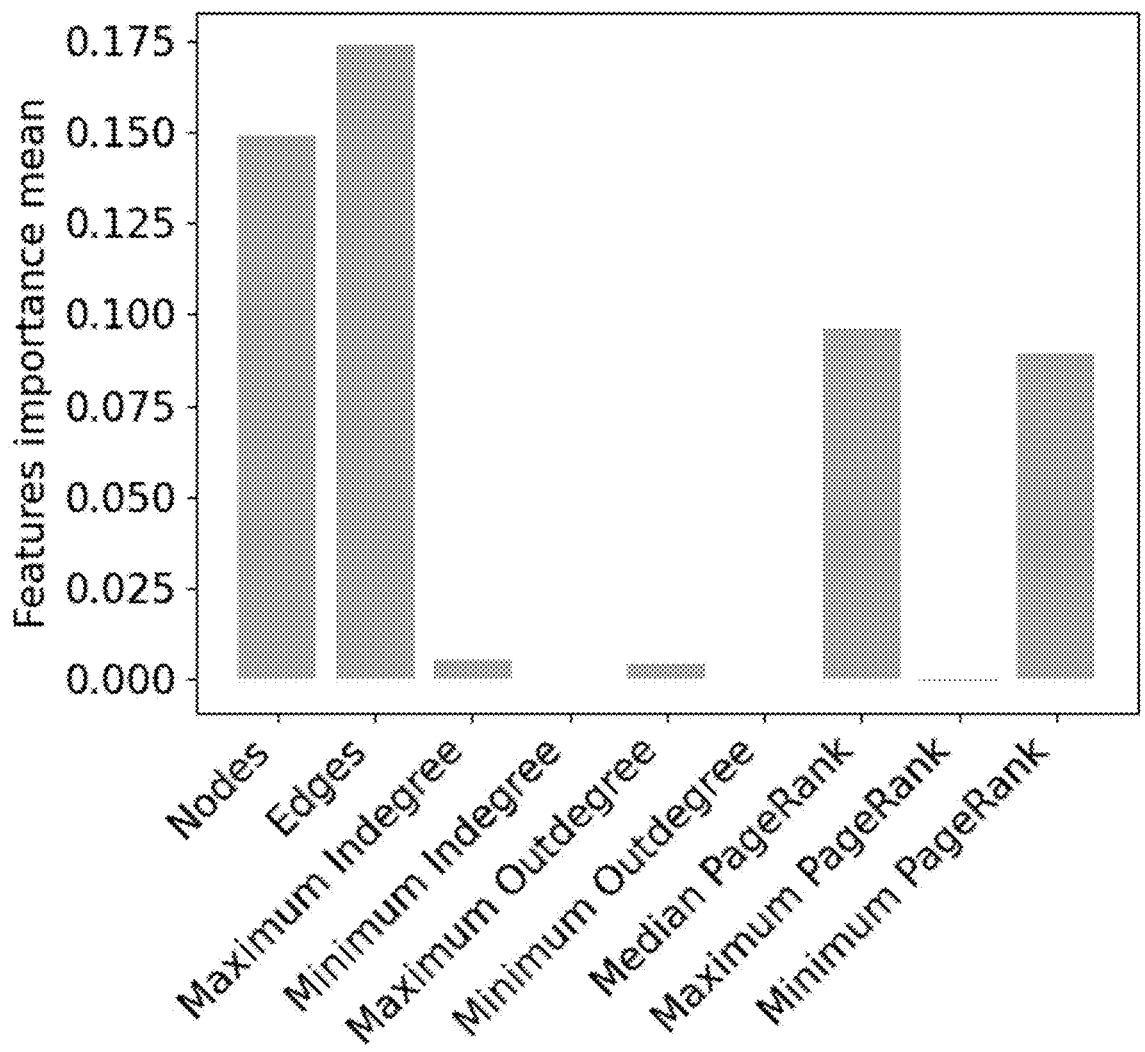
Figure 15E:
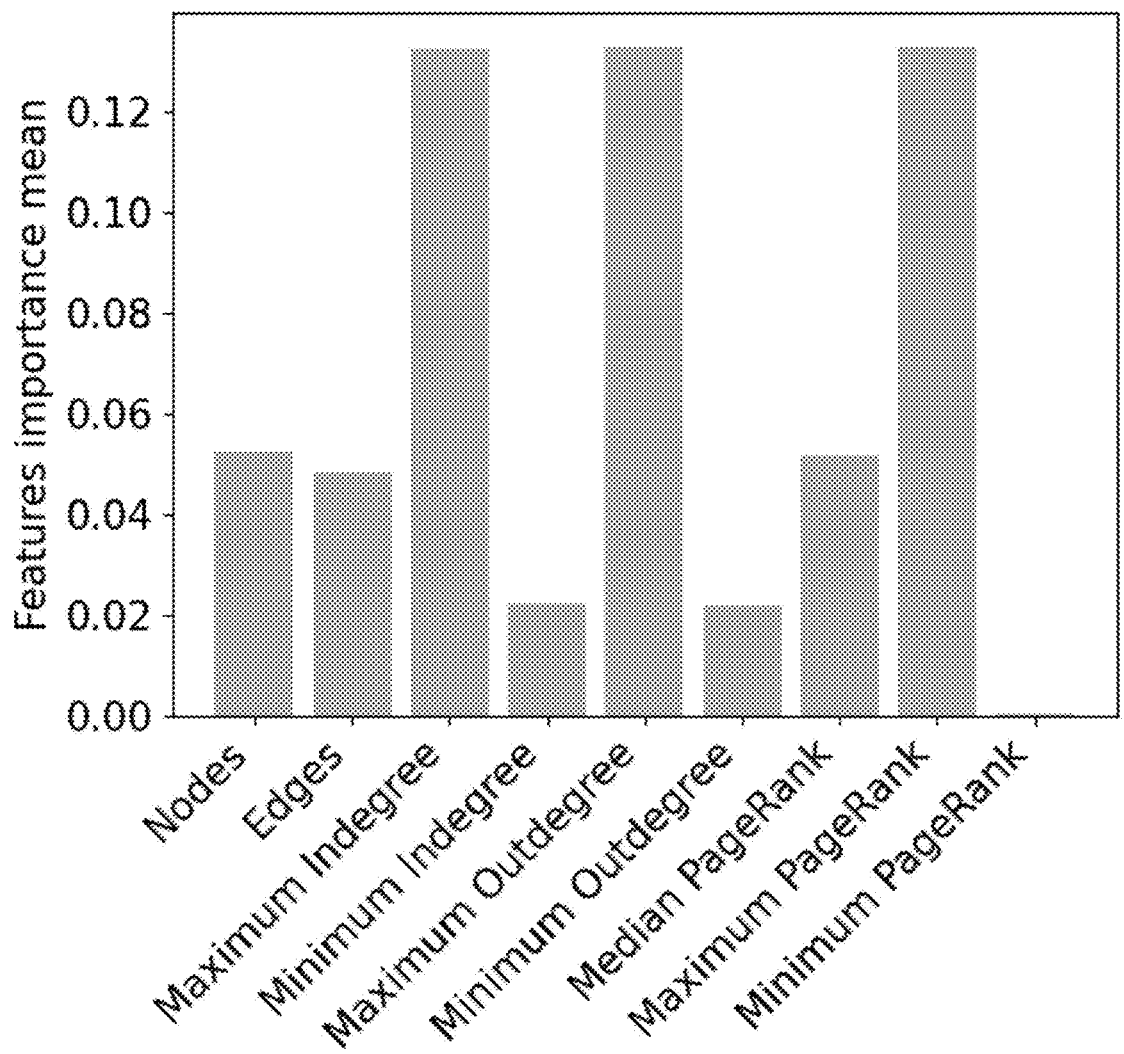
Figure 16A:
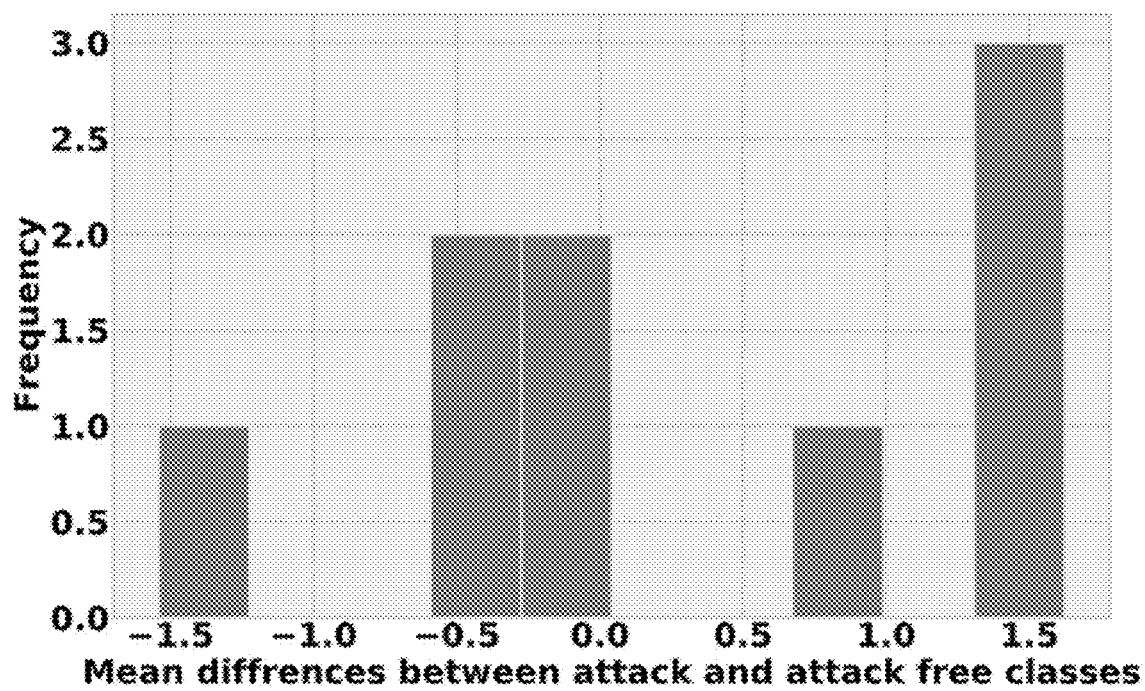
Figure 16B:
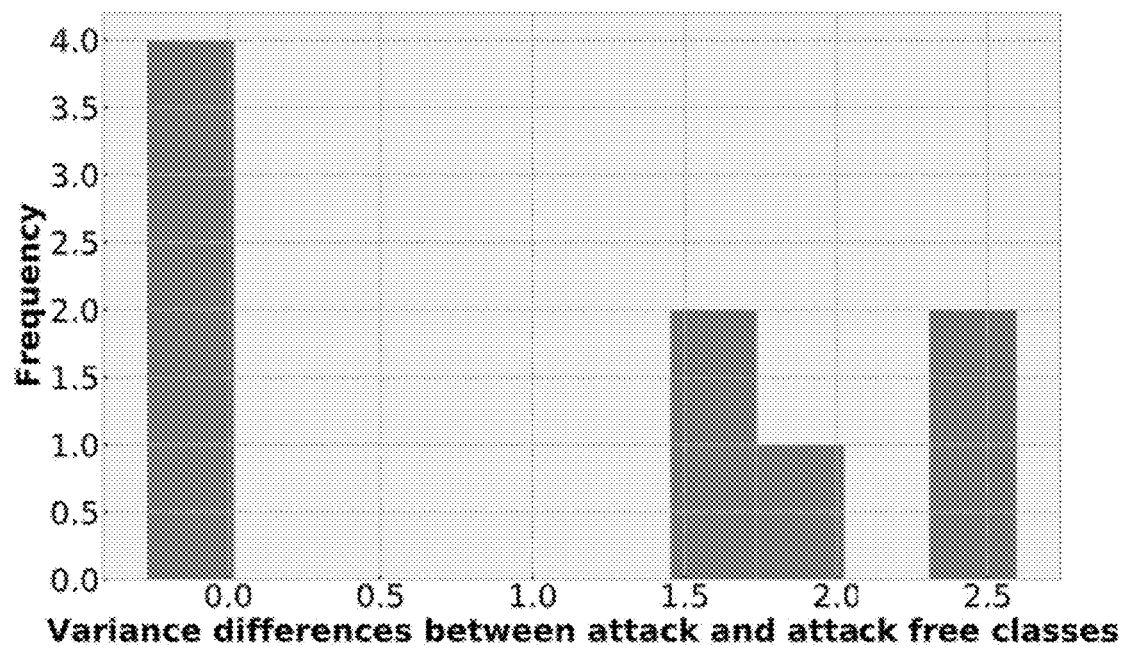
Figure 17A:
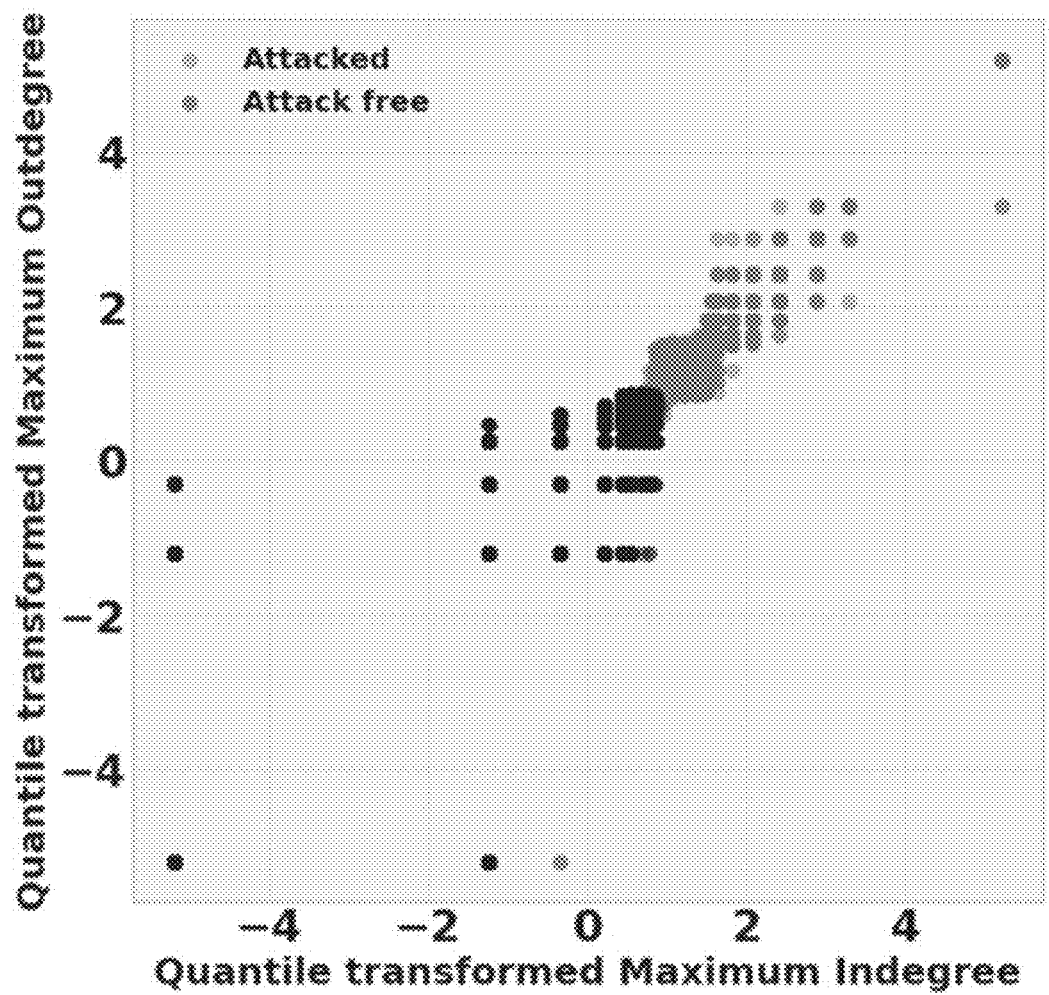
Figure 17B:
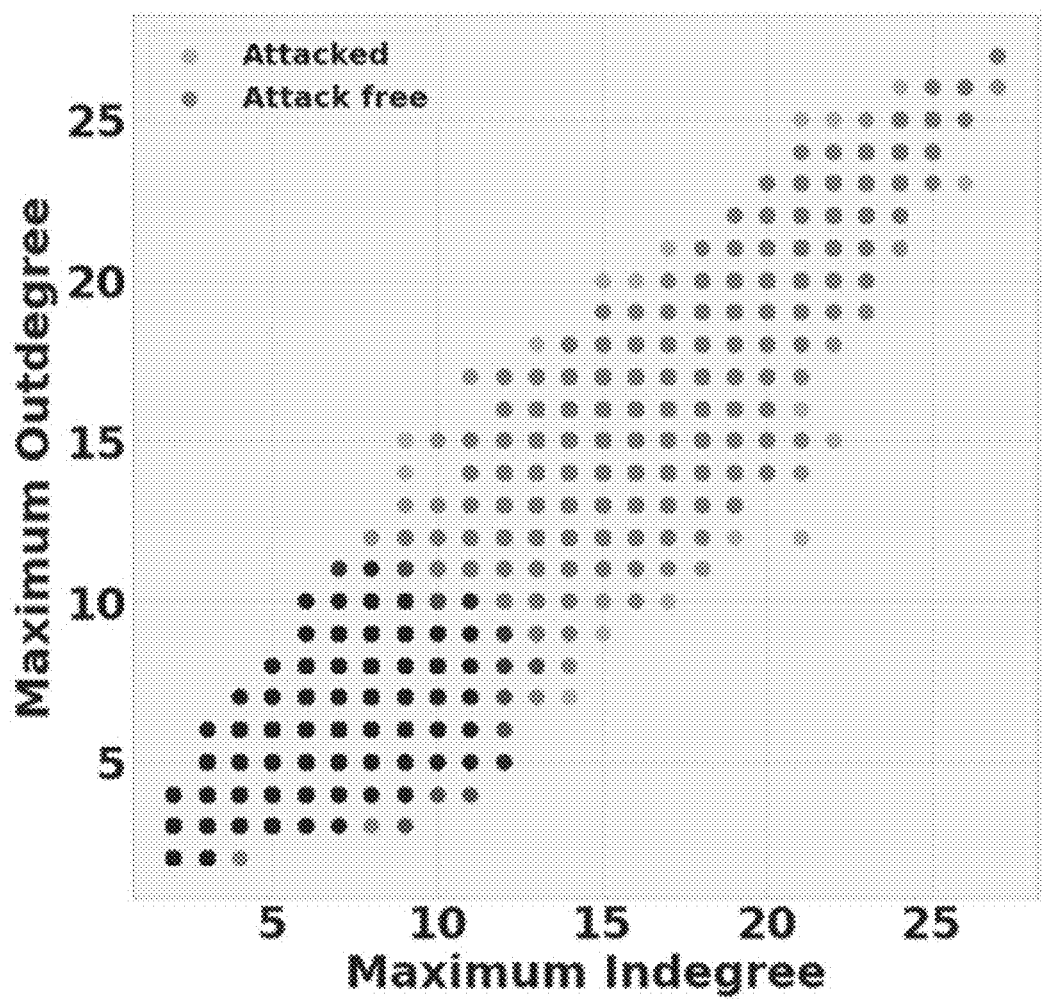
Figure 18:
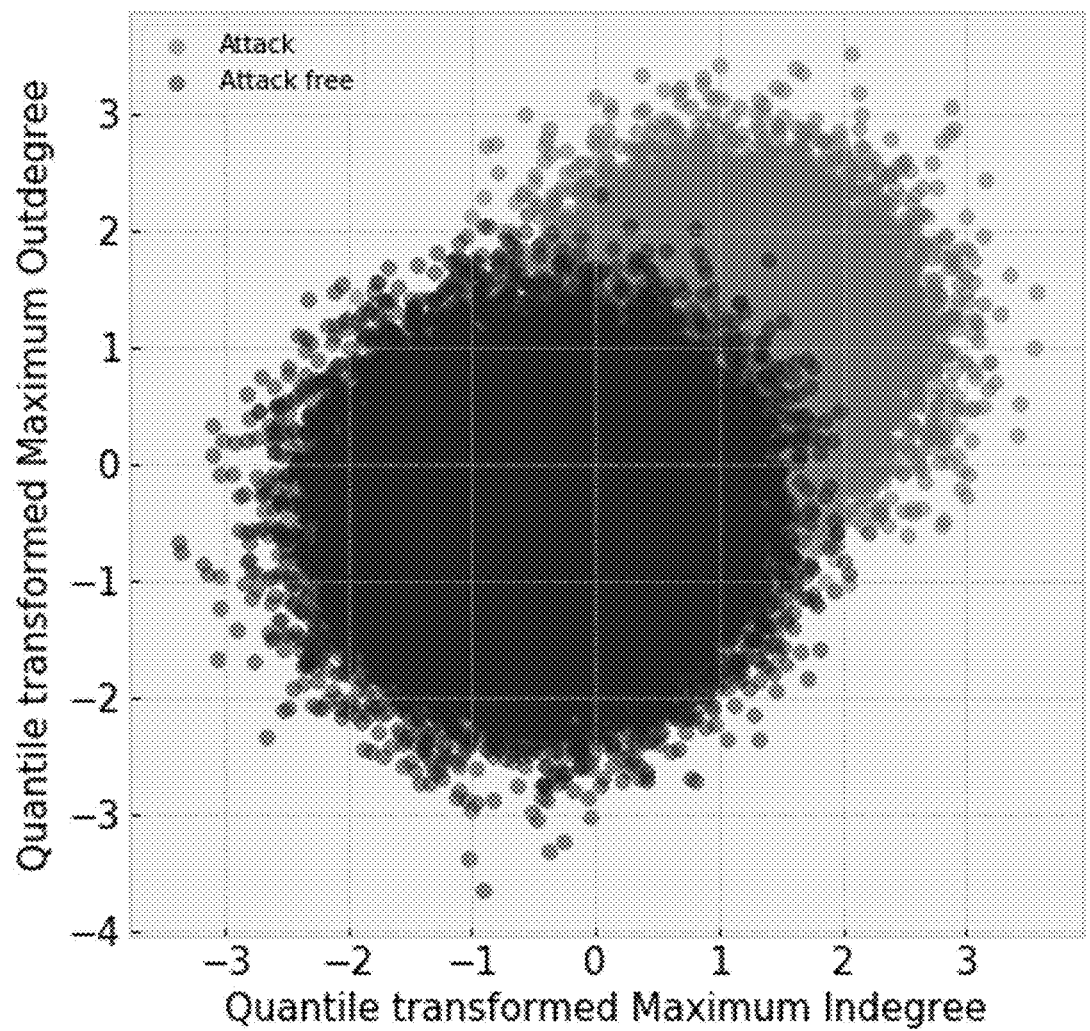
Figure 21A:
Figure 21B:
Figure 22:
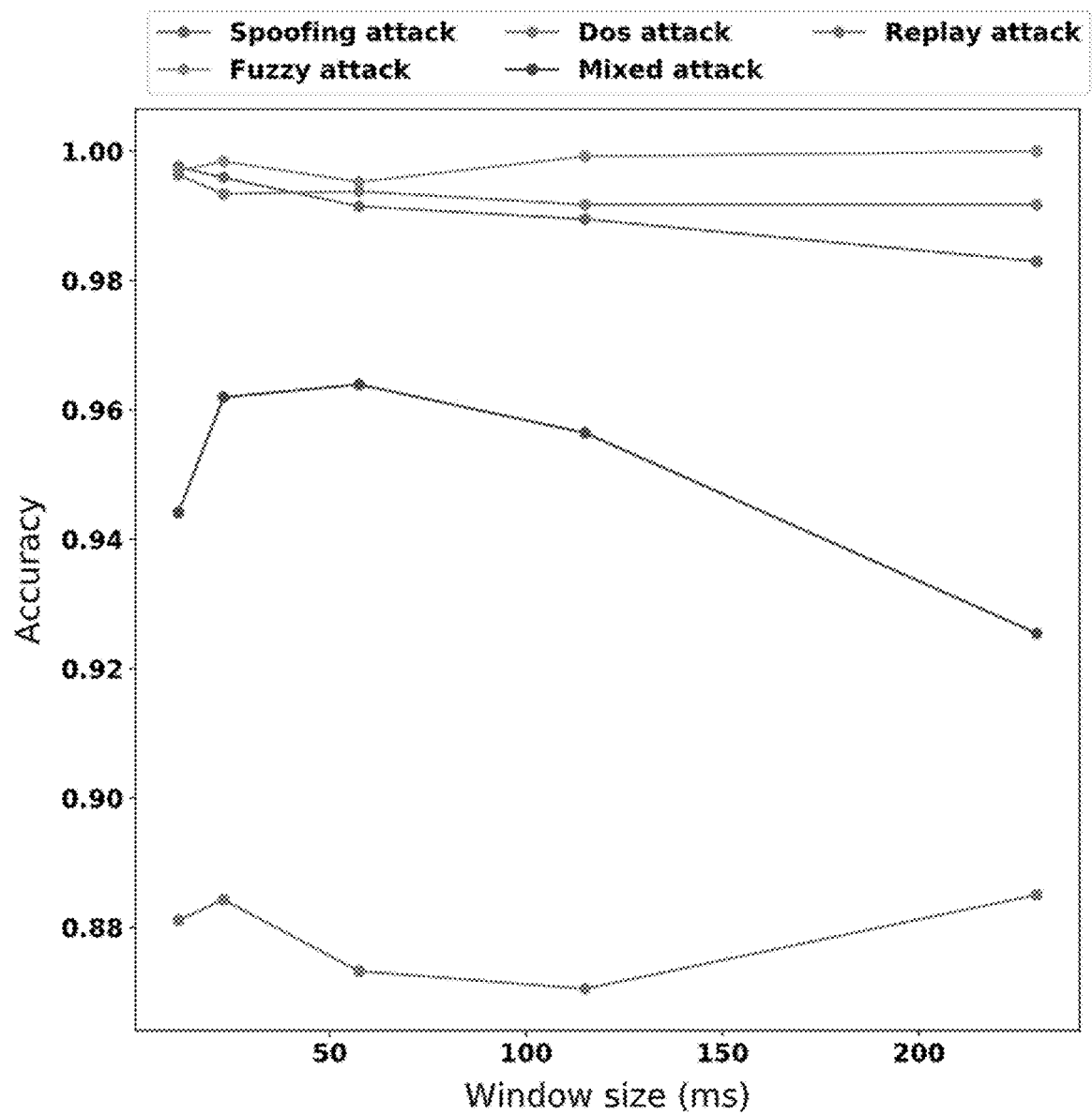
Figure 23:
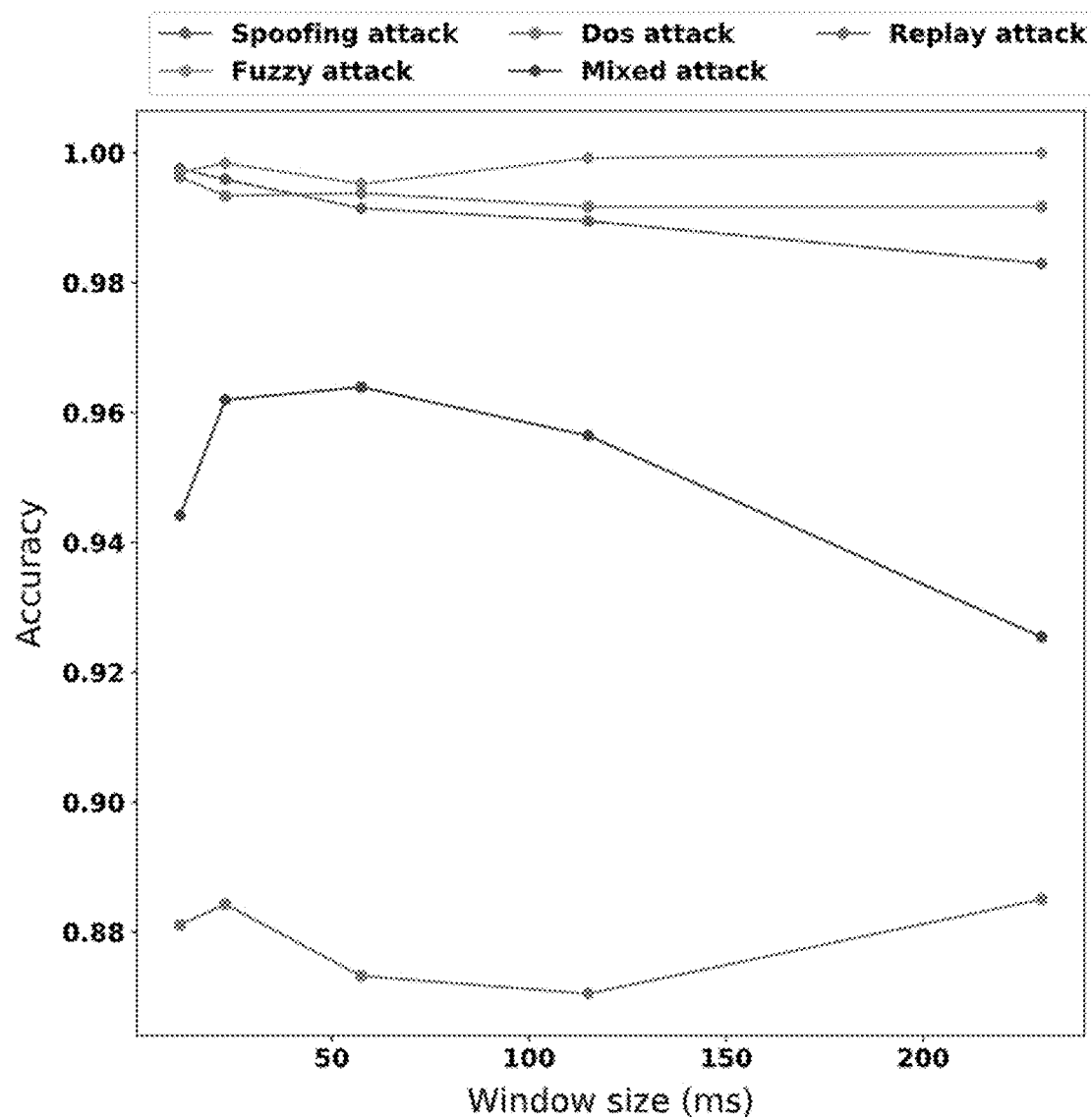
Figure 24:
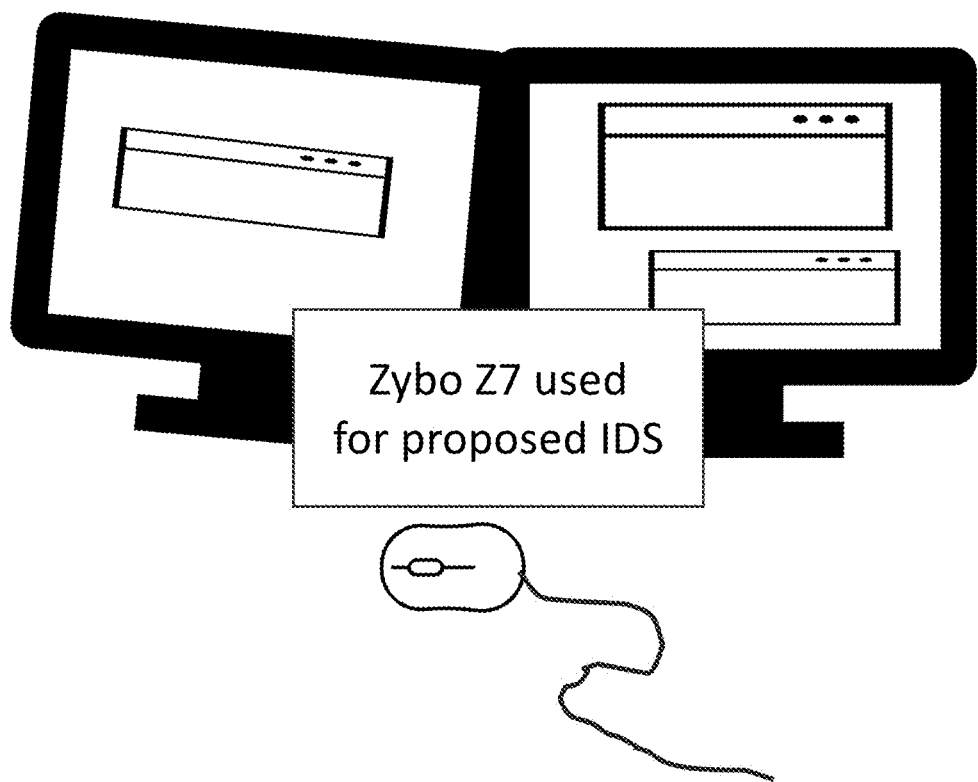
Figure 25:
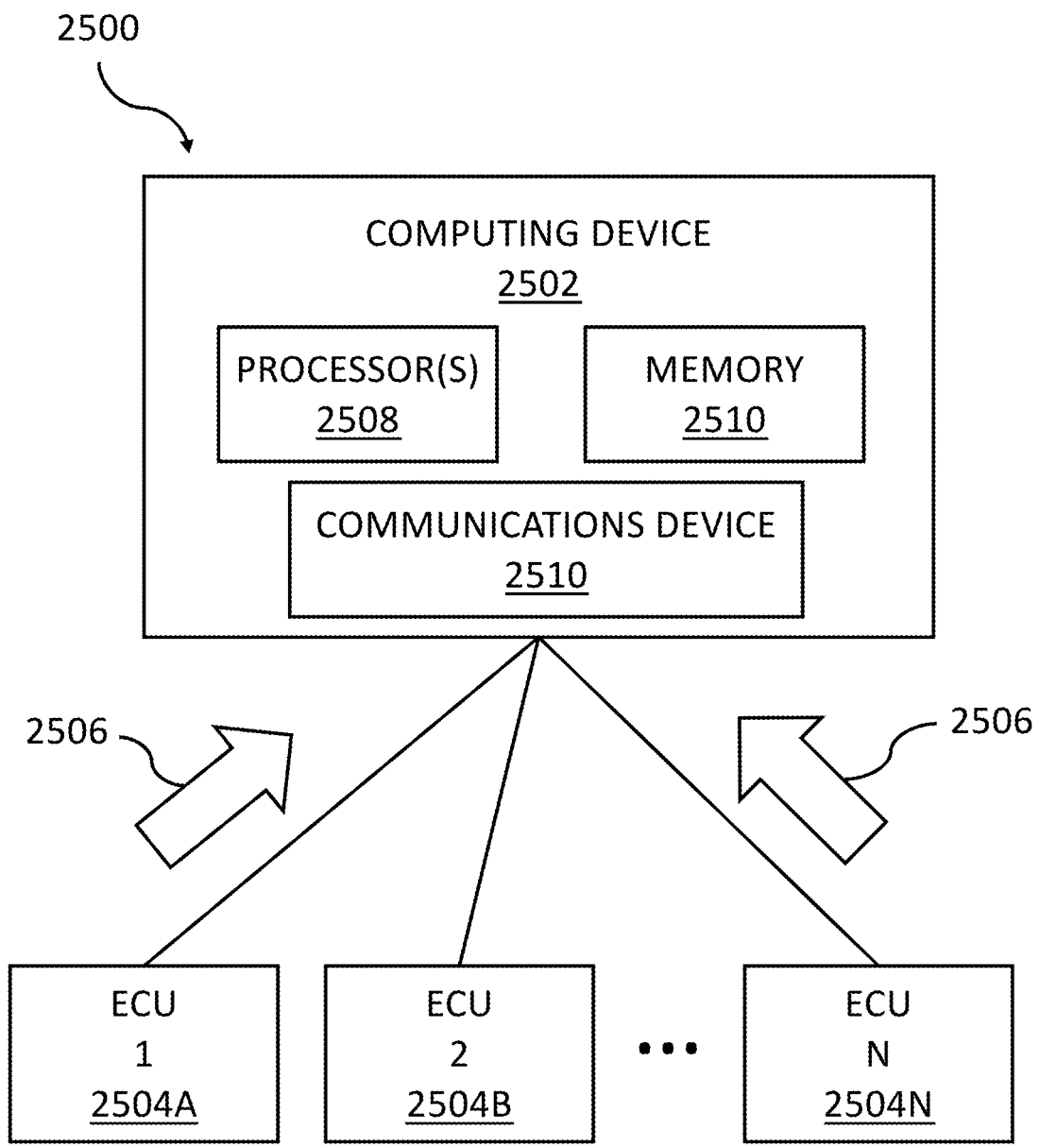
Figure 26:
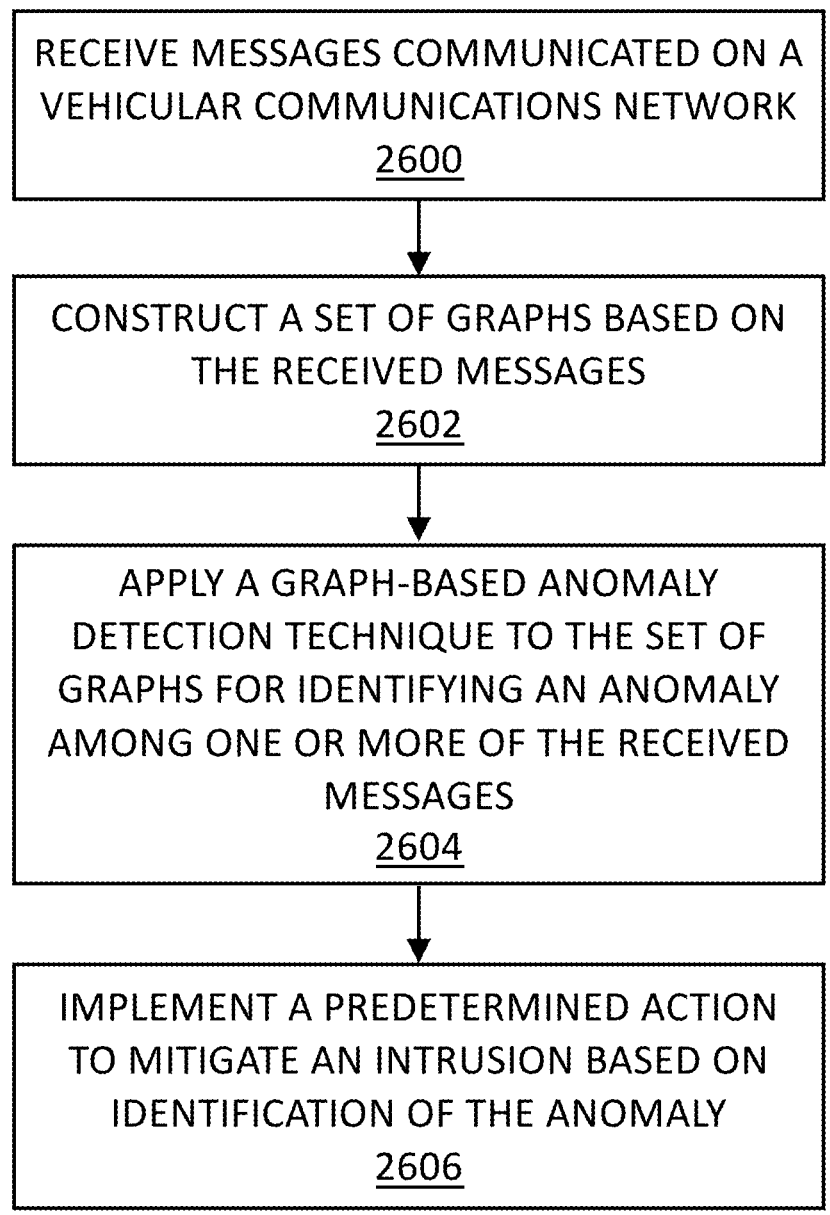

Having thus described the presently disclosed subject matter in general terms, reference will now be made to the accompanying Drawings, which are not necessarily drawn to scale, and wherein:

FIG. 1A is a block diagram depicting an example of the fabrication attack;

FIG. 1B is a block diagram depicting an example of the suspension attack, where a weak attacker suspends ECU A's operation;

FIG. 1C is a block diagram depicting an example of a masquerade attach;

FIG. 2 is a directed graph constructed based on real CAN message data;

FIG. 3A is a graph showing attack-free CAN data edge distribution with a normal distribution;

FIG. 3B a graph showing attack-free CAN data maximum degree distribution exhibiting a regular pattern;

FIG. 4A is a graph of the DoS-attacked CAN data edge distribution showing a positively skewed distribution;

FIG. 4B is a graph showing the spoofing-attacked CAN data edge distribution with a bimodal distribution;

FIG. 4C is a graph showing fuzzy-attacked CAN data maximum degree distribution exhibiting a regular pattern;

FIG. 4D is a graph showing the edge distribution of replay-attacked data shows a normal distribution;

FIG. 5A is a DoS-attacked CAN data maximum degree distribution exhibiting an irregular pattern with arbitration ID 0000;

FIG. 5B, which illustrates the spoofing-attacked CAN data maximum degree distribution exhibits an irregular pattern with arbitration ID 0316;

FIG. 5C is a graph showing fuzzy-attacked CAN data maximum degree distribution exhibits a regular pattern;

FIG. 5D is a graph showing the replay attacked maximum degree distribution exhibits a regular pattern;

FIG. 6A is a graph that shows expectedly that the attack-free test distribution and base distributions are identical;

FIGS. 6B-6D are graphs showing the chi-squared test on DoS-, fuzzy-, and spoofing-attacked distributions compared with a base hypothesis, respectively;

FIGS. 7A-7D are tables of data results showing the confusion matrix of the disclosed methodology;

FIG. 8A is a table showing misclassification rate of 13.16% for combined DoS and fuzzy attacks;

FIG. 8B is a table showing misclassification rate of 9.84% for combined DoS, fuzzy, and spoofing attacks;

FIGS. 9A-D are graphs that show identification of the best threshold value with level of significance considering the best prediction accuracy;

FIGS. 10A and 10B are graphs identification of best threshold value with LoS for combined DoS-fuzzy and DoS-fuzzy-spoofing attacks considering the best prediction accuracy;

FIG. 11 is a graph showing the misclassification rate of proposed method compared with the state-of-the-art;

FIG. 12 is a perspective, cut-away view of an intra-vehicular communication system that utilizes CAN for collision detection, MOST for audio-visual bridging, and time-sensitive ethernet networking, FlexRay for a brake-by-wire system, and LIN for a multifunctional keyless system;

FIG. 13 is a graph depicting an example four-vertex directed graph for PageRank computation;

FIG. 14A is a graph where each vertex has an equal 0.25 PR value;

FIG. 14B is a graph when a DoS attack is introduced with the PR value of 0000 ID is significantly higher than the other vertices;

FIGS. 15A-15E are graphs showing that Maximum Indegree, Maximum Outdegree, and Maximum PageRank have the highest feature importance for DoS, spoofing, and mixed attacks;

FIG. 16A is a graph showing mean differences between the two classes having symmetric spread in both positive and negative direction;

FIG. 16B is a graph showing that variance differences of the feature samples are entirely on the positive side;

FIGS. 17A and 17B are graphs showing separation of classes using Maximum Indegree and Maximum Outdegree features considering quantile transformed feature, and original feature values of mixed attacks, respectively;

FIG. 18 is a graph showing that quantile transformed features values in the range from $\mu$-to-$\pm 3\sigma$ can clearly separate attack and attack-free data;

FIGS. 19A-19E are tables showing the confusion matrix of DoS, fuzzy, spoofing, and replay attacks;

FIGS. 20A-20E are tables showing the confusion matrix of DoS, diagnostic, fuzzing CAN ID, fuzzing payload, and replay attacks;

FIGS. 21A and 21B are tables showing the proposed methodology has 97.75% and 99.57% detection accuracy for the suspension and mixed attacks;

FIG. 22 is a graph showing accuracy is fairly consistent with the variation of window size;

FIG. 23 is a graph showing the Maximum Indegree and Maximum Outdegree having the highest correlation with desired output label or attack detection;

FIG. 24 is an image showing implementation of the disclosed naive Bayes-based algorithms have been implemented in a Xilinx Zybo 27 board;

FIG. 25 is a block diagram of an intrusion detection system 2500 in accordance with embodiments of the present disclosure; and FIG. 26 illustrates a flow diagram of an example method for intrusion detection in accordance with embodiments of the present disclosure.

SUMMARY

The presently disclosed subject matter are systems and methods of graph-based vehicular intrusion detection. According to an aspect, an intrusion detection system includes a computing device configured to receive messages communicated on a vehicular communications network. The computing device also includes constructing a set of graphs based on the received messages. Further, the computing device includes apply a graph-based anomaly detection technique to the set of graphs for identifying an anomaly among one or more of the received messages. The computing device also includes implement a predetermined action to mitigate an intrusion based on identification of the anomaly.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

In embodiments disclosed herein, graph-based anomaly detection techniques are used for intrusion detection in vehicles. As described herein, a set of graphs can be constructed based on messages received on a vehicular communications network. The unusual substructure of a graph can be used as a flag or sign of an anomaly to thereby indicate an intrusion. In an example, a computing device can construct a set of graphs from CAN bus data and subsequently search for unusual behavior to flag as an anomaly. Experimental results based on these techniques are described herein and demonstrate significant success in detecting anomalies.

In embodiments, a four-stage intrusion detection system (IDS) is disclosed for cyber or physical attacks on the CANbus. A computing device can use a graph-based approach to find patterns in the dataset. A median test and chi-squared test can used to distinguish two data distributions. Further, attacks can be detected without any change in the CAN protocol. Therefore, it can be applicable to any communication system that uses the CAN protocol or any other suitable protocol.

Due to the broadcasting nature of a CAN communication system, all the messages that are transmitted (or communicated) in the network are accessible by all the connected ECUs. After receiving a CAN message, each ECU can translate the bit sequence and extracts the necessary components like arbitration ID, data, cyclic redundancy check (CRC), etc., and finally the ECU can determine whether to receive the CAN message or not based on the arbitration ID. Apart from indicating the sender of a particular CAN message, the arbitration ID of a CAN message can be used as a priority during a collision between two or more CAN messages. For conflict resolution between two CAN messages, carrier-sense multiple access with collision avoidance can be used in the CAN bus protocol. Although the arbitration ID is used to define the priority and the source to resolve conflict, it is incapable of authenticating the origin of that CAN message. This security flaw can be used by the inside attacker (who already has access to the CAN bus) and the outside attacker (who can gain access using the cellular communication network, etc.) to corrupt the CAN system.

These attackers can initiate different kinds of attacks on the CAN bus, and we can generalize them as follows:

Fabrication attack: Through an in-vehicle ECU compromised by a strong attacker, an adversary can fabricate and inject messages with forged ID, data length code, and data. FIG. 1A illustrates a block diagram depicting an example of the fabrication attack. The objective of this attack is to override any periodic messages sent by a legitimate safety-critical ECU so that their receiver ECUs get distracted or become inoperable. DoS, spoofing, and fuzzy attacks are some examples of fabrication attacks.

Suspension attack: To mount a suspension attack, the adversary needs only one weakly compromised ECU, and that becomes a weak attacker. The objective of this attack is to stop/suspend the weakly compromised ECUs message transmission, thus preventing the delivery/propagation to other ECUs of the information it acquired. FIG. 1B illustrates a block diagram depicting an example of the suspension attack, where a weak attacker suspends ECU A's operation. As a result, this attack affects the performance of various ECUs that utilize certain information from other ECUs to function properly. Therefore, the suspension attack can harm not only the (weakly) compromised ECU itself but also other receiver ECUs.

Masquerade attack: To mount a masquerade attack, the adversary needs to compromise two ECUs, one as a strong attacker and the other as a weak attacker, as shown in FIG. 1C, which illustrates a block diagram depicting an example of a masquerade attach. In a masquerade attack, the intruder uses a weak attacker to suspend one ECU's data communication and uses a strong attacker to send messages mimicking the suspended ECU's ID and frequency. The adversary monitors and learns which messages are sent at what frequency by the weakly attacked ECU, and then the strong attacker transmits the message with the ID of the compromised ECU at the same frequency. Examples of this attack are replay or impersonation attacks.

In accordance with embodiments, a chi-squared test can be used to detect anomalous CAN data. As an example, the chi-squared independence test is a statistical procedure to test if two categorical distributions belong to the same populations or not. It uses the frequency of each category as a factor for distinguishing two distributions. In other words, it is called the chi-square goodness of fit because in this test, the expected frequencies of all the features of one data distribution are extracted and then the findings are compared with the observed frequencies of all the features of the second distribution. If the two distributions are significantly different, it can be referred to as a reject hypothesis; otherwise, it can be referred to as a null hypothesis (if the distributions are the same). The chi-squared test can be described by the following equation, $$X_{DoF}^2 = \sum_{i=0}^{DoF} \frac{(O_i - E_i)^2}{E_i}$$

where DoF is the degree of freedom, $X_{DoF}^2$ is the value that can be compared against a threshold, O is the observed frequency, and E is the expected frequency. The degree of freedom in the chi-squared test actually specifies the shape of the distribution. It is a numerical value and can be represented by following equation, $$DoF = (i-1) \times (j-1)$$

where i is the number of categories and j is the number of rows used in that test. The degree of freedom can be important for finding out the threshold value from the chi-square table of significance. In general, the chi-squared test works well in a categorical larger data set, which is our primary motivation for using this test for comparing CAN bus-based data distribution.

Systems and methods disclosed herein utilize graphs based on messages received on a vehicular communications network for identifying anomalies among the received messages. A predetermined action can be implemented to mitigate an intrusion based on identification of an anomaly. A graph can be a non-linear data structure consisting of vertices and edges. The graph can allow representation of the relationship between two vertices. The relationship between two vertices can be understood from a graph. Table I below presents example graph properties and their significance according to the present disclosure.

TABLE 1

Example graph properties are disclosed for use by systems and methods in accordance with the present disclosure; for example, an edge represents a sequence of CAN messages, while degree represents the number of arbitration IDs sequential with the current ID.

| Properties | Significance | In Can bus data |
| --- | --- | --- |
| Vertex | Node of the graph | Arbitration ID |
| Edge | Link between nodes | Arbitration ID sequence |
| Degree | How many neighbours | How many arbitration IDs are sequential with current ID |
| Cycle | Loop in the graph | Loop between the sequential arbitration IDs |
| Root | Starting of the graph | The first CAN message |

In accordance with embodiments, intrusion detection systems and methods are provide to secure a CAN bus communication system. The proposed methodology uses statistical analysis as a basis for detecting anomalies and is divided into several steps. Example steps include, but are not limited to: (i) transferring a CAN bus message to a graph structure; (ii) extracting graph-based features to import for anomaly characterization; (iii) constructing a hypothesis based on the safe population window; and (iv) comparing the test population window to the base population.

As referred to herein, the term "window" can be a range of raw CAN bus messages. This may be referred to as a "single window". In an example, 200 messages can be considered to be a window size. This is described in further detail herein.

As referred to herein, a "population window" is a set of windows. It can represent a distribution of windows and can be used by systems and methods disclosed herein to perform hypothesis testing.

In embodiments, a graph can be constructed using CAN messages. In an example, the CAN bus messages can be divided into a number of windows. Subsequently, relationships can be derived among all the arbitration IDs for each window.

Empirically, graphs can be used to indicate the relationships among data. A graph can be used to present data that may be too complicated to express using simple text or other forms of data structure. As graph theory can represent complex relationships of data in a very simple manner, we leverage graph data structure to represent CAN bus data windows in a meaningful structure.

For any given raw CAN dataset, methods as disclosed herein can construct graphs for every 200 messages (referred to as a "window") and can return the overall constructed graph lists. Now referring to "Algorithm 1" below, from Line 4 to Line 8 all the necessary variables are initialized. Subsequently, the total number of messages in the given CAN dataset in Line 9 are computed. In Line 10, a loop is used to iterate over every CAN bus message from the CAN bus dataset. As these methods consider the arbitration ID as the node of a graph, so the arbitration ID is extracted from each CAN message in the dataset. From Line 11 to Line 14, the adjacent CAN messages and their corresponding IDs are extracted. Subsequently, an adjacency list can be constructed from the arbitration IDs extracted from two sequential CAN messages in Line 15.

In accordance with embodiments, the graph data structure can have properties such as the number of edges, the number of nodes, the in-degree, the out-degree, and the like. In this step of extracting graph properties, the computing device can characterize each of the message windows and subsequently construct the population window by extracting graph properties. In order to extract graph properties from a graph constructed using a window of CAN messages, our methodology uses the outcome of step 1 of example Algorithm 1. In example Algorithm 1, Line 17 to Line 19 extracts the node number, edge number, and maximum degree from the single constructed graph and stores them in the list of graph properties in Line 20 using the method fetchGraphProperties( ). After iterating through 200 messages, the adjacency list and the current graph are initialized in Line 21 and Line 22, respectively. In Line 25, the whole graph list is returned, which is referred to as the "population window" herein.

In another example step of the disclosed intrusion detection methodology, a hypothesis can be built based on the information of the population window. The hypothesis can be built based on a chi-squared statistical test. Using this statistical analysis, the computing device can compute a threshold value. The threshold value can be used in a subsequent step to detect the anomalous population. Further, a median test can be used to detect a strong replay attack.

The example method, referred to as "Algorithm 2," is an attack detection algorithm. This represents an example chi-squared test on our population window. It takes two lists of graphs as inputs and subsequently outputs a Boolean value. Out of the two inputs, one is the attack-free graph population and the other is the graph population under test. The Boolean value in the output represents whether there is any attack happening or not. In between Line 4 to Line 13, the variables that are needed for this example are initialized. After that,

---

Algorithm 1 Graph building algorithm

1: Input: CANMessageList[$Msg_1$, $Msg_2$, . . . , $Msg_n$]   d Raw CAN bus data array
2: Output: GrapList[$GP_1$, $GP_2$, . . . , $GP_n$] d Graph arrayof CAN bus data
3:
4: Initialize: GraphList  [ ]                              ←
5: PreviousID  1                                           ← -
6: CurrentGraph   d Start with an empty graph7:   adjacencyList← { }   d A dictionary for adjacency list8: graphCount 1              ← { }
9: N   length(CMsgList[$Msg_1$, $Msg_2$, ......., $Msg_n$])   ←   ←
10: for index in range (0, N   1) do d Loop through all the CAN messages    –
11: CANSingleMsg1   CMsgList[index]                        ←
12: CANSingleMsg2   CMsgList[index + 1]                    ←
13: *arbitrationID*1   ExtractID(*CANSingleMsg*1)   d Extraction of Arbitration ID from raw CAN data
14: arbitrationID2 + ExtractID(CANSingleMsg2)
15:    adjacencyList                                       ←
   linkGraphNodes(CANSingleMsg1,   CANSingleMsg2) d Create link between the two graph Nodes
16:    if (length(adjacencyList) == 200 then   d Ifit true then adjacencyList is a graph built from 200 CANmessages
17:       nodeNumber   countNodeNumber(adjecencyList)   d Count numberof nodes in the   ←
   current graph
18:       edgeNumber   countEdgeNumber(adjecencyList)   d Count numberof edges in the   ←
   current graph
19:     Maxdegree   countDegree(adjecencyList) d                ←
   Count maximum degree of each ID from the current graph
20: currentGraph  fetchGraphProperties(adjacencyList)                    ←
21:    adjacencyList                                       ←{ }
22:    currentGraph                                        ←{ }
23:    end if
24: end for
25: return GraphList the computing device can extract the edges of each graph from the graph list from Line 14 to Line 16 for safe attack-free distribution. Subsequently, a hypothesis can be constructed for the safe edge distribution in Line 20.

In an example analysis, a real vehicle dataset has been utilized. The dataset includes both attack-free and corrupted data with various kinds of attacks. Those attacks include DoS, fuzzy, spoofing, and replay attacks on CAN data.

---

Algorithm 2 Proposed attack detection algorithm

---

```
 1: Input: GrapList_Base[GP_1, GP_2, ..., GP_n]    dGraph array of attack free CAN bus data,
    GrapList_Test[GP_1, GP_2, ..., GP_n]    d Graph array oftest data
 2: Output: isAttacked      d True if the input graph isattacked or false otherwise
 3:
 4: Initialize: edgeList_Base [ ]
 5: edgeList_Test [ ]
 6: Chi_Null   0
 7: Chi_Test   0
 8: Median_Null   0
 9: Median_Test   0
10: σ_Null   0
11: threshold   0
12: N_Base    length(GrapList_Base[GP_1, GP_2,......, GP_n])
13: N_Test    length(GrapList_Test[GP_1, GP_2,....., GP_n])
14: for index in range (0, N_Base) do
15:    edgeList_Base     ←
       fetchEdgeNumbers(GraphList_Base[index])
16: end for
17: for index in range (0, N_Test) do
18:    edgeList_Test     ←
       fetchEdgeNumbers(GraphList_Test[index])
19: end for
20: Chi_Null    ExtractDistribution(edgeList_Base)     d
    Construct hypothesis using attack free graph
21: Chi_Test    ExtractDistribution(edgeList_Test)     d
    Construct hypothesis using test data
22: threshold    FindSignificanceLevel(Chi_Null)     d
    Find threshold using the base distribution
{ 23:   Median_Null, σ_Null ExtractDistribution(edgeList_Base)    d Computemedian and standard
    deviations using attack free graphs
24: Median_Test    ExtractDistribution(edgeList_Test)   d
    Compute median using test data
25: if (Chi_Test    threshold) then
26: isAttacked    True          d Attack detected
27: else if (Median_Test > (Median_Null +
    3σNull)) then
28:   isAttacked    True d Attack detected
29: else
30: isAttacked    False         d CAN data is safe
31: end if
32: return isAttacked
```

---

In a subsequent step, the test population window is compared to the base population window. This example step of includes two functionalities. The first one is to calculate the chi-square value for the test population window, and subsequently compare the value with the threshold. The latter one is to calculate the median value for the test population window and subsequently compare the value with the outlier. By using the following equations, the anomalous population can be detected.

$$Chi_{Test} \leq = threshold, [Chi_{Test}=X_c^2]; \text{No attack} \quad (3)$$

$$Chi_{Test} > threshold, [Chi_{Test}=X_c^2]; \text{Attack} \quad (4)$$

In Line 17 to Line 19 of Algorithm 2, the edges are extracted from the list of graphs that is to be tested. In Line 21, a test hypothesis can be made based on the same rules as the attack-free distribution hypothesis or the base hypothesis and the threshold is defined in Line 22 based on the details of the base hypothesis. To detect the replay attack, the median test can be used. For this, the Algorithm 2 compute median (Median$_{Null}$) and standard deviation σ$_{Null}$ using attack free data and Median$_{Test}$ of attacked data in Line 23 to Line 24. Finally, the algorithm takes the decision about the test distribution by comparing the test hypothesis with the threshold or our defined outliers (Median$_{Null}$+3σ$_{Null}$) from Line 25 to Line 31 and returns whether the CANdata is safe or not in Line 32. The assumed outliers exhibit excellent results and are discussed in further detail herein.

First, we build graphs using Algorithm 1 with raw CAN bus data. FIG. 2 illustrates a directed graph constructed based on real CAN message data. This graph has been generated using the proposed methodology. The nodes of the graph represent arbitration IDs of the CAN bus, and the edge between two nodes indicates CAN bus sequential messages. The direction of the edge indicates the order of the sequence of the messages. For example, if node 043f has an edge with node 0440 and the direction of the edge goes from 043f to 0440, it means arbitration ID 0440 was followed by the message with arbitration ID 043f.

First, the real vehicular CAN bus data was divided into a few windows. The size of each window in this example is 200 messages. However, it is noted that this number is user-defined, and can be changed depending on the design robustness.

At a 1 Mbit/sec speed, a CAN transmits about 8.7K messages/sec. Hence, operators can select how frequently they want to authenticate the CAN. After selecting the window size, the graph for each of the windows is constructed, and the common graph properties are derived like edge number and maximum degree distribution for each window. The attack-free CAN data edge distribution shows a normal distribution, as shown in FIG. 3A, which illustrates a graph showing attack-free CAN data edge distribution with a normal distribution. Similarly, the attack-free CAN data maximum degree distribution exhibits a regular pattern, as shown in FIG. 3B, which illustrates a graph showing attack-free CAN data maximum degree distribution exhibiting a regular pattern.

In contrast to graphs with a normal distribution or regular pattern, FIG. 4A illustrates a graph of the DoS-attacked CAN data edge distribution showing a positively skewed distribution. Unlike attack-free CAN data, the DoS-attacked data do not exhibit a normal distribution. FIG. 5A illustrates a DoS-attacked CAN data maximum degree distribution exhibiting an irregular pattern with arbitration ID 0000. Further, FIG. 5A shows the situation of the maximum degree for a CAN dataset with a DoS attack. Clearly, a single arbitration ID (0000) dominates the distribution and occupies the CAN network with the highest-priority messages.

Unlike the DoS attack, the graphs with a spoofing-attacked dataset show a bimodal distribution with two distinct peaks, as shown in FIG. 4B, which illustrates a graph showing the spoofing-attacked CAN data edge distribution with a bimodal distribution. However, similar to a DoS attack, the spoofing-attacked maximum edge distribution has a distinguishable high occurrence of ID0316 compared to the other IDs, as shown in FIG. 5B, which illustrates the spoofing-attacked CAN data maximum degree distribution exhibits an irregular pattern with arbitration ID 0316. Similar to the spoofing attack, the graphs with a fuzzy-attacked dataset show a bimodal distribution with two distinct peaks, as shown in FIG. 4C, which illustrates a graph showing fuzzy-attacked CAN data maximum degree distribution exhibiting a regular pattern. However, unlike the spoofing attack, the fuzzy-attacked maximum edge distribution has no distinct characteristics compared to the attack-free data as shown in FIG. 5C, which illustrates a graph showing fuzzy-attacked CAN data maximum degree distribution exhibits a regular pattern.

Unlike other attacks, the graphs with a replay-attacked dataset show a normal distribution, as shown in FIG. 4D, which illustrates a graph showing the edge distribution of replay-attacked data shows a normal distribution. In addition, replay-attacked maximum edge distribution has no distinct characteristics compared to the attack-free data, as shown in FIG. 5D, which illustrates a graph showing the replay attacked maximum degree distribution exhibits a regular pattern.

Apart from impersonation or replay attacks, the data distributions of different attacks are not only different from the attack-free CAN data distribution but also different from each other. The overall situation of the data distributions in statistical terms are summarized in Table II below. In the exploratory data analysis, the central tendency or mean of the distribution and the asymmetry of a probabilistic distribution are considered. In the attack-free dataset graph collection, the edge distribution has a mean of 44.6. On the other hand, the DoS, fuzzy, spoofing, and replay attacks have a mean of 46.6, 49.1, 79.8, and 75.17, respectively. In addition, the median of edge distribution is computed, which is important for outliers detection, as shown in Table II. The attack free, DoS, fuzzy, spoofing, and replay attacks edge distributions have a median of 44.0, 45.0, 49.0, 46.0, and 75.17, respectively.

Table II also shows the skewness of all the edge distributions for attack-free and attacked datasets. Spoofing and replay attack edge distributions seem symmetric to the attack-free dataset edge distribution. On the other hand, the attack-free and fuzzy attack edge distributions are moderately positive-skewed. Finally, the DoS attack edge distribution is highly skewed. On observation of the maximum degree of CAN arbitration IDs in the graph distribution, it shows that different kinds of attack use different IDs, resulting in dissimilar maximum degrees. Finally, exploratory analysis proves that the conversion between raw CAN data to the graph gives us a clear indication of an attacked or attack-free CAN bus. Using this technique, some extraordinary information can be obtained from the converted graph. Finally, the graph properties can be used to distinguish different attacked and attack-free situations of the CAN bus system.

TABLE II

In summary, we can say that among all the attacks, impersonation or replay attack is difficult todetect due to the symmetric edge and maximum degree distributions compared to the attack-free data.

| Analysis | Attack free | DoS | Spoofing | Fuzzy | Replay |
| --- | --- | --- | --- | --- | --- |
| Mean (edge) | 44.6 | 46.6 | 49.1 | 79.8 | 75.2 |
| Median (edge) | 44.0 | 45.0 | 49.0 | 46.0 | 75.0 |
| Skewness (edge) | Moderate | High | Similar | Moderate | Similar |
| Max degree ID | 0140 | 0000 | 0316 | 0545 | 0164 |
| (%) | (16.9) | (30.8) | (46.4) | (16.8) | (31) |

In order to verify systems and methods disclosed herein, a real CAN dataset was used and analysis performed on an INTEL Xeon® 3.8 GHz 8-core processor with 32 GB RAM using our proposed algorithm in Python language. For this analysis, about 23K graphs were considered.

For detecting an attack using the chi-squared test, a base hypothesis was built using the exploratory attack-free CAN data. It can be defined as a base distribution. Then, any distribution can be compared with the base hypothesis and differences can be found easily. FIG. 6A is a visual representation of our chi-squared test on an attack-free distribution. Particularly, FIG. 6A is a graph that shows expectedly that the attack-free test distribution and base distributions are identical. One line distribution represents the safe distribution, and on the other represents the distribution under the test. According to analysis, any attack-free test data exhibit a similar pattern to our base hypothesis, as shown in FIG. 6A. After that, test distributions using DoS-, fuzzy-, spoofing, and replay-attacked datasets were built. FIGS. 6B-6D show the chi-squared test on DoS-, fuzzy-, and spoofing-attacked distributions compared with a base hypothesis, respectively. Particularly, FIG. 6B shows that chi-squared test easily distinguishes the base normal distribution and bimodal distribution of DoS-attacked data; (c) chi-squared test detects the fuzzy attack compared with the base hypothesis; and (d) chi-squared test easily distinguishes the base normal distribution and bimodal distribution of spoofing-attacked data.

Among all the CAN monitoring-based attacks, the replay-attacked edge distribution (i.e., FIG. 4D) shows no difference from the attack-free distribution (i.e., FIG. 3A). As a result, the chi-squared test can achieve up to 66% accuracy. To potentially improve, the median test was incorporated by defining outliers, considering median and 3 (standard deviation) values. The prediction accuracy an increase using this technique. Clearly, any of those CAN-monitoring-based attacks can be detected using the techniques disclosed herein. For this analysis, only edge distributions were considered.

FIGS. 7A-7D are tables of data results showing the confusion matrix of the disclosed methodology. The misclassification rate is 9.84% for combined DoS, fuzzy, and spoofing attacks as shown in FIG. 8B. The disclosed subject matter clearly achieve excellent accuracy in detecting all kinds of attacks described in this section when they are individually tested. The misclassification rate is very low. According to our analysis, the mis-classification rate is 5.26%, 10%, 0%, and 4.76% for DoS, fuzzy, spoofing, and replay attacks, as shown in FIGS. 7A-7D, respectively. For fuzzy-, spoofing-, and replay-attacks, we are able to classify all of the test cases successfully. Overall, the proposed methodology has only 4.76% misclassification rate DoS-, spoofing-, fuzzy-, and replay-attacked CAN data.

The robustness of the proposed methodology when multiple intruders attack the CAN, simultaneously, was measured. For this analysis, simultaneous DoS and fuzzy attacks and DoS, fuzzy, and spoofing attacks were considered. The misclassification rate is 13.16% for combined DoS and fuzzy attacks, as shown in FIG. 8A.

The LoS is the probability of rejecting a hypothesis. It can be important for any decision, since the threshold value changes depending on the level of significance and DoF. The DoF was computed using the equation $DoF=(i-1)\times(j-1)$. Here, there are two rows, one for the reference distribution and the other for the test distribution. The empirical rule states that in a normal distribution, 99.7% of the data points should be within (mean 3 (standard deviation)) of the distribution. However, considering the median in place of the mean can give better results. In addition, both the median and the mean signify the central tendency of a distribution, but the median is not affected by anomalous data. As a result, the median value was considered and the reference and test distribution divided into six regions starting from (mean−3 (standard deviation)) to (mean+3 (standard deviation)) in a step of one standard deviation. Hence, our column number is 6. Using the chi-square table, the LoS given the threshold and the degree of freedom was chosen.

FIGS. 10A and 10B are graphs identification of best threshold value with LoS for combined DoS-fuzzy and DoS-fuzzy-spoofing attacks considering the best prediction accuracy. FIG. 10A suggests that a threshold value (9.236) corresponding to a significance level of 0.1 gives us the best prediction accuracy of 86.84 forth combined DoS and fuzzy attacks. Using an LoS of 0.1 and threshold value of 9.236, the disclosed systems and methods can achieve up to 90.16% accuracy for combined DoS, fuzzy, and spoofing attacks, as shown in FIG. 10B.

The efficiency of the disclosed subject matter was evaluated to detect an attack in a CAN message by comparing it to one of the state-of-the-art IDS. In this analysis, a previous approach in the same experimental environment using the same real vehicular CAN message dataset to estimate the effectiveness of the presently disclosed subject matter. In the dataset, the attacker targeted the revolutions per minute of an actual vehicle to perform a spoofing attack. When the spoofing attack was considered, the proposed methodology has 13.73% better accuracy compared to the existing method, as shown in Table III below. When a fuzzy attack is considered, the present disclosed may exhibit comparable accuracy, however, for DoS attack, the present disclosure shows 5.26% lower accuracy to the existing ID sequence method. One of the most attractive features of the present disclosure is it can detect replay attack with 95.24% accuracy, while the existing method could not detect any replay attacks. FIG. 11 shows the misclassification rate of proposed method compared with the state-of-the-art. The current approach requires much lower computation time compared to the proposed method due to the more straightforward implementation. However, the proposed methodology requires only up to 258.9 μs to detect an attack.

TABLE III

The present disclourse can successfully detect all four (i.e., DoS-, fuzzy-, spoofing- and replay) kinds of attacks with reasonable accuracy; however, existing ID sequence methodolgy cannnot detect any replay attacks.

| Type | Method | Accuracy (%) | TPR (%) | FPR (%) | TNR (%) | FNR (%) | Time (μs) |
|---|---|---|---|---|---|---|---|
| DoS | ID sequence ([27]) | 100 | 99.12 | 100 | 0.88 | 0 | 4.2 |
|  | Proposed (LoS = 0.01) | 94.74 | 100 | 92.86 | 0 | 7.14 | 217.5 |
| Fuzzy | ID sequence ([27]) | 99.04 | 98.97 | 99.39 | 1.03 | 0.61 | 3.2 |
|  | Proposed (Los = 0.1) | 100 | 100 | 0 | 100 | 0 | 165.7 |
| Spoofing | ID sequence ([27]) | 86.23 | 99.3 | 53.93 | 46.07 | 0.7 | 5 |
|  | Proposed (Los = 0.1) | 100 | 100 | 0 | 100 | 0 | 258.9 |
| Replay | ID sequence ([27]) | — | — | — | — | — | — |
|  | Proposed (Los = 0.1) | 95.24 | 90.91 | 100 | 9.01 | 0 | 225.7 |

Figure 7A:
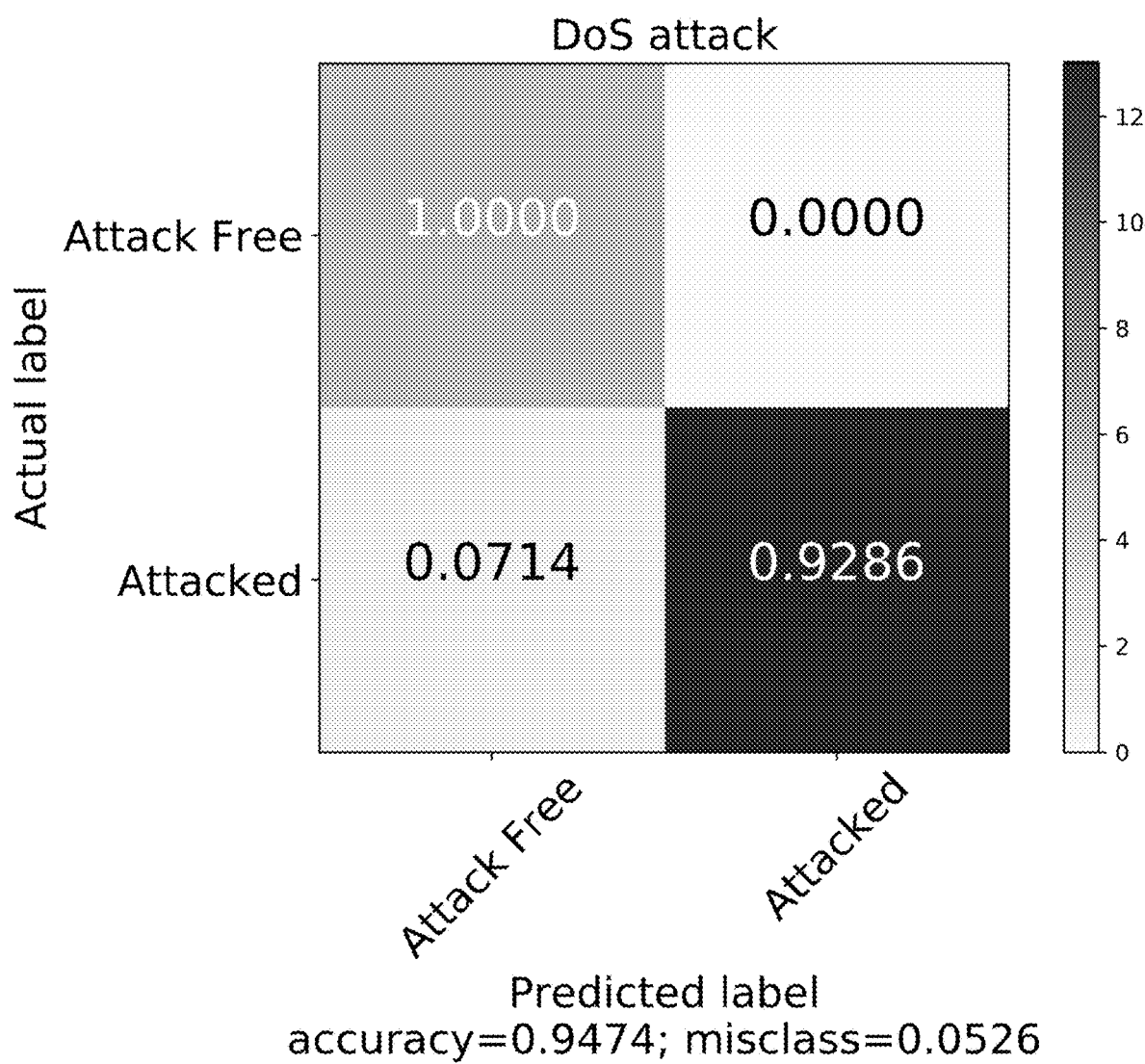
Figure 7B:
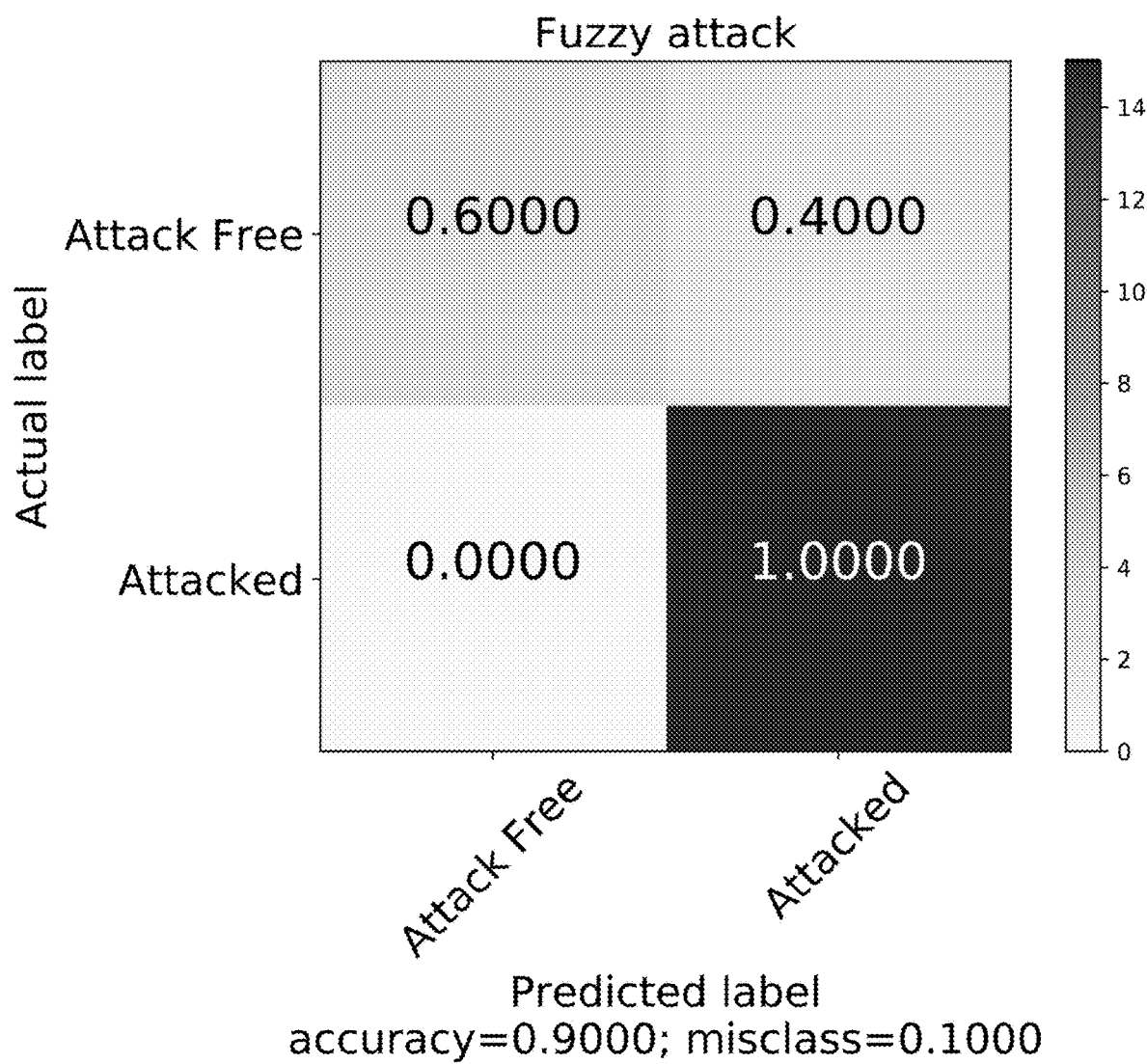
Figure 7C:
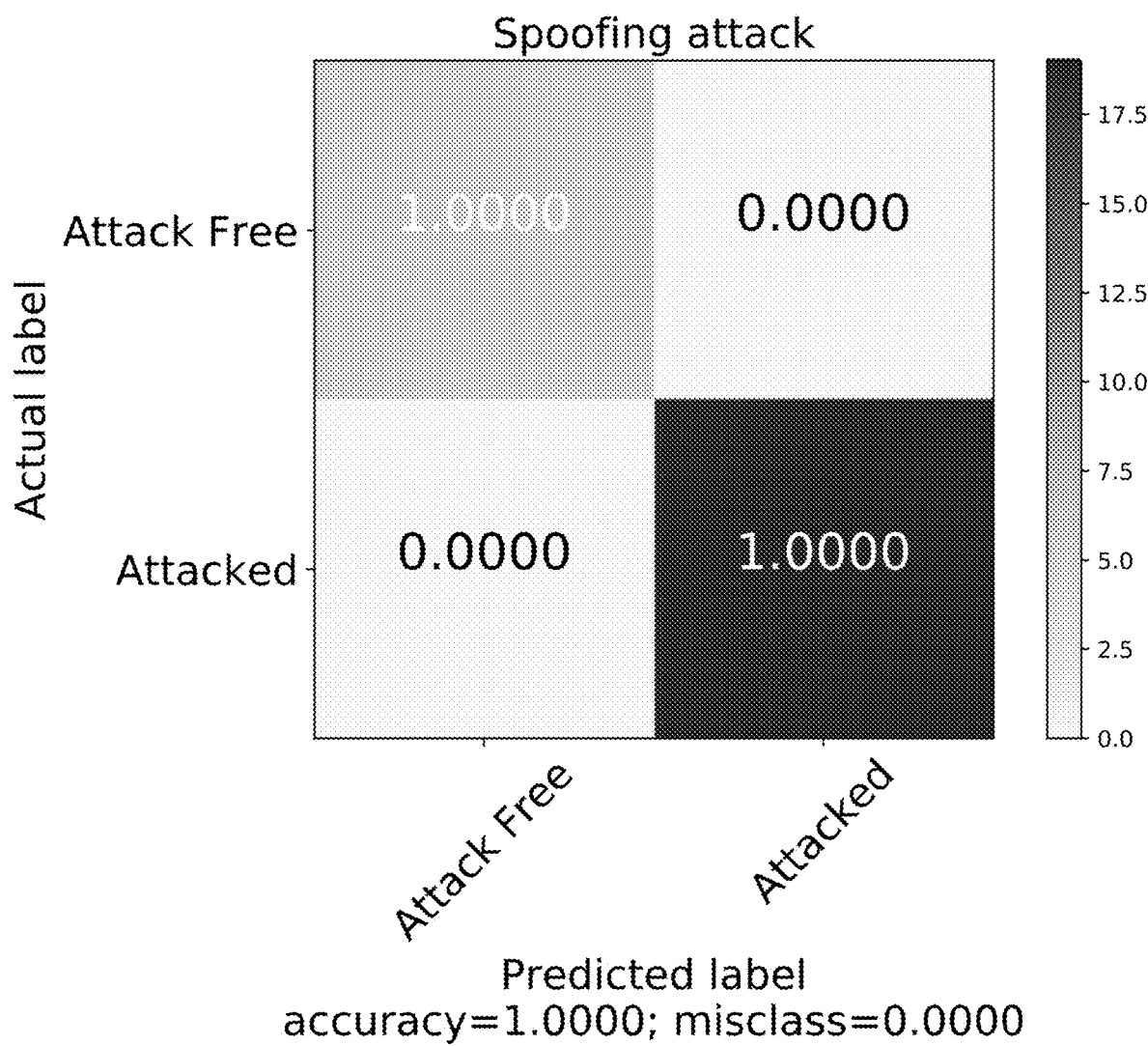
Figure 7D:
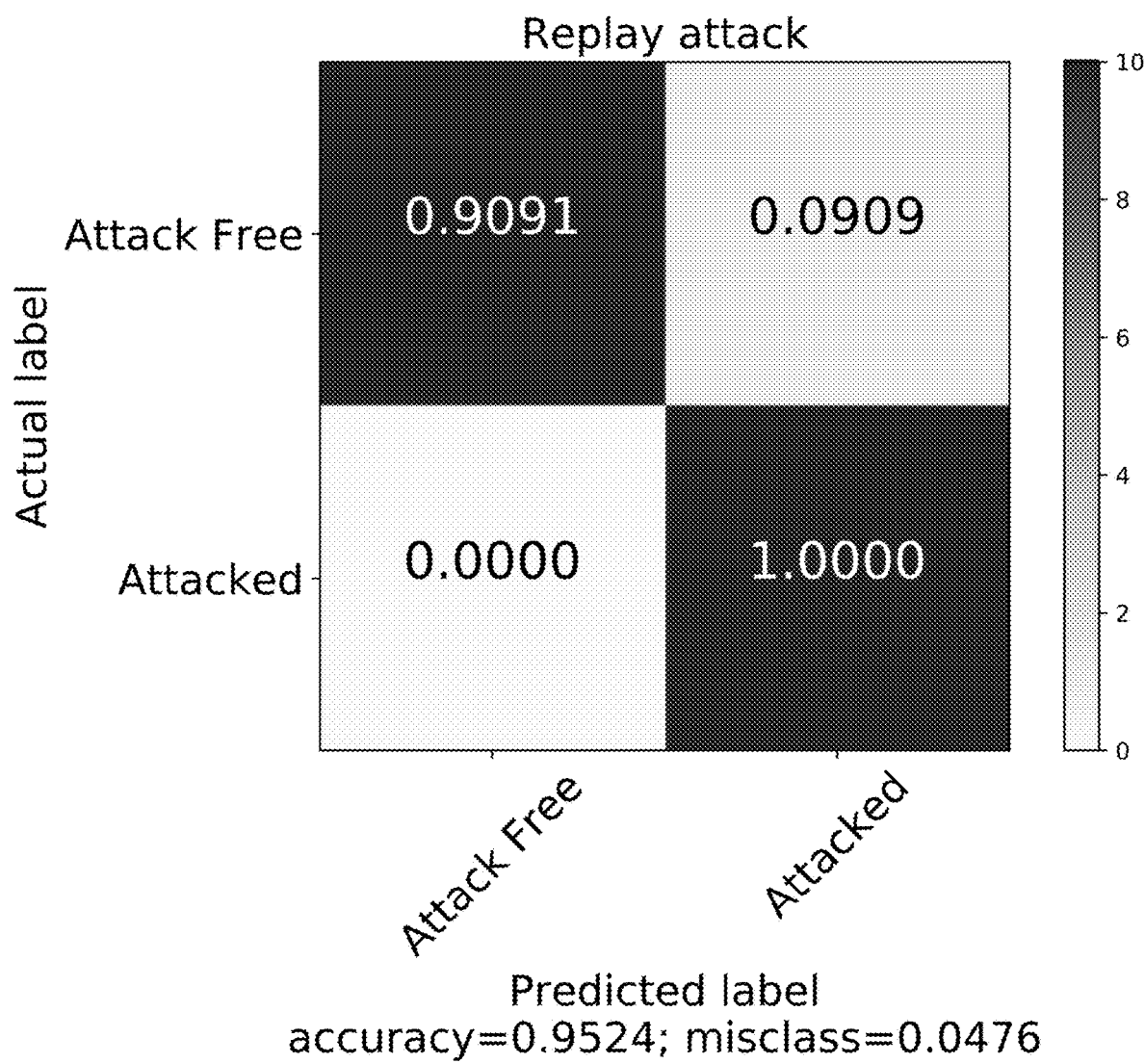
Figure 9A:
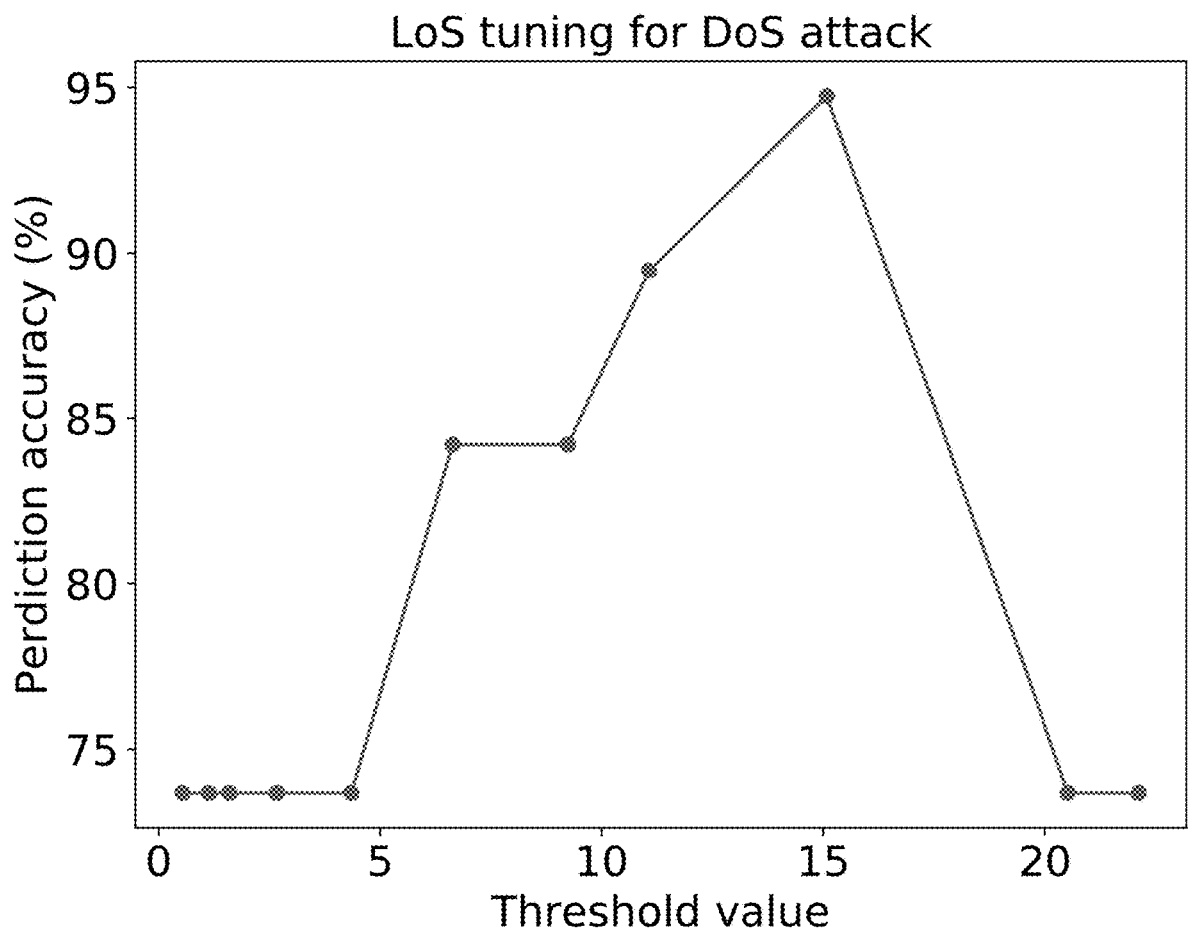
Figure 9B:
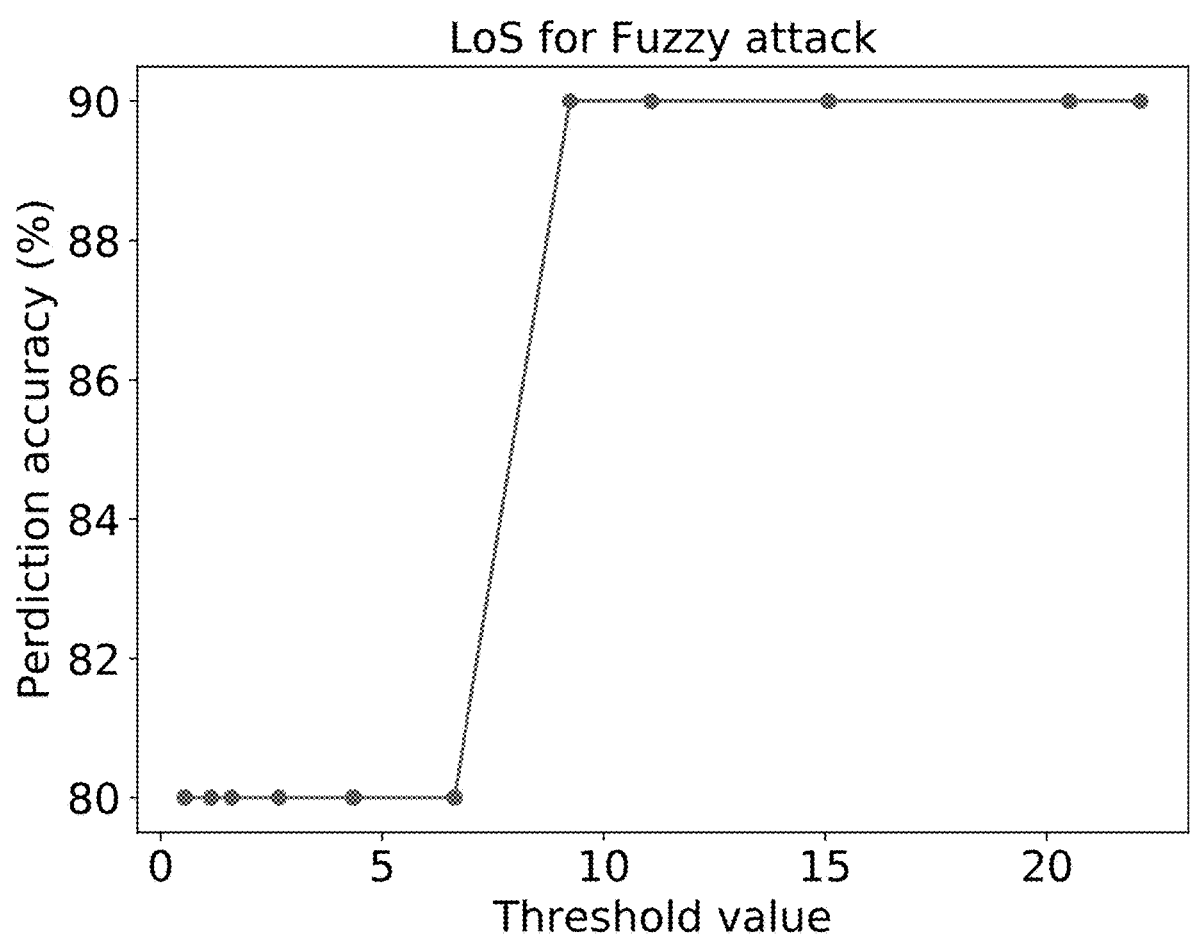
Figure 9C:
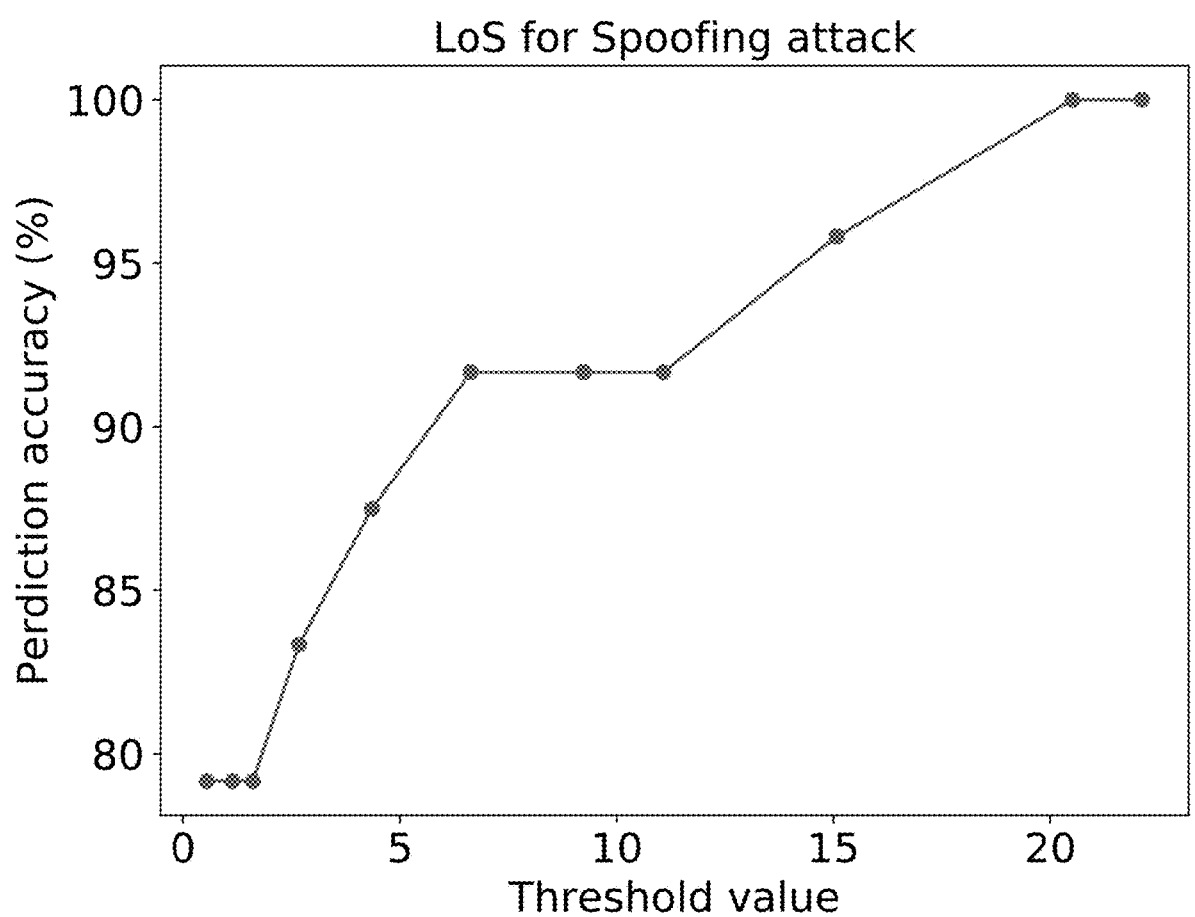
Figure 9D:
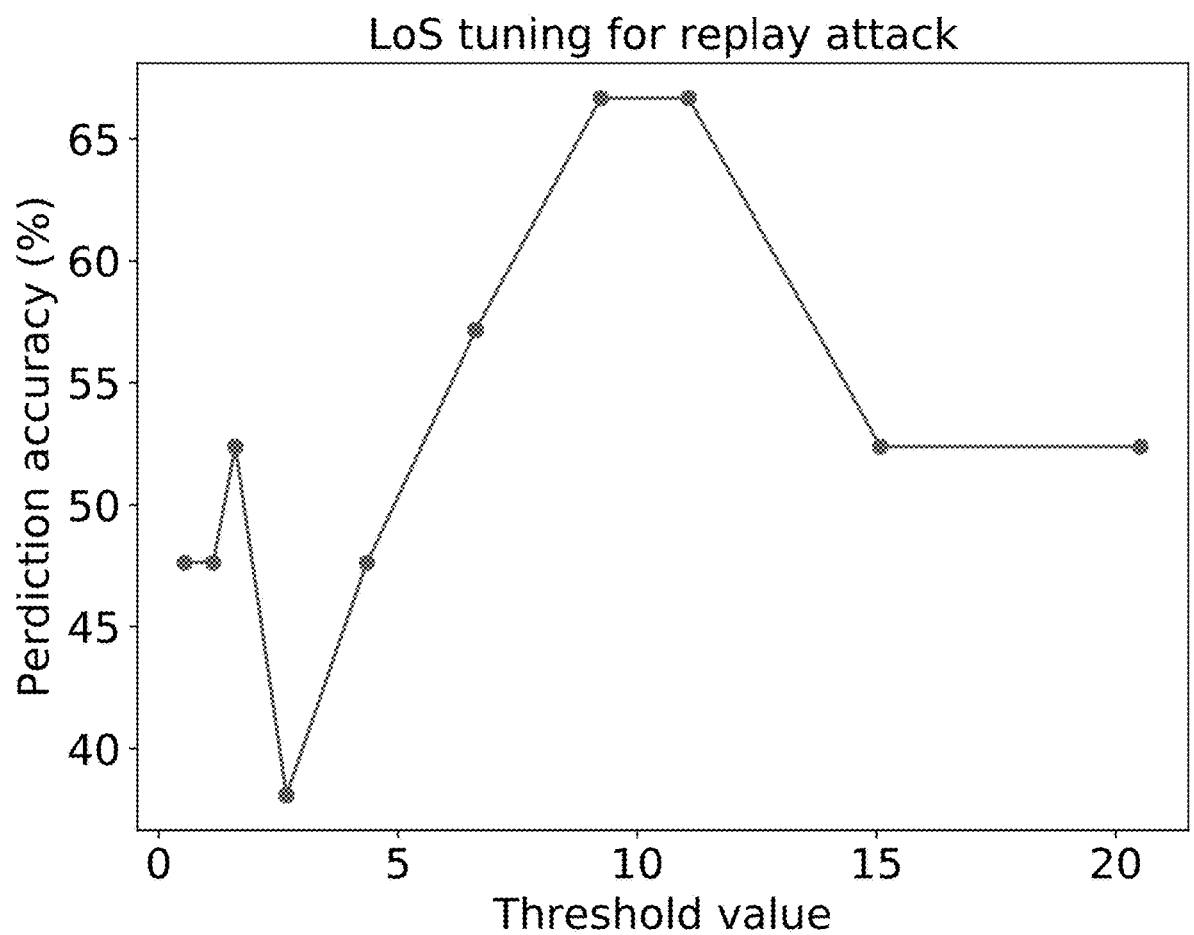

Test results show the best LoS that can be chosen corresponding to the threshold value for comparing attack-free or attacked distributions. According to analysis, the distributions of different attacks have different patterns. Hence, a different level for DoS, fuzzy, spoofing, and replay attacks is proposed. FIGS. 9A-9D are graphs that show identification of the best threshold value with level of significance considering the best prediction accuracy. FIG. 9A suggests that a threshold value (15.086) corresponding to a significance level of 0.01 gives us the best prediction accuracy for a DoS attack. In terms of spoofing and fuzzy attacks, a significance level of 0.001 (threshold 20.515) and 0.1 (threshold 9.236) is proposed, as shown in FIGS. 9B and 9C, respectively. Using a significance level of 0.1 and threshold value of 9.236, the proposed chi-squared test technique can achieve up to 66% accuracy, as shown in FIG. 9D. However, when a median test is introduced, the prediction accuracy increases up to 95.24% as shown in FIG. 7D.

As the involvement of modern technologies in the vehicular industry is increasing the number of cyber threats, there is a need for a robust security mechanism to detect them. Here, the characteristics of all kinds of CAN monitoring-based attacks were analyzed and a four-stage IDS disclosed with the help of graph theory, statistical analysis, and the chi-square method.

Experimental results show that there is a very low misclassification rate in detecting attacks or attack free data. In terms of DoS, it is only 5.26%; for the fuzzy attack, it is 10%; for replay attack, it is 4.76%; and finally, for a spoofing attack, all the malicious attacks were detected. The proposed methodology exhibits up to 13.73% better accuracy compared to existing ID sequence-based methods. For strong replay attacks, the disclosed systems and methods were not only able to find an attack when it occurred for an infected CAN arbitration ID, but also were able to mark the uninfected arbitration IDs as safe.

Graph-Based Gaussian Naive Bayes Intrusion Detection

In accordance with embodiments, graph-based Gaussian naive Bayes (GGNB) systems and methods are disclosed. These systems and methods can be applied to CAN systems and any other suitable vehicular communications network systems. Particularly, herein intrusion detection systems and methods are disclosed that leverage graph properties and PageRank-related features. In experiments, these systems and methods exhibited excellent detection accuracy considering DoS, diagnostic, fuzzing CAN ID, fuzzing payload, re-play, suspension, and mixed attacks.

The application of vehicular ECUs depends on intra- and inter-vehicular communication networks' performance. These communications are vehicle-to-vehicle, vehicle-to-infrastructure, and vehicle-to-cloud. Any cyber or physical attack on these communication networks can have severe consequences, including private data leakage, financial loss, and jeopardizing human life. As a result, it is imperative to secure these networks of modern vehicular systems.

The typical automotive data communication networks include twisted wire paired CAN, single-wire local interconnect network (LIN), FlexRay, and optical communication-based media oriented systems transport (MOST). FIG. 12 illustrates a perspective, cut-away view of an intra-vehicular communication system that utilizes CAN for collision detection, MOST for audio-visual bridging, and time-sensitive ethernet networking, FlexRay for a brake-by-wire system, and LIN for a multifunctional keyless system. The presently disclosed systems and methods may be applied to the systems of FIG. 12 for intrusion detection. For example, systems and methods disclosed herein can apply a graph-based model in naive Bayes algorithm for CAN intrusion detection. Further, the presently disclosed subject matter provide techniques for detecting any CAN monitoring attacks, including mixed attacks without modifying the protocol. It is the first algorithm that integrates common graph properties with PageRank (PR)-related features into a GNB algorithm. In experiments, the systems and methods disclosed herein have exhibited 98.57% detection accuracy. Further, the presently disclosed systems and methods can yield many fold reduction in run-time compared to current techniques. Also, a field-programmable gate array (FPGA) implementation of the GGNB embodiments disclosed herein can require 5.7×, 5.9×, 5.1×, and 3.6× fewer slides, LUTs, flip-flops, and DSP units, respectively, than current techniques.

In accordance with embodiments, graph-based anomaly detection systems and methods are disclosed that can secure the CAN bus communication system. Embodiments of the disclosed subject matter are based on the PageRank (PR) analysis for detecting anomalies. FIG. 13 illustrates a graph depicting an example four-vertex directed graph for PageRank computation. Referring to FIG. 13, the graph has four vertices A, B, C, and D. PR is initialized to the same value for all vertices, which assigns a probability distribution between 0 and 1. So, the initial probability distribution of each C is k=0.25, where n is the total number of vertices.

Every vertex can contribute PR to other vertices with the outgoing edges. As a result, vertex D can contribute to A, B, and C vertices. Since D has three outlines, it can divide its PR equally into three parts. Here, the PR of A is computed as, $$PR(A) = \frac{PR(B)}{Outdegree(B)} + \frac{PR(C)}{Outdegree(C)} + \frac{PR(D)}{Outdegree(D)}$$

where Outdegree (B) is the number of edges exiting from B. PR of each vertex is computed, and the PR value is assigned. The iteration may stop when there is no update of PR of vertices. The PR values of vertices for both attacked and attack-free graphs are computed. To identify the significance of PR values, an analysis of many graphs was performed. Based on observation, PR plays a vital role in detecting anomalies. Empirically, the distribution of PR values among attack-free vertices is significantly different from the attacked vertices. In an attack-free graph, the distribution of PR among different vertices is similar, whereas, in an attacked graph, the PR values of attacked vertices are significantly different from other vertices in the graph. As a result, PR-related features can be used for anomaly detection by systems and methods disclosed herein. When an intruder mounts a DoS attack on a network, it can flood the communication network with a certain ID with high priority. We depict a similar situation in FIGS. 14A and 14B. FIG. 14A illustrates a graph where each vertex has an equal 0.25 PR value. FIG. 14B illustrates a graph when a DoS attack is introduced with the PR value of 0000 ID is significantly higher than the other vertices. Referring to FIG. 14A, this figure shows a simple graph with each vertex with equal 0.25 PR value. On the other hand, FIG. 14B shows an example when vertex ID with 0000 has a PR value of 0.45, which is significantly higher than the other vertices of that graph. Algorithm 3 below shows the PR and other PR-related feature computation steps. All the necessary variables from Line 4 to Line 7 were initialized. The minimum, median, and maximum PR values of every graph $g_i \in G$ in Line 8 to Line 13 were iteratively computed.

Embodiments of the disclosed graph-based intrusion detection systems and methods can use a Gaussian naive Bayes (GNB) classifier. The GNB can follow Gaussian normal distribution and supports continuous data. In general, naive Bayes uses the posterior probability of Bayesian rule to infer a classification label from input feature distribution. The conditional posterior probability can be defined as the probability of an event (A) occurring given the probability of another event that has already occurred (B) and can be expressed as $$P(A|B) = \frac{P(A \cap B)}{P(B)} = \frac{P(A) \cdot P(B|A)}{P(B)}$$

where P(A) and P(B) are distributions of events A and B, respectively. GNB classifiers assume that features are independent of each other and require a small training data to estimate the parameters needed for classification. Since it is assumed that the likelihood of the features to be Gaussian. So, the likelihood probability is given by:

$$P(x_i | y = y') = \frac{1}{\sqrt{2\pi\sigma_x^2}} \exp\left(-\frac{(x_i - \mu_x)^2}{2\sigma_x^2}\right)$$

where μ, is the mean, and a is the standard deviation. Assume that we have an unknown binary outcome Y and n continuous features of x. As we have a binary label, y is Bernoulli, which can be defined by setting a positive probability. The likelihood of fx Y(X|Y) is the distribution of the observation for the known outcome.

The updated knowledge or posterior about the unknown after observation is PY|X(y|x). The Bayes rule can be expressed as $$p_{Y|X}(y \mid x) = \frac{p_Y(y) f_{X|Y}(x \mid y)}{\sum_{y'} p_Y(y') f_{X|Y}(x \mid y')}$$

The above equation is true for the n continuous variables X=Xo, X1, ..., Xn−1 and can be expressed as, $$p_{Y|X_0,X_1,\ldots,X_{n-1}}(y \mid X_0, X_1, \ldots, X_{n-1}) = \frac{p_Y(y) \prod_{i=0}^{n-1} f_{X_i|Y}(x_i \mid y)}{\sum_{y'=0}^{1} p_Y(y') \prod_{i=0}^{n-1} f_{X_i|Y}(x_i \mid y')}$$

Now a sample example of an attack detection mechanism is provided. In this example, it is assumed that in a certain number of graphs, there is the probability of attacked and attack-free graphs being 0.5. Subsequently, the normal distribution of each feature of those graphs is computed. To identify a graph with Vi vertices and Ei edges whether it is attacked or attack-free, the likelihood (L) condition is utilized as sAtt=P(att)*L(Nodes=V$_i$|att)*L(Edges=E$_i$|att)

sAttFr=P(attFr)*L(Nodes=V$_i$|attFr)*L(Edges=E$_i$|attFr)

where P(att) and P(attfr) are probability of attack and attack-free data, respectively. And If sAtt and sAttFr values are underflow, a log function before them can help to restore a comparable value. The algorithm compares the sAtt and sAttFr values to decide if the graph is attacked or attack free. If sAtt is greater than sAtt Fr then the graph is attacked. Table IV below shows the list of features that can be used in an anomaly detection method and system in accordance with embodiments of the present disclosure.

TABLE IV

The proposed methodology uses graphs' vertices, edges, degrees, and PageRank-related features for classification.

| Features | Names |
|---|---|
| Number of nodes in a graph | Nodes or Vertex |
| Number of edges in a graph | Edges |
| Maximum number of in-degree in a graph | Maximum indegree |
| Maximum number of out-degree in a graph | Maximum Outdegree |
| Minimum number of in-degree in a graph | Minimum Indegree |
| Minimum number of out-degree in a graph | Minimum Outdegree |
| Median of PageRanks among nodes in a graph | Median PageRank |
| Maximum of PageRanks among nodes in a graph | Maximum PageRank |
| Minimum of PageRanks among nodes in a graph | Minimum PageRank |

---

Algorithm 3 PageRank-related features extraction algorithm

```
1:  Input: G, collection of graphs;
2:  Output: The list of minimum, median, and maximum PR of each graph in G;
3:
4:  graph List = [ ]    ▷ initializing the list of the PR of every vertex from each graph
5:  graphListWithMaximumPR[ ]   ▷ initializing the list of the median PR from each graph
6:  graphListWithMaximumPR[ ]   ▷ initializing the list of the maximum PR from each graph
7:  graphListWithMaximumPR[ ]   ▷ initializing the list of the minimum PR from each graph
8:  for all g_i ∈ G: do
9:      graphList[i] =PR(g_i)   ▷ PR (g_i) computes the PR of every vertex of g_i
10:     graphListWithMedianPR[i] = median(graphList[g_i])
11:     graphListWithMaximumPR[i] = maximum(graphList[g_i])
12:     graphListWithMaximumPR[i] = minimum(graphList[g_i])
13: end for
```

---

An anomaly detection method in accordance with embodiments of the present disclosure is shown in Algorithm 4. It accepts raw CAN data and window size as inputs and predicts whether the input is attacked or attack-free. For the analysis, ~23 ms was used as the window size considering 1 Mbit/s CAN speed. This algorithm can first create a list of graphs g1, g2 . . . , gn named G based on the user-provided window size in Line 4. The CAN message IDs can act as vertices, and an edge can be constructed between two vertices depending on their sequence. Different list variables from Line 5 to Line 10 can be declared. In Line 11, a for loop was declared. In each iteration of the for loop, nodes, edges, maximum in-degree, maximum out-degree, minimum in-degree, minimum out-degree from each graph g are collected from Line 10 to Line 18. Then the PR-related features were computed using the Graph ListPage Rank(G) function which calls the Algorithm 3 in Line 19. The data processing and labeling are performed in Line 19. In between Line 21 and Line 22, the data and label s were split into training and test sets and fit the data into a GNB model. Attack prediction is performed in Line 23.

```
1: Input: Raw CAN data, WindowSize;
2: Output: Prediction; < > Atta cke d if Prediction is correct else benign
3:
4: G = CreareGraph( RawCANdat a. WindowSize)
5: graphListWirhMaximumIndegree =[ ]          < > initializing the list of maximum in-
degree from each graph
6: gra phLisrWirhMaximum 0 utdegree =[ ]      < > initializing the list of maximum
out-degree from each graph
7: gra phLisrWirhMinimumIndegr ee = [ ]       < > initializing the list of minimum in-
degree from each graph
8: gra phLi srW irhM inimum Ourdeg ree =[ ]   < > initializing the list of minimum
out-degree from each graph
9: grap hLi srW irhNodesNumb er =[ ] < > in itializing the list of number of nodes
from each graph
10: gra phListW irhEd gesN umber = [ ]        < > initializing the list of number of
edges from each graph
11: for all g; E G: do
12: grap hLi st W irh NodesNumber [ i ] = numberOfNodes(g;)
13: graphListW it hEdges Numb er [ i ] = numberOf Edges(g; )
14: graph List W ithMaximu m Inde gree[ i ] = maximumI ndegree(g; )
15: graph List W ithMaximumOutdegree[i ] = maximumOurdegr ee(g; )
16: graphList WithMinimumI ndegree[i ] = minimumInde gree (g;)
17: grap I, List WithMinimumOutd egree[i ] = minimumOutdegree (g; )
18: end for
19: { Page RankFea tu resList ) =GraphLisrPageRank(G) < > extrac t PR-r elated
feature
    using Algorithm 3
20: {da ta , labels) = pr ocessDara ( )
21: train , rest , rra inl abels, resr I abels = tra inT esrSplit (dara, labels) < > sp
litting the data and labels for training and testing
22: model= gaussianNb (rra in , trainLabels )
23: predictions= model.pr edict(r est )
```

For verifying the proposed methodology, real CAN data was used and analysis performed on an INTEL XEON® Silver 3.2 GHz 20-core processor with 48 GB RAM by using our proposed methods in Python language. In our research, we used raw CAN attacked and attack free data. This data set is referred to as rawCAN. The attacked data includes DoS, fuzzy, spoofing, and replay attacks. Besides, the mixed attacks that have all four kinds of attacks were considered. From the raw CAN bus data, ~18.5K, ~37K, ~38K, ~42K, and ~19K, and ~80K attack free, DoS, fuzzy, spoofing, replay, and mixed attacked graphs were built.

To apply the example GGNB-based anomaly detection method, the example graph features listed in Table IV below. Besides, PR-related features to help detect anomalies were identified. It primarily helps removing the non-informative features from the model. Feature importance was computed for DoS, fuzzy, spoofing, replay, and mixed attacked data, as shown in FIGS. 15A-15E, which illustrate graphs showing that Maximum Indegree, Maximum Outdegree, and Maximum PageRank have the highest feature importance for DoS, spoofing, and mixed attacks, respectively, and nodes and edges have the highest feature importance for fuzzy and replay attacks. For this analysis, permutation feature importance suitable for tabular data was used. This model shuffles a single variable for feature importance computation to break the relationship between the feature and the target.

TABLE V

| Types of attacks | SVM [5] | | | DCNN [6] | | | CNB | | | MNB | | | GGNB | | |
|---|---|---|---|---|---|---|---|---|---|---|---|---|---|---|---|
| | Pr | Re | F1 | Pr | Re | F1 | Pr | Re | F1 | Pr | Re | F1 | Pr | Re | F1 |
| Dos | 0.46 | 0.89 | 0.61 | 1.0 | 0.9989 | 0.9995 | 0.9969 | 1.0 | 0.9985 | 0.9966 | 1.0 | 0.9983 | 0.9979 | 0.9975 | 0.9977 |
| Fuzzy | | | | 0.9995 | 0.9965 | 0.9980 | 0.9945 | 1.0 | 0.9972 | 0.9899 | 1.0 | 0.9949 | 0.9989 | 0.9989 | 0.9989 |
| Spoofing | | | | 0.9999 | 0.9992 | 0.9995 | 0.9599 | 0.9997 | 0.9794 | 0.9596 | 1.0 | 0.9794 | 0.9605 | 0.99634 | 0.9781 |
| Replay | | | | | | | 0.9960 | 0.8561 | 0.9208 | 0.9960 | 0.8576 | 0.9216 | 0.9974 | 0.8714 | 0.9301 |
| Mixed | | | | | | | 0.8889 | 0.9956 | 0.9392 | 0.8889 | 0.9992 | 0.9408 | 0.9978 | 0.9491 | 0.9728 |
| Overall | | | | | | | 0.9498 | 0.9807 | 0.9650 | 0.9488 | 0.9822 | 0.9652 | 0.9911 | 0.9655 | 0.9781 |

The mean differences of the sample features were computed after quantile transformation, which shows that distinctions are balanced around zero, as shown in FIGS. 16A and 16B. FIG. 16A is a graph showing mean differences between the two classes having symmetric spread in both positive and negative direction. FIG. 16B is a graph showing that variance differences of the feature samples are entirely on the positive side. However, the variance differences of the feature samples are entirely on the positive side. So, FIG. 16B depicts that the positive likelihood distributions are more concentrated around their means than the negative ones. These indicate the discriminating power of the model. Data can be classified if the mean difference is far away from the distributions' centers, or the variance difference is greater than the distributions' spread. The classification becomes easier with the larger difference in the spread.

After quantile transformation, two features were identified, Maximum Indegree and Maximum Outdegree, which distinguish the two classes very well. To detect positive or negative class, a closeness was observed between the transformed values of these two features for any graph. Hence, a two-dimensional plot using the mixed attacked data provides a straight line through the origin, as shown in FIGS. 17A and 17B. FIGS. 17A and 17B are graphs showing separation of classes using Maximum Indegree and Maximum Outdegree features considering quantile transformed feature, and original feature values of mixed attacks, respectively. The transformed features can maintains range of values for most of the graphs of each class. So, after plotting altered Maximum Indegree and Maximum Outdegree features, a good separation can be observed between negative and positive class as shown in FIG. 17A. Even without quantile transformation, the original features' values can separate the classes efficiently, as demonstrated in FIG. 17B. Hence, using these features, the presently disclosed methods work well for detecting attacked and attack free graphs.

The quantile transformation of the features can help to identify the classes. Then, the transformed feature s' mean and standard deviations can be computed for both positive and negative categories. For the transformed features s' mean and standard deviations for both positive and negative categories. For the transformed Maximum Indegree and Maximum Outdegree, random values in the range from $\mu$-to-$\pm 3\sigma$ can be selected. When the resulting values are drawn, it can clearly distinguish two classes, as shown in FIG. 18, which illustrates a graph showing that quantile transformed features values in the range from $\mu$-to-$\pm 3\sigma$ can clearly separate attack and attack-free data.

Figure 19A:
Figure 19B:
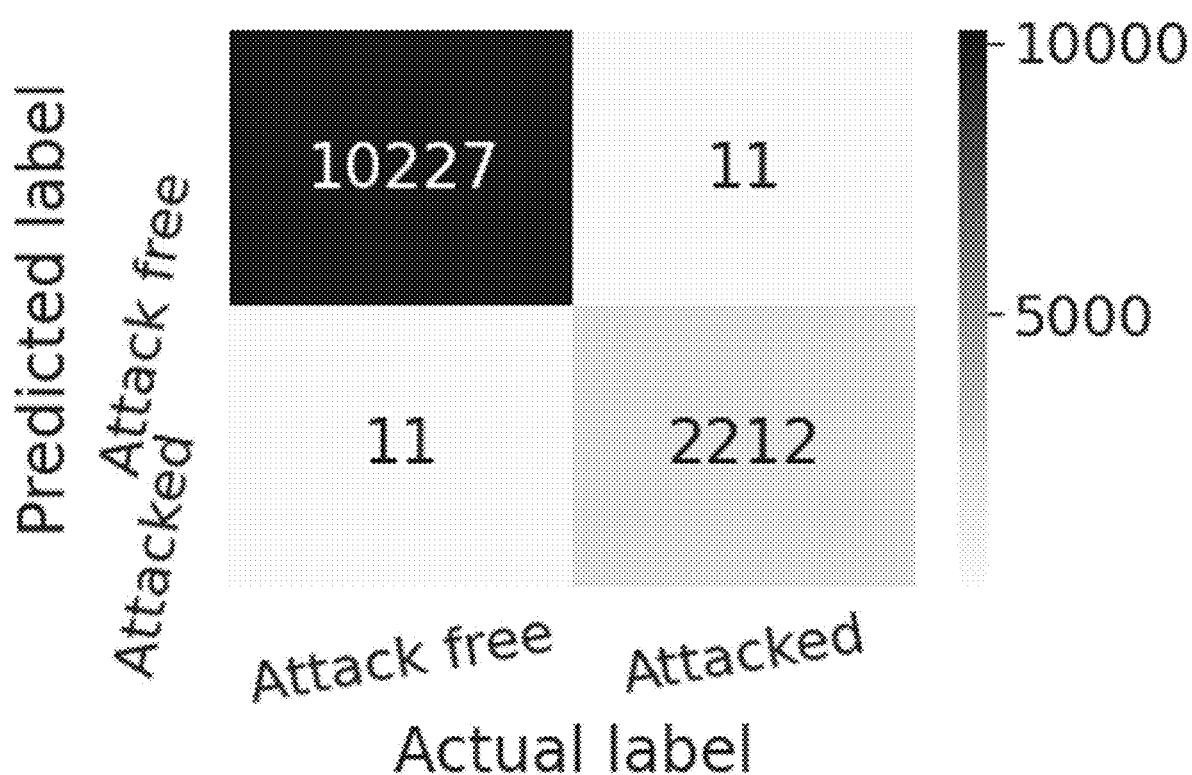
Figure 19C:
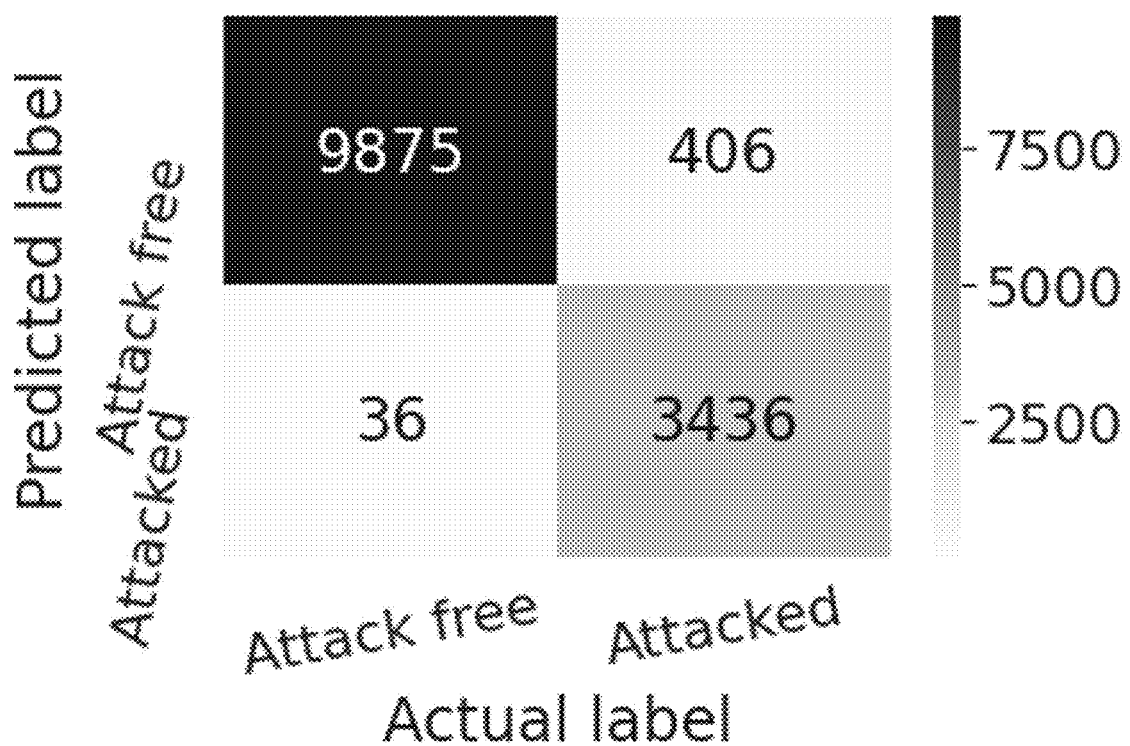
Figure 19D:
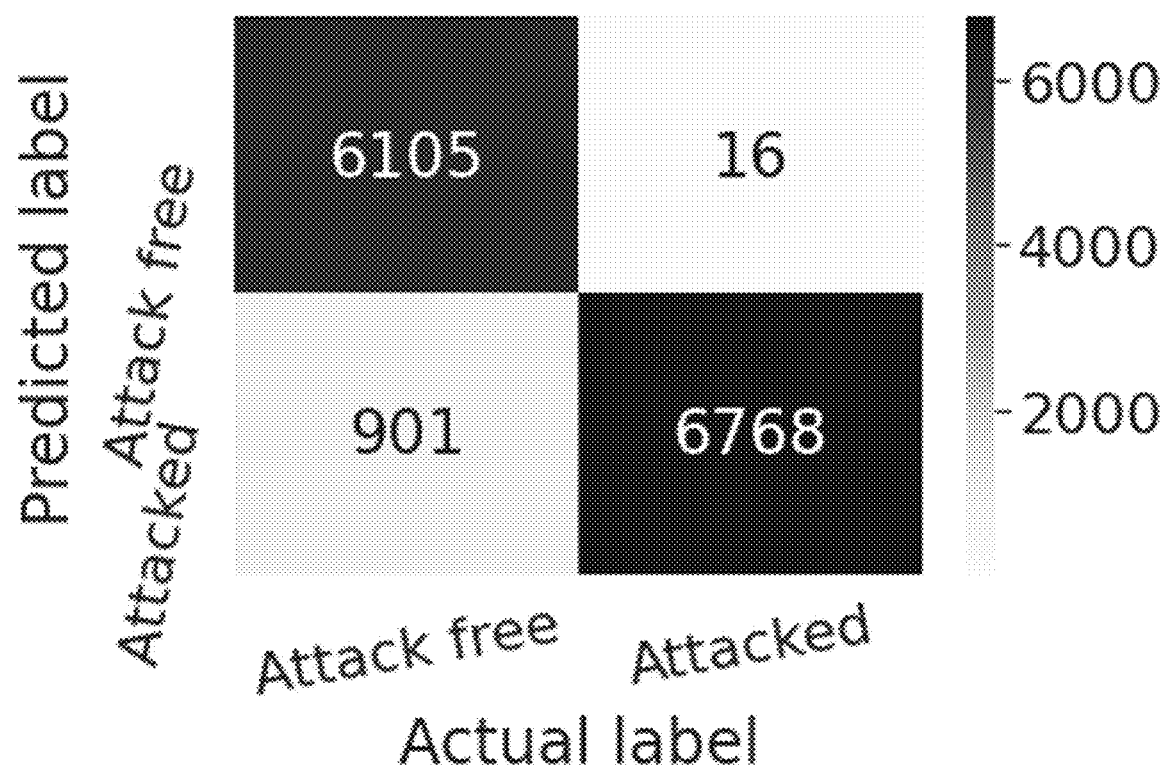
Figure 19E:
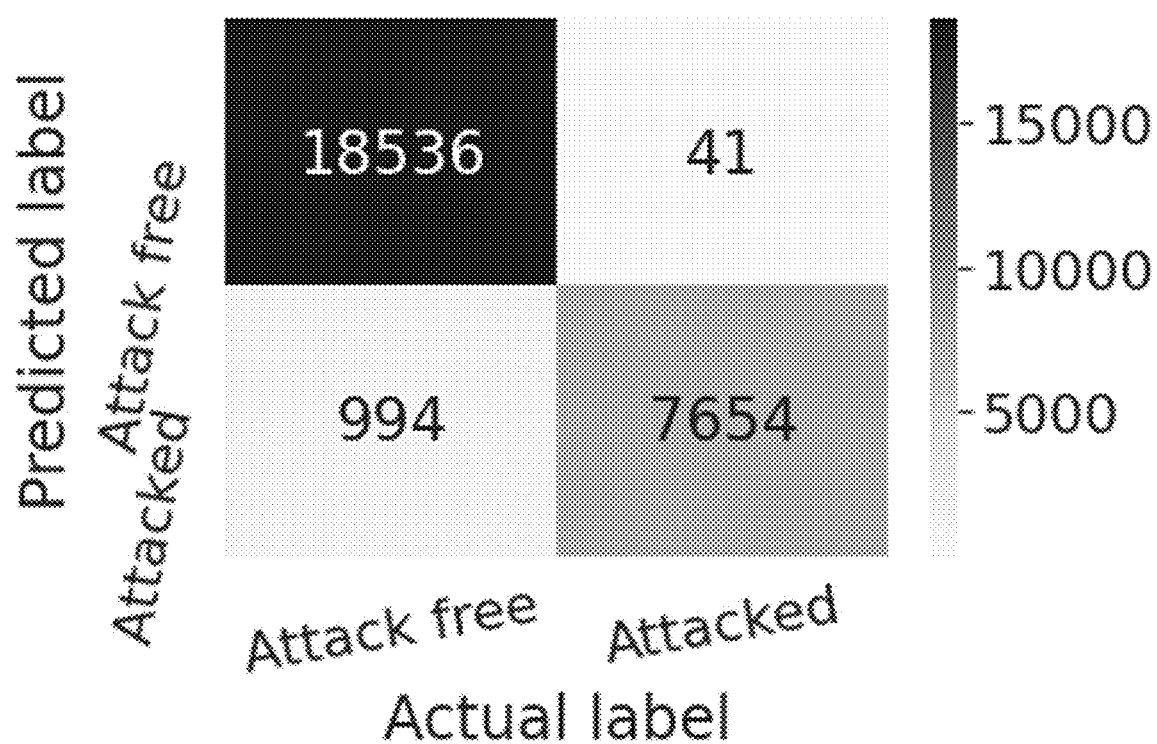
Figure 20A:
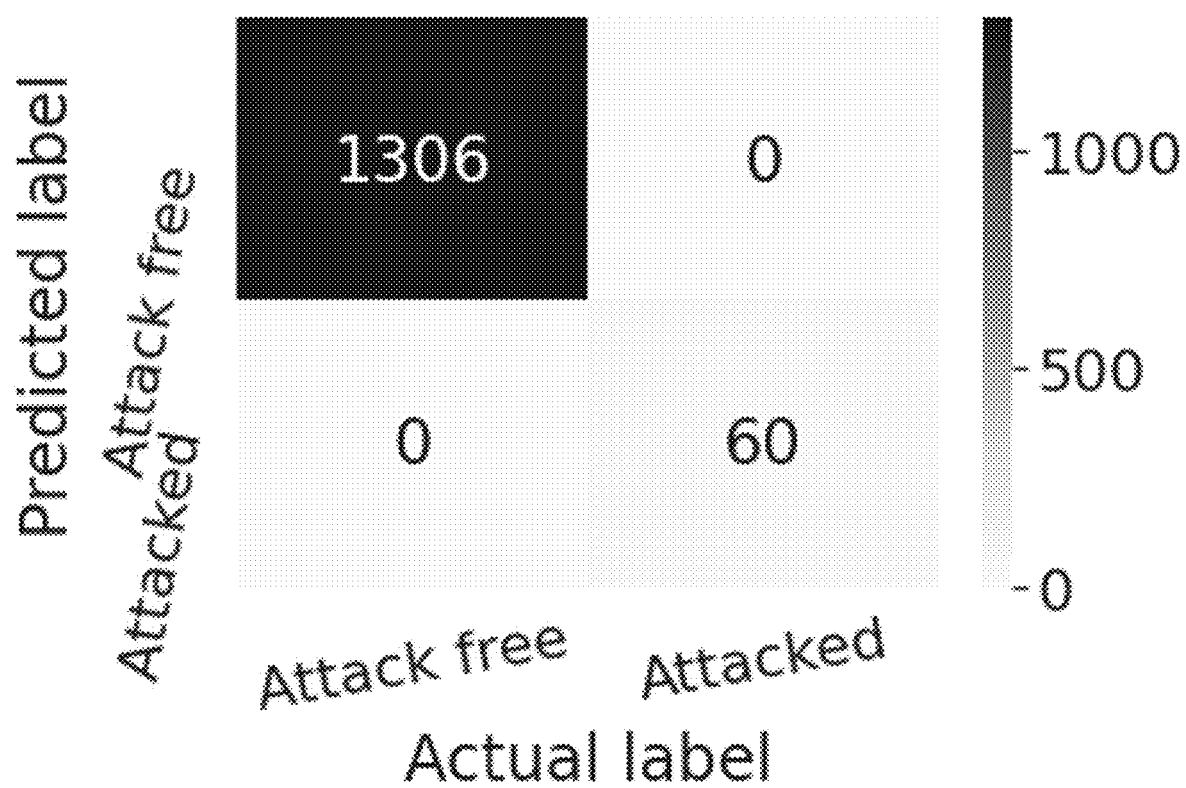
Figure 20B:
Figure 20C:
Figure 20D:
Figure 20E:

An example method can use 67% and 33% data for training and testing, respectively. The proposed algorithm efficiently detected DoS, fuzzy, spoof, and replay attacked graphs and detect any mixed attacks. Methods disclosed herein can have 99.61%, 99.83%, 96.79 and 93.35% detection accuracy considering DoS, fuzzy, spoofing, and replay attacks, respectively. FIGS. 19A-19E are tables showing the confusion matrix of DoS, fuzzy, spoofing, and replay attacks. One of the major advantages of using proposed techniques is it can detect mixed attacks. According to our analysis, the proposed methodology has 96.20% detection accuracy for the mixed attacks, as shown in FIG. 19A.

In a confusion matrix, the precision indicates the proportion of correctly predicted positive cases, and a high precision indicates the low false-positive rate of an algorithm. Recall tries to identify all actual positive cases, which is the ratio of correctly predicted positive observations to all the actual class observations. The F1 score is the harmonic mean of precision and recall. All three metrics were analyzed for the DoS, fuzzy, spoofing, replay, and mixed attacks. An example of the presently disclosed method was compared method has 10.75% and 38.77% better recall and F1 scores, respectively, than the state-of-the-art SVM classifier. Overall, the proposed methodology has 99.11%, 96.55%, and 97.71% of precisions, recall, and F1 scores, respectively. Among different naive Bayes algorithms, GGNB has better precision than CNB and MNB. However, CNB and MNB have slightly better recall and comparable scores than the GGNB algorithm, as shown in Table V.

In order to verify the efficiency of the disclosed methods, raw CAN attacked and attack free OpelAstra data set was used. The attacked data includes DoS, diagnostic, fuzzing CAN ID, fuzzing payload, replay, and suspension attacks. Besides, we consider the mixed attacks that have all six kinds of attacks. From the raw CAN bus data, ~13.5K, ~17.6K, ~17.5K, ~17.5K, ~17.5K., ~17.5K, and ~17.5K, and ~37.7K attack free, DoS, diagnostic, fuzzing CAN ID, fuzzing payload, replay, suspension, and mixed attacked graphs were built. The disclosed methods efficiently detected DoS, diagnostic, fuzzing CAN ID, fuzzing payload, replay, suspension, and detect any mixed attacks. The disclosed methods have 100%, 99.85%, 99.92%, 100% and 99.92% detection accuracy considering DoS, diagnostic, fuzzing CAN ID, fuzzing payload, and replay, respectively. FIGS. 20A-20E show the confusion matrix of DoS, diagnostic, fuzzing CAN ID, fuzzing payload, and replay attacks. Particularly, FIGS. 20A-20E are graphs showing the Maximum Indegree, Maximum Outdegree, and Maximum PageRank that have the highest feature importance for DoS, spoofing, and mixed attacks, respectively, and nodes and edges having the highest feature importance for fuzzy and replay attacks. In addition, the proposed methodology has 97.75% and 99.57% detection accuracy for the suspension and mixed attacks, as shown in FIGS. 21A and 21B, respectively.

Similar to the other data set, precision, recall, and F1 scores were analyzed for the DoS, diagnostic, fizzing CAN ID, fuzzing payload, replay, suspension, and mixed attacks. Table VI below shows the results of this analysis. The disclosed GNB-based methodology has excellent 100% precision, which is better than or comparable to all the competing methods. Using DoS attacks, the proposed method has 11% and 39% better recall and F1 scores, respectively, than the state-of-the-art SVM classifier. The better recall indicates the true positive rate and shows the strength of our algorithms. Overall, the proposed GGNB methodology has 99.84%, 99.73 and 99.78% of precision, recall, and F1 scores, respectively. Unlike the other data set, the proposed GGNB, MNB, and CNB exhibit similar precision, recall, and F1 scores, as shown in Table VI.

TABLE VI

| Types of attacks | SVM [5] | | | DCNN [6] | | | CNB | | | MNB | | | GGNB | | |
|---|---|---|---|---|---|---|---|---|---|---|---|---|---|---|---|
| | Pr | Re | F1 | Pr | Re | F1 | Pr | Re | F1 | Pr | Re | F1 | Pr | Re | F1 |
| Dos | 0.46 | 0.89 | 0.61 | 1.0 | 0.9989 | 0.9995 | 0.9969 | 1.0 | 0.9985 | 0.9966 | 1.0 | 0.9983 | 0.9979 | 0.9975 | 0.9977 |
| Fuzzy | | | | 0.9995 | 0.9965 | 0.9980 | 0.9945 | 1.0 | 0.9972 | 0.9899 | 1.0 | 0.9949 | 0.9989 | 0.9989 | 0.9989 |
| Spoofing | | | | 0.9999 | 0.9992 | 0.9995 | 0.9599 | 0.9997 | 0.9794 | 0.9596 | 1.0 | 0.9794 | 0.9605 | 0.99634 | 0.9781 |
| Replay | | | | | | | 0.9960 | 0.8561 | 0.9208 | 0.9960 | 0.8576 | 0.9216 | 0.9974 | 0.8714 | 0.9301 |
| Mixed | | | | | | | 0.8889 | 0.9956 | 0.9392 | 0.8889 | 0.9992 | 0.9408 | 0.9978 | 0.9491 | 0.9728 |
| Overall | | | | | | | 0.9498 | 0.9807 | 0.9650 | 0.9488 | 0.9822 | 0.9652 | 0.9911 | 0.9655 | 0.9781 | with a generic complement naive Bayes (CNB), multinomial naive Bayes (MNB), and the existing SVM-based, and DCNN-based IDSs. The proposed GNB-based methodology has excellent 99.79% precision, which is better than all the competing methods. Using DoS attacks, the proposed In order to measure the sensitivity of the proposed methodology for window size variation, we considered CAN communication window size from 11.5 ms to 230 ms. A wide range of window variation allows different CAN communication frequency. According to our analysis, the proposed method's accuracy is fairly consistent with the variation of window size, as shown in FIG. 22. The disclosed example method has a less than 1% accuracy variation in this extended window size variation considering DoS, spoofing, fuzzy, and replay attacks. The proposed method's accuracy dropped only from 94.42% to 92.54% for 11.5 ms to 230 ms window range for mixed attack. This analysis is particularly important to measure the performance and adaptability of our algorithms for different CAN bus data rate scenarios.

For the GGNB algorithm, the priors and the likelihood probabilities for each class in the training phase were computed. Also, the n records were computed prior in linear time O(n). Considering k features, k likelihoods were calculated for each class. The likelihood probabilities may be O(nk) for training two classes. For testing m cases, the proposed GNB algorithm time complexity is O(mk. For training, the space complexity only considers the likelihoods for two classes of GNB, resulting in O(k). The likelihoods were computed during the training phase, so the training phase only requires a loop up, resulting in testing space complexity of O(m).

Generally, for a dataset with n records and k features, the worst-case training time of SVM is $O(kn^3)$. For $d_s$ support vectors, the test time is in the order of $O(kd_s)$. For training, the space complexity only needs to store $d_s$ resulting in $O(d_s)$. As expected, the proposed GGNB-based methodology has about 239× and 135× lower training and test time, respectively, compared to the existing SVM-based anomaly detection system.

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where r value in the range of −1 to +1. If two components x and y of the data are perfectly correlated, then r=+1 or −1, and r=0 if they are uncorrelated. The positive value of r indicates the proportional correlation of the components. On the other hand, the negative value of r indicates the inverse proportional correlation of the components.

Feature reduction is the process of reducing the number of features in computation without losing important information and prediction accuracy. To reduce number of feature variables, we used correlation matrix for our proposed feature s, as shown in FIG. 23, which is a graph showing the Maximum Indegree and Maximum Outdegree having the highest correlation with desired output label or attack detection. Maximum Indegree and Maximum Outdegree are highly correlated with our desired output label (i.e., Attacked). Using only these two features, the proposed algorithm exhibits 97.75% accuracy using mixed attack data. When two more features Median PageRank and Maximum PageRank are incorporated for detecting attacked label, the GGNB model achieved up to 98.06% accuracy. When using a rawCAN data set and four features, the CNB algorithm accuracy increased by 5.72%, however, the accuracy remained almost constant when using the OpelAstra data set. When using four features, the MNB algorithm accuracy dropped by 19.24% and 8.34% for rawCAN and OpelAstra data set, respectively.

Feature reduction leads to the use of fewer resources to complete computations due to the decrease in the number of variables. Expectedly feature reduction has a tremendous impact on the proposed methodology's performance, as shown in the Table VII. All the results are normalized with the GGNB algorithm with all nine features. For both the full set of features and the reduced number of features, the GGNB methodology has the lowest training time than other naive Bayes algorithms. On the other hand, CNB has the most down testing time than the other naive Bayes algorithms. With reduced features, the disclosed GGNB algorithm has 18% and 21% lower training time using rawCAN and OpelAstra data sets, respectively. The GGNB has 37.5% lower testing time using only four features on both the data sets with only a minor 0.03% maximum accuracy penalty, as shown in Table VII.

TABLE VII

| Data set type | # of features | CNB | | | MNB | | | GGNB | | |
|---|---|---|---|---|---|---|---|---|---|---|
| | | Training time | est time | Accuracy | Training time | Test time | Accuracy | Training time | Test time | Accuracy |
| rawCAN [1] | 9 | 1.1727 | 0.6337 | 0.9075 | 1.1338 | 0.6849 | 0.9098 | 1.00 | 1.00 | 0.9620 |
| | 4 | 1.0555 | 0.5012 | 0.9647 | 1.0494 | 0.5733 | 0.7174 | 0.8196 | 0.6474 | 0.9618 |
| OpelAstra (2( | 9 | 0.9024 | 0.5417 | 0.9080 | 0.8780 | 0.5417 | 0.9090 | 1.00 | 1.00 | 0.9090 |
| | 4 | 0.8415 | 0.4167 | 0.9090 | 0.8171 | 0.4583 | 0.9090 | 0.7927 | 0.6250 | 0.9087 |

The disclosed naive Bayes-based algorithms have been implemented in a Xilinx Zybo Z7 board as shown in FIG. 24. Among different naive Bayes-based algorithms, CNB requires lower computation resources than the other two methods for attack prediction. For example, the proposed CNB requires 5.3×, 4.7×, 6.4×, and 6.5× fewer slices, LUTs, flip-flops, and DSP cores, respectively, than the GGNB method. Moreover, the proposed GGNB requires 5, 7×, 5.9×, 5.1×, and 3.6× fewer slices, LUTs, flip-flops, and DSP units, respectively, compared to a conventional NN architecture with 4-hidden layers where each layer contains 500 neurons. The proposed CNB and MNB have equal FPGA clock periods of 6.404 ns. The proposed GGNB has a clock period of 6.94 ns, which is better than an SVM model requiring 7.063 ns. However, a nominal 23 ms window size for graph creation was considered. As a result, FPGA implementation has no adverse impact on the overall performance of the proposed IDS.

FIG. 25 illustrates a block diagram of an intrusion detection system 2500 in accordance with embodiments of the present disclosure. Referring to FIG. 25, the system 2500 includes a computing device 2502 and ECUs 1-N 2504A-2504N (with N being indicative of any suitable number of ECUs). The system 2500 may be implemented within any suitable vehicle as will be understood by those of skill in the art. The ECUs may communicate messages 2506 among each other in accordance with examples described herein. For example, the system 2500 may be part of a vehicular communications network, such as a CAN-based system.

The computing device 2502 can include hardware, software, firmware, or combinations thereof for implementing the functionalities described herein. For example, the computing device 2502 can include memory 2508 and one or more processors 2510. Further, the computing device 2500 can include a communications device 2510 configured to receive the messages 2506 communicated among the ECUs. As an example, the computing device 2502 can be part of a Gateway processor or hardware security module (HSM), or the like. Further, the computing device 2502 can follow AUTomotive Open System ARchitecture (AUTOSAR) standard. Further, the computing device 2502 can construct a set of graphs based on the received messages. The computing device 2502 can also apply a graph-based anomaly detection technique to the set of graphs for identifying an anomaly among one or more of the received messages. Further, the computing device 2502 can implement a predetermined action to mitigate an intrusion based on identification of the anomaly.

FIG. 26 illustrates a flow diagram of an example method for intrusion detection in accordance with embodiments of the present disclosure. This example method is described as being implemented within the system 2500 shown in FIG. 25. One or more of the messages 2506 may be part of an attack on the system. For example, a message may be injected into the system 2500 and be part of a spoof attack, a DoS attack, a fuzzy attack, or another intrusion.

Referring to FIG. 26, the method includes receiving 2600 messages communicated on a vehicular communications network. For example, the computing device 2502 can receive one or more of the messages 2506. The messages 2506 can be CAN messages communicated among two or more of the ECUs 2504A-2504N. Using CAN communication, an attacker can initiate different kinds of attacks (e.g., fabrication, suspension, masquerade, etc.). The intrusion detection system can be integrated into individual ECUs, central computing units, Gateway processors, or the like.

The method of FIG. 26 can include constructing 2602 a set of graphs based on the received messages. Continuing the aforementioned example, the computing device 2502 can construct graphs for a predetermined number (e.g., 200) of received messages.

The method of FIG. 26 can include applying 2604 a graph-based anomaly detection technique to the set of graphs for identifying an anomaly among one or more of the received messages. Continuing the aforementioned example, the computing device 2502 can extract adjacent messages and their corresponding identifiers. Further, the computing device 2502 can construct an adjacency list from the identifiers extracted from two sequential messages. The computing device 2502 can extract graph-based features from the constructed set of graphs. Further, the computing device 2504 can extract a node number, an edge number, and maximum degree from a single constructed graph and store them in a list of graph properties. The computing device 2504 can also use a chi-squared technique for identifying the anomaly based on the constructed set of graphs. Also, the computing device 2504 can calculate a chi-square value for a text population window of the windows; and can compare the value with an outlier for determining the anomaly among the one or more of the received message.

The method of FIG. 26 can include implementing 2606 a predetermined action to mitigate an intrusion based on identification of the anomaly. Continuing the aforementioned example, the system 2500 can notify an operator of the automobile in response to identifying an anomaly. The notification can be presented on a user interface (e.g., display) of the automobile. In another example, a server can be wirelessly connected to the computing device 2502 via a network and the server can be notified in response to identifying an anomaly. In yet another example, depending on the severity of the attack, the automobile may enter a failsafe mode in response to identifying an anomaly.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

REFERENCES

[1] H. Lee, S. H. Jeong, and H. K. Kim, "OTIDS: a novel intrusion detection system for in-vehicle network by using remote frame," in *Annual Conference on Privacy, Security and Trust*, August 2017, pp. 57-5709.

[2] S. Woo, H. J. Jo, and D. H. Lee, "A practical wireless attack on the connected car and security protocol for in-vehicle CAN," *IEEE Transactions on Intelligent Transportation Systems*, vol. 16, no. 2, pp. 993-1006, April 2015.

[3] T. Hoppe, S. Kiltz, and J. Dittmann, "Security threats to automotive CAN networks-practical examples and selected short-term countermeasures," *Reliability Engineering & Safety, vol. 96*, no. 1, pp. 11-25, 2008.

[4] H. Ji, Y. Wang, H. Qin, X. Wu, and G. Yu, "Investigating the effects of attack detection for in-vehicle networks based on clock drift of ECUs," *IEEE Access*, vol. 6, pp. 49 375-49 384, 2018.

[5] C. Lin and A. Sangiovanni-Vincentelli, "Cyber-security for the controller area network (CAN) communication protocol," in *International Conference on Cyber Security*, December 2012, pp. 1-7.

[6] K. Iehira, H. Inoue, and K. Ishida. "Spoofing attack using bus-off attacks against a specific ECU of the CAN bus," in *IEEE Annual Consumer Communications Networking Conference*, January 2018, pp. 1-4.

[7] R. Islam and R. U. D. Refat, "Improving CAN bus security by assigning dynamic arbitration IDs," *Journal of Transportation Security*, April 2020.

[8] L. Akoglu, H. Tong, and D. Koutra, "Graph based anomaly detection and description: A survey," *Data Mining and Knowledge Discovery*, vol. 29, no. 3, pp. 626-688, May 2015.

[9] N. Ye and Q. Chen, "An anomaly detection technique based on a Chi-square statistic for detecting intrusions into information systems," *Quality and Reliability Engineering International*, vol. 17, no. 2, pp. 105-112, 2001.

[10] A. Tomlinson, J. Bryans, and S. Ahmed Shaikh, "Towards viable intrusion detection methods for the automotive controller area network," in ACM *Computer Science in Cars Symposium*, September 2018.

[11] W. Choi, H. J. Jo, S. Woo, J. Y. Chun, J. Park, and D. H. Lee, "Identifying ECUs using inimitable characteristics of signals in controller area networks," *IEEE Transactions on Vehicular Technology*, vol. 67, no. 6, pp, 4757-4770, June 2018.

[12] W. B. Ugoni A, "The Chi square test: an introduction," *COM-SIG Review*, vol. 4, no. 3, pp. 61-64, 1995.

[13] J. H. Steiger, A. Shapiro, and M. W. Browne, "On the multivariate asymptotic distribution of sequential Chi-square statistics," *Psychometrika*, vol. 50, no. 3, pp. 253-263, September 1985.

[14] R. J. Tallarida and R. B. Murray, *Chi-Square Test*. New York, NY: Springer New York, 1987, pp. 140-142.

[15] P. Meesad, P. Boonrawd, and V. Nuipian, "A Chi-square-test for word importance differentiation in text classification," *Proceedings of Computer Science and Information Technology*, vol. 6, 01 2011.

[16] I. S. Thaseen and C. A. Kumar, "Intrusion detection model using fusion of Chi-square feature selection and multi class SVM," *Journal of King Saud University-Computer and Information Sciences*, vol. 29, no. 4, pp. 462-472, 2017.

[17] D. Kobayashi, O. Takahashi, H. Arioka, S. Koga, and T, Fukui, "A prediction rule for the development of delirium among patients in medical wards: Chi-square automatic interaction detector (chaid) decision tree analysis model," *The American Journal of Geriatric Psychiatry*, vol. 21, no. 10, pp. 957-962, 2013.

[18] B. Brumback and M. Srinath, "A chi-square test for fault-detection in kalman filters," *IEEE Transactions on Automatic Control*, vol. 32, no. 6, pp. 552-554, June 1987.

[19] C. Ling and D. Feng, "An algorithm for detection of malicious messages on CAN buses," in *National Conference on Information Technology and Computer Science*, 2012.

[20] W. Fu, X. Xin, P. Guo, and Z. Zhou, "A practical intrusion detection system for internet of vehicles," *China Communications*, vol. 13, no. 10, pp. 263-275, October 2016.

[21] A. Taylor, N. Japkowicz, and S. Leblanc, "Frequency-based anomaly detection for the automotive CAN bus," in *World Congress on Industrial Control Systems Security*, December 2015, pp. 45-49.

[22] M. Mter and N. Asaj, "Entropy-based anomaly detection for in-vehicle networks," in *IEEE Intelligent Vehicles Symposium (IV)*, 2011, pp. 1110-1115.

[23] M. Marchetti, D, Rabin, A. Guido, and M, Colajanni, "Evaluation of anomaly detection for in-vehicle networks through information-theoretic algorithms," in *International Forum on Research and Technologies for Society and Industry Leveraging a better tomorrow*, September 2016, pp. 1-6.

[24] H. M. Song, H. R. Kim, and H. K. Kim, "Intrusion detection system based on the analysis of time intervals of CAN messages for in-vehicle network," in *International Conference on Information Networking*, January 2016, pp. 63-68.

[25] M. Marchetti and D. Stabili, "Anomaly detection of CAN bus messages through analysis of ID sequences," in *IEEE Intelligent Vehicles Symposium*, June 2017, pp. 1577-1583.

[26] W. G. Cochran, "The $\chi^2$ test of goodness of fit," *The Annals of Mathematical Statistics*, vol. 23, no. 3, pp. 315-345, September 1952.

[27] S. Siegel and N. J. J. Castellon, "Nonparametric statistics for the behavioral sciences," *New York: McGrawHill;* 1988.

[28] Lee, S. H. Jeong, and K. Kim, "CAN dataset for intrusion detection," in *HCRL*, October 2018.

[29] C. Leys, C. Ley, O. Klein, P. Bernard, and L. Licata, "Detecting outliers: Do not use standard deviation around the mean, use absolute deviation around the median," *Journal of Experimental Social Psychology*, vol. 49, no. 4, pp. 764-766, 2013.

[30] G. J. Myatt, "Making sense of data: A practical guide to exploratory," *New York: Wiley-Interscience*, 2006.

[31] B. GmbH, "CAN specification version 2.0," 1991.

[32] K.-T. Cho and K. Ci. Shin, "Fingerprinting electronic control units for vehicle intrusion detection," in *Proceedings of the USENIX Conference on Security Symposium.* USENIK Association, 2016, pp. 911-927.

[33] G. Dupon t, A. Lekidis, J. den Hartog, S. Etalle, "Automotive controller area network (CAN) bus intrusion dataset v2," https://data.4tu.nl/articles/dataset/Automotive_Controller_Area_Network_CAN Bus_Intrusion_Datasetfl 2696950/2.

[34] N. H. T. S. Administration, "Vehicle cybersecurity," https://www.nhtsa.gov/technology-innovation/vehicle-cybersecurity.

[35] S. J. V. Tanksale, "Intrusion detection for controller area network using support vector machines," IEEE International Conference on Mobile Ad Hoc and Sensor Systems Workshops, IEEE, 2019, pp. 121-126.

[36] H. M. Song, J. Woo, ELK Kim, "In-vehicle network intrusion detection using deep convolutional neural network," Veh, Commun. 21 (2020) I 00198.

[37] R. E. Corporation, "In-vehicle networking solutions," https: //www.renesas.com/us/en/solutions/automotive/technology/networking-solutions.html.

[38] K. Koscher. A. Czeskis, F. Roesner. S. Patel, T. Kohno, S. Checkoway, D. McCoy, B. Kant or D. Anderson, H. Shacham, S. Savage, "Experimental security analysis of a modern automobile," IEEE Symposium on Security and Privacy, 2010, pp. 447-462.

[39] S. Jeong, B. Jeon, B. Chung, H. K. Kim, "Convolutional neural network-based intrusion detection system for AVTP streams in automotive ethernet-based networks," Veh, Commun. 29 (2021) 100338, https:/fdoi.org/10.1016/j.vehcom.2021.100338, https://www.sciencedirect.com/science/article/pii/www.sciencedirect.com/science/article/pii/S2214209621000073.

[40] C. Miller, C. Valasek, "Remote exploitation of an unaltered passenger vehicle," Black Hat USA 2015 (2015) 91.

[41] S. Checkoway, D. McCoy, B. Kantor, D. Anderson. H. Shoehorn, S. Savage, K. Kosher, A. Czeskis, F. Roesner, T. Kohno, "Comprehensive experimental analyses of automotive attack surfaces," Proceedings of the USENIX Conference on Security, 2011, p. 6.

[42] M. R. Moore, R. A. Bridges, F. L. Combs, M. S. Starr, S. J, Prowell, "Modeling inter-signal arrival times for accurate detection of CAN bus signal injection attacks: a data-driven approach to in-vehicle intrusion detection," Proceedings of the Annual Conference on Cyber and Information Security Research, 2017, p p. 1-4

[43] A. Zhou. Z. Li, Y. Shen, "Anomaly detection of CAN bus messages using a deep neural network for autonomous vehicles," Appl. Sci. 9 (15) (2019).

[44] H. Qin, M. Yan, H. Ji, "Application of controller area network (CAN) bus anomaly detection based on time series prediction," Veh. Commun. 27 (2021) 100291, https://doi.org/10.1016/j.vehcom.2020.100291, https: //www.sciencedirect.com/science/article/pii/S2214 209620300620.

[45] M. Han, P, Cheng, S, Ma, "PPM-InVIDS: privacy protection model for in-vehicle intrusion detection system based complex-valued neural network," Veh. Com-mun. 31 (2021) 100374, https://doi.org/10.1016/j.vehcom.2021.100374, https://wwww.sciencedirect.com/science/article/pii/S2214209621000437.

[46] E. Seo, H. M. Song, H. K. Kim, "GIDS: GAN based intrusion detection system for in-vehicle network," 2018 16th Annual Conference on Privacy, Security and Trust. PST, 2018, pp. 1-6.

[47] V. Verendel, D. K. Nilsson, U. E. Larson E. Jonsson, "An approach to using honeypots in in-vehicle networks," IEEE Vehicular Technology Conference, 2008, pp. 1-5.

[48] S. Tariq, S. Lee, H. K. Kim, S. S. Woo, "CAN-ADF: the controller area network attack detection framework," Comput. Secur, 94 (2020) 101857, https://doi.org/10.1016/j.cose.2020.101857, https://www.sciencedirect.com/science/article/pii/50167404820301292.

[49] O. Minawi, J. Whelan, A. Ahnehmadi, K. El-Khatib, "Machine learning-based intrusion detection system for controller area networks," Proceedings of the ACM Symposium on Design and Analysis of Intelligent Vehicular Networks and Applications, DIVANet '20, Association for Computing Machinery, New York, NY, USA, 2020, pp. 41-47.

[50] M. D. Hossa in, H. Inoue. H. Ochiai. D. Fall, Y. Kadohayashi, "LSTM-based intrusion detection system for in-vehicle CAN bus communications," IEEE Access 8 (2020) 185489-185502, https://doi.org/10.1109/ACCESS.2020.3029307.

[51] K. Lemke, C. Paar. M. Wolf, "Embedded Security in Cars," Springer. 2006.

[52] L Wang, X. Liu, "Secure cooperative communication scheme for vehicular heterogeneous networks," Veh. Commun. 11 (2018) 46-56, https://doi.org./10.1016/j.vehcom.2018.01.001, https://www.sciencedirect.com/science/article/pii/52214209617301547.

[53] R. Islam, R. U. D. Refat, S. M. Yerram and H. Malik, "Graph-Based intrusion Detection System for Controller Area Networks," IEEE Transactions on Intelligent Transportation Systems, vol. 23, no. 3, pp. 1727-1736, March 2022, doi: 10.1109/TITS.2020.3025685.

[54] R. Gu, S. Zhang, Y. Ji, Z. Yan, "Network slicing and efficient ONU migration for reliable communications in converged vehicular and fixed access network," Veh Commun. 11 (2018) 57-67, https://doi.org/10.1016/j.vehcom.2018.01.003, https://www.sciencedirect.com/science/article/pii/52214209617301584.

[55] S. Vellampalli. W. Eberle, "Novel graph based anomaly detection using background knowledge," The International Flairs Conference, 2017.

[56] S. Velampalli, L Mookiah, W, Eberle, "Discovering suspicious patterns using a graph based approach," The International Flairs Conference, 2019.

[57] H. Ueda, R. Kurachi. Takada. T. Mizutani, M. Inoue, S. Horihata, "Security authentication system for in-vehicle network," SEI Tech. Rev. 81 (2015) 5-9.

[58] I. Studnia, V. Nicomette, E. Alata, Y. Desearte, M. Kaaniche, Y. Laarouchi, "Survey on security threats and protection mechanisms in embedded automotive networks," Annual IEEE/IFIP Conference on Dependable Systems and Networks Workshop, 2013, pp. 1-12.

[59] P. Carsten, T. R. Andel, M. Yampolskiy, J. T. McDonald, S. Russ, A system to recognize intruders in controller area network CAN," International Symposium for ICS & SCADA Cyber Security Research. 2015. pp. 111-114.

[60] A. Boudguiga, W. Klaudel, A. Boulanger, P. Chiron, "A simple intrusion detection method for controller area network," IEEE International Conference on Communications, 2016, pp. 1-7.

[61] J. Staggs, "How to Hack Your Mini Cooper: Reverse Engineering CAN Messages on Passenger Automobiles," Institute for Information Security, 2013.

[62] L Page, S. Brin, R. Motwani, T. Winograd, "The pagerank citation ranking: bringing order to the web," Tech. Rep., Stanford InfoLab, 1999.

[63] G. H. John, P. Langley, "Estimating continuous distributions in Bayesian classifiers," arXiv preprint, arXiv: 1302.4964.
[64] M. Kuhn, K, Johnson. et al., "Applied. Predictive Modeling," vol. 26, Springer. 2013.
[65] L. Breiman, "Random forests," Mach. Learn. 45 (2001) 5-32.
[66] D. M. Powers, "Evaluation: from precision, recall and f-measure to roc, informedness, markedness and correlation," arXiv preprint, arXiv: 2010, 16061.
[67] E. Alpay din, "Introduction to Machine Learning," MIT Press, 2020.
[68] C. M. Bishop, "Pattern Recognition and Machine Learning," Springer, 2006.
[69] DeepAI, "Feature reduction," https://deepai.org/machine-learning-glossary-and-terms/feature-reduction-.html.
[70] H. Liu, H. Motoda, "Computational Methods of Feature Selection," CRC Press, 2007.
[71] T. Jordan, "How hardware security modules enable AUTOSAR," Jun. 24, 2018, https://www.embedded.com/how-hardware-security-modules-enable-autosar/.
[72] A. Barber, "Prevent automotive counterfeiting with secure authentication," Jan. 22, 2020, https://electronicdesign.com/markets/automotive/article/21121143/maxim-integrated-prevent-automotive-counterfeiting-with-secure-authentication.
[73] R. Islam and M. K. Devnath and M. D. Samad and S. M. J. Kadry, "GGNB: Graph-based Gaussian naive Bayes intrusion detection system for CAN bus," Vehicular Communications, 2022.

What is claimed is:

1. An intrusion detection system comprising:
a computing device configured to:
receive messages communicated on a vehicular communications network;
construct a set of graphs based on the received messages, wherein the set of graphs is constructed for a predetermined number of the received messages;
apply a graph-based anomaly detection technique to the set of graphs for identifying an anomaly among one or more of the received messages;
extract adjacent messages and their corresponding identifiers;
construct an adjacency list from the identifiers extracted from two sequential messages; and
implement a predetermined action to mitigate an intrusion based on identification of the anomaly.

2. The intrusion detection system of claim 1, wherein the vehicular communications network is implemented within an autonomous vehicle or a partially autonomous vehicle.

3. The intrusion detection system of claim 1, wherein the vehicular communications network is a controller area network (CAN) comprising a plurality of electronic control units (ECUs), and
wherein the messages are CAN messages communicated among the plurality of ECUs.

4. The intrusion detection system of claim 1, wherein the computing device is configured to extract graph-based features from the constructed set of graphs.

5. The intrusion detection system of claim 1, wherein the computing device is configured to use a chi-squared technique for identifying the anomaly based on the constructed set of graphs.

6. The intrusion detection system of claim 5, wherein the computing device is configured to:
calculate a chi-square value for a text population window of the windows; and
compare the value with an outlier for determining the anomaly among the one or more of the received message.

7. The intrusion detection system of claim 1, wherein the intrusion comprises one of a fabrication attack, a suspension attack, or a masquerade attack.

8. An intrusion detection system comprising:
a computing device configured to:
receive messages communicated on a vehicular communications network;
construct a set of graphs based on the received messages;
apply a graph-based anomaly detection technique to the set of graphs for identifying an anomaly among one or more of the received messages;
extract a node number, an edge number, and maximum degree from a single constructed graph and store them in a list of graph properties; and
implement a predetermined action to mitigate an intrusion based on identification of the anomaly.

9. An intrusion detection system comprising:
a computing device configured to:
receive messages communicated on a vehicular communications network;
construct a set of graphs based on the received messages;
apply a graph-based anomaly detection technique to the set of graphs for identifying an anomaly among one or more of the received messages;
construct the graphs with vertices;
determine PageRank for each vertex;
use the determined PageRank for each vertex for identifying the anomaly; and
implement a predetermined action to mitigate an intrusion based on identification of the anomaly.

10. A method comprising:
at a computing device including memory and at least one processor:
receiving messages communicated on a vehicular communications network;
constructing a set of graphs based on the received messages, wherein the set of graphs is constructed for a predetermined number of the received messages;
applying a graph-based anomaly detection technique to the set of graphs for identifying an anomaly among one or more of the received messages;
extracting adjacent messages and their corresponding identifiers; and
constructing an adjacency list from the identifiers extracted from two sequential messages; and
implementing a predetermined action to mitigate an intrusion based on identification of the anomaly.

11. The method of claim 10, wherein the vehicular communications network is implemented within an autonomous vehicle or a partially autonomous vehicle.

12. The method of claim 10, wherein the vehicular communications network is a controller area network (CAN) comprising a plurality of electronic control units (ECUs), and
wherein the messages are CAN messages communicated among the plurality of ECUs.

13. The method of claim 10, comprising extracting graph-based features from the constructed set of graphs.

14. The method of claim 10, comprising using a chi-squared technique for identifying the anomaly based on the constructed set of graphs.

15. The method of claim 14, comprising:
calculating a chi-square value for a text population window of the windows; and
comparing the value with an outlier for determining the anomaly among the one or more of the received message.

16. The method of claim 10, wherein the intrusion comprises one of a fabrication attack, a suspension attack, or a masquerade attack.

17. A method comprising:
at a computing device including memory and at least one processor:
receiving messages communicated on a vehicular communications network;
constructing a set of graphs based on the received messages;
applying a graph-based anomaly detection technique to the set of graphs for identifying an anomaly among one or more of the received messages;
extracting a node number, an edge number, and maximum degree from a single constructed graph and store them in a list of graph properties; and
implementing a predetermined action to mitigate an intrusion based on identification of the anomaly.

18. A method comprising:
at a computing device including memory and at least one processor:
receiving messages communicated on a vehicular communications network;
constructing a set of graphs based on the received messages;
applying a graph-based anomaly detection technique to the set of graphs for identifying an anomaly among one or more of the received messages;
constructing the graphs with vertices;
determining PageRank for each vertex;
using the determined PageRank for each vertex for identifying the anomaly
implementing a predetermined action to mitigate an intrusion based on identification of the anomaly.

* * * * *